(12) United States Patent
Sedlmayr et al.

(10) Patent No.: US 6,195,231 B1
(45) Date of Patent: Feb. 27, 2001

(54) THIN FILM MAGNETIC DATA TRANSFER TRANSDUCER

(76) Inventors: Steven R. Sedlmayr, 11020 E. Vallejo, Chandler, AZ (US) 85248; Duane Burton, 6998 Indian Peaks Trail, Boulder, CO (US) 80301

( * ) Notice: Subject to any disclaimer, the term of this patent is extended or adjusted under 35 U.S.C. 154(b) by 0 days.

(21) Appl. No.: 09/019,291

(22) Filed: Feb. 5, 1998

Related U.S. Application Data

(62) Division of application No. 08/238,958, filed on May 6, 1994, now Pat. No. 5,761,166.

(51) Int. Cl.[7] ............................... G11B 5/17; G11B 5/147
(52) U.S. Cl. ............................................. 360/123; 360/126
(58) Field of Search ...................................... 360/123, 126

(56) References Cited

U.S. PATENT DOCUMENTS 5,260,845 * 11/1993 Takayama ............................ 360/123

* cited by examiner

Primary Examiner—A. J. Heinz
(74) Attorney, Agent, or Firm—Duane Burton

(57) ABSTRACT

A disk storage device has a simultaneous data transfer head means (2284) having a plurality of data transducer means (2570) for the simultaneous storage and/or retrieval of a plurality of data on a disk means. The device makes it feasible for the simultaneous transfer of data to and from a disk storage device with a storage area formed thereon (2272), thereby increasing the I/O between the processing unit and the storage device. The magnetic data transfer transducer is fabricated on a substrate by thin film techniques with each element, including the head gap, being successively formed on more elements previously formed.

2 Claims, 23 Drawing Sheets

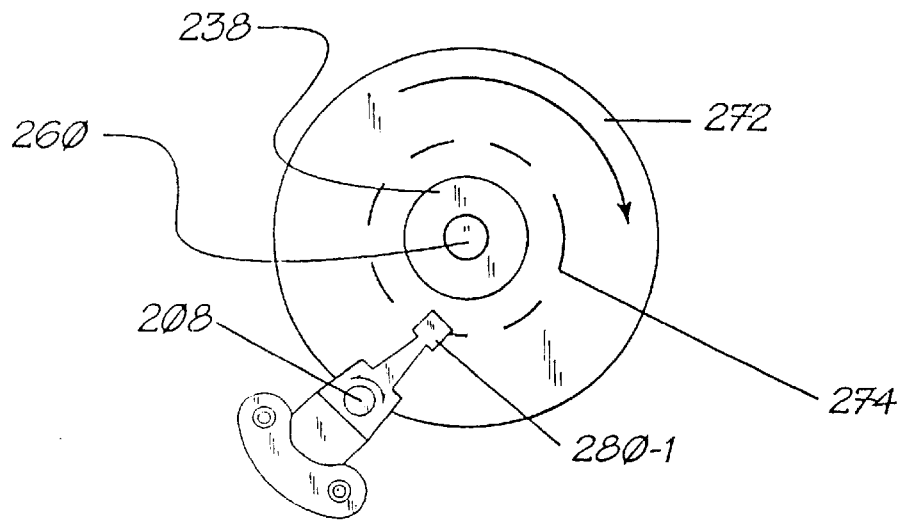
Figure 2 *(Prior Art)*
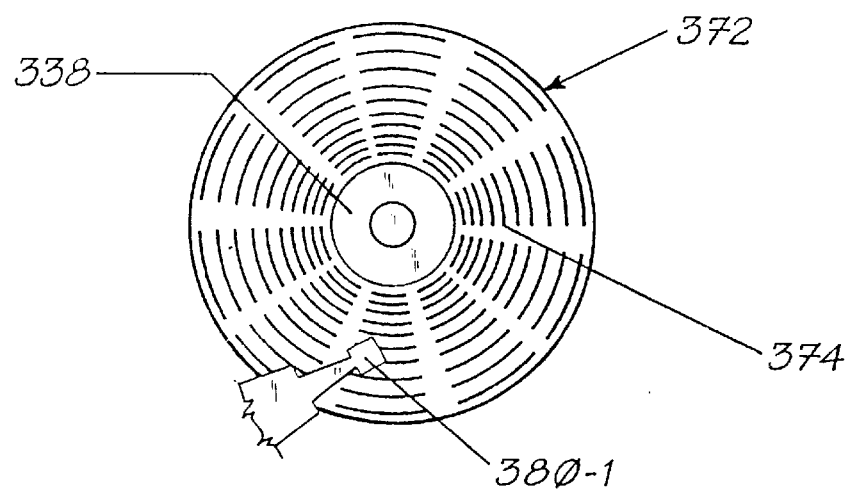
Figure 3 *(Prior Art)*

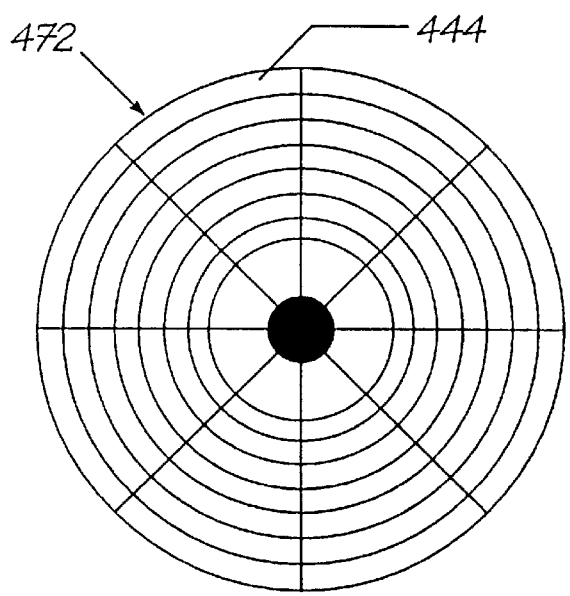
Figure 4 *(Prior Art)*
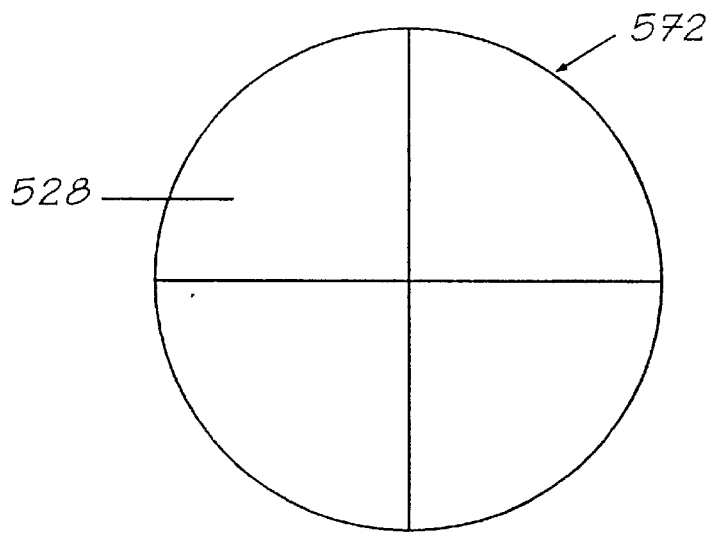
Figure 5

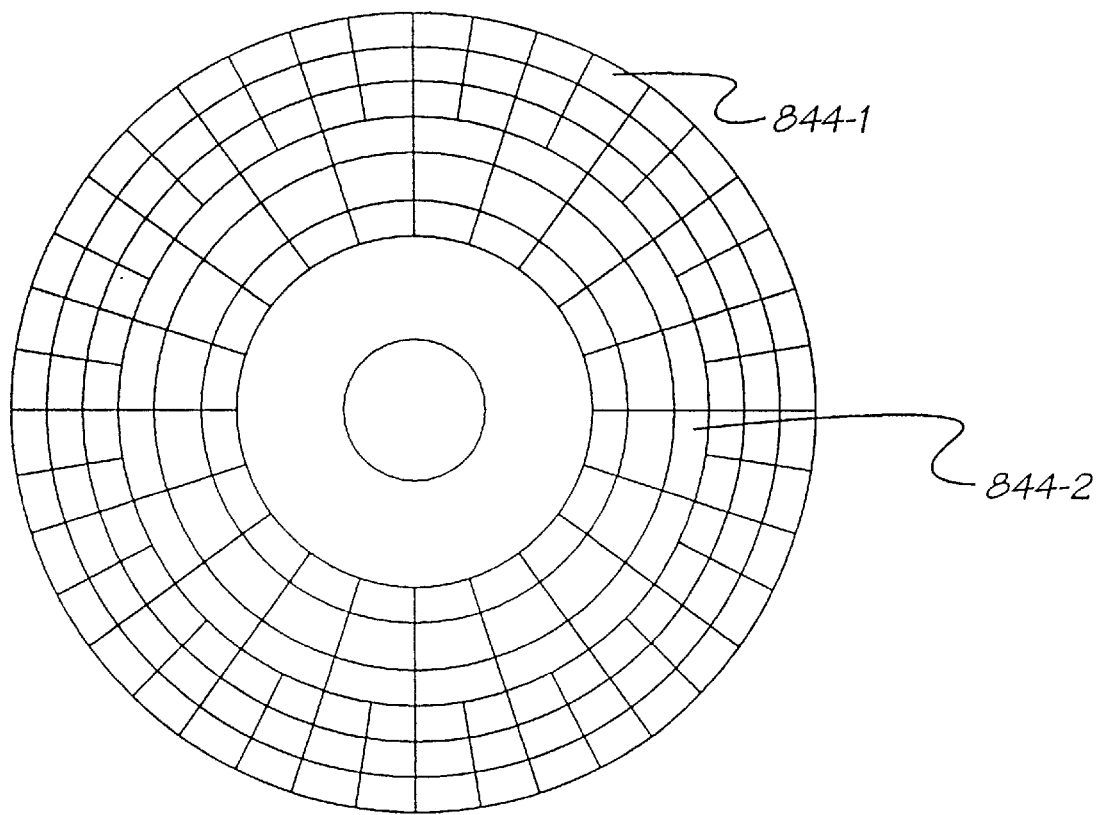
Figure 8 *(Prior Art)*

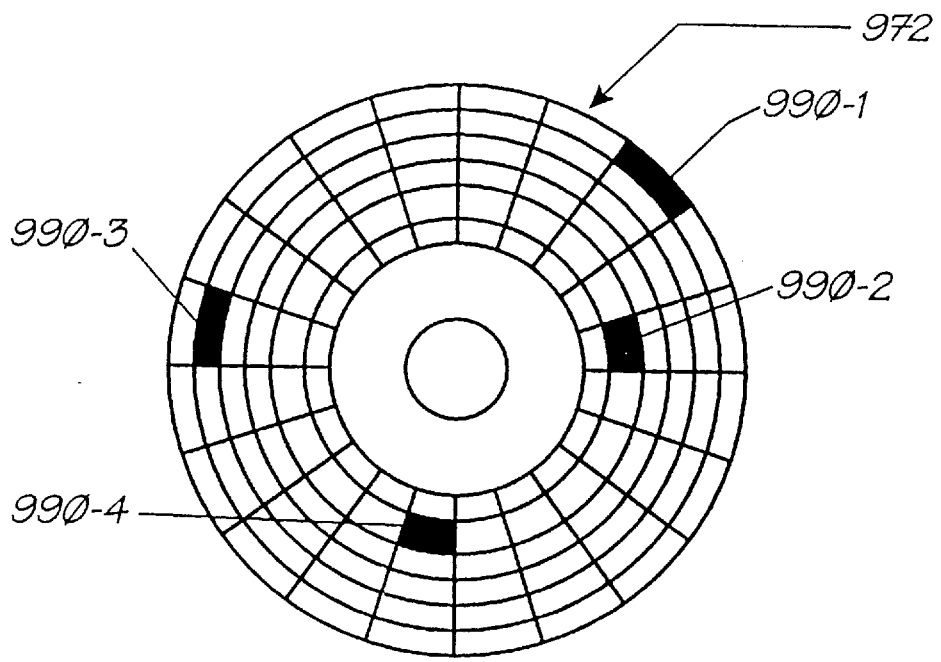
Figure 9 *(Prior Art)*
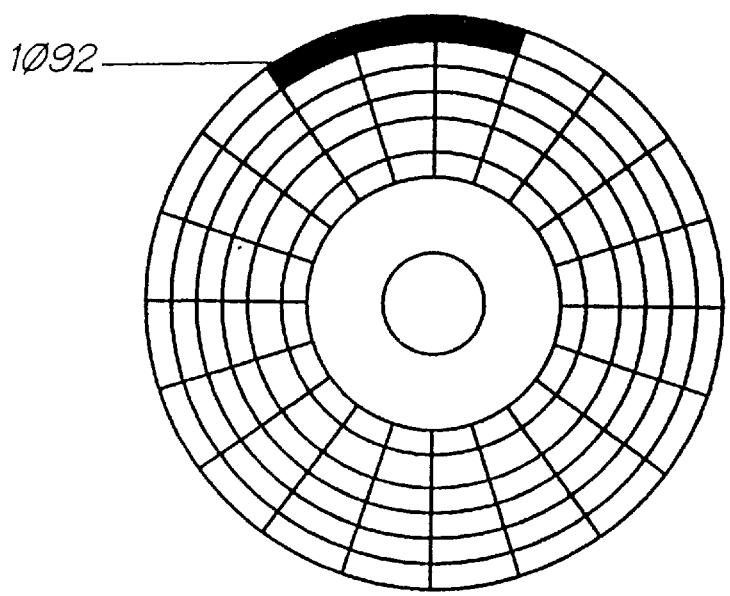
Figure 10 *(Prior Art)*

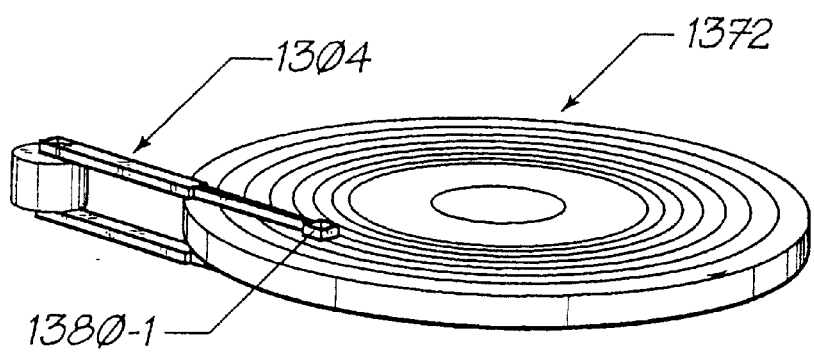
Figure 13 *(Prior Art)*
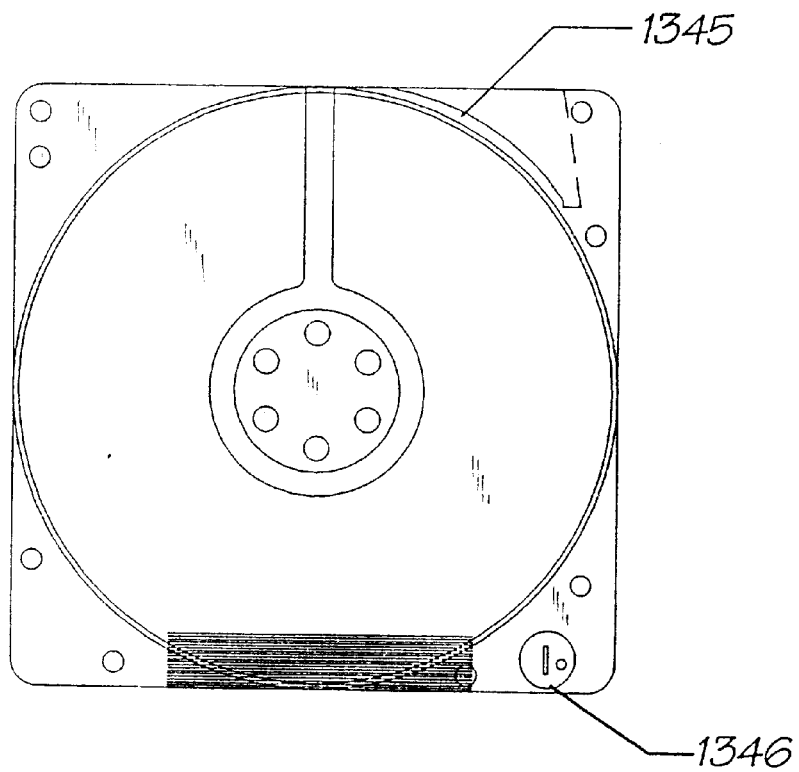
Figure 13A *(Prior Art)*

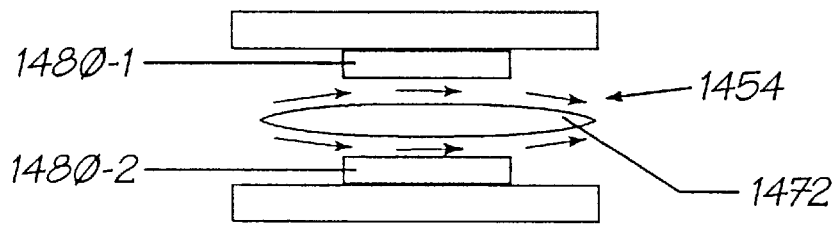
Figure 14 *(Prior Art)*
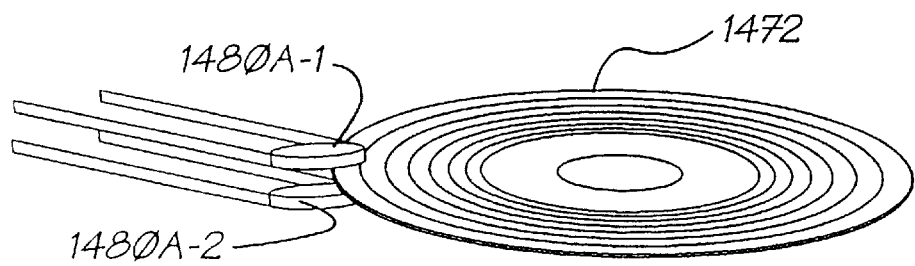
Figure 14A *(Prior Art)*
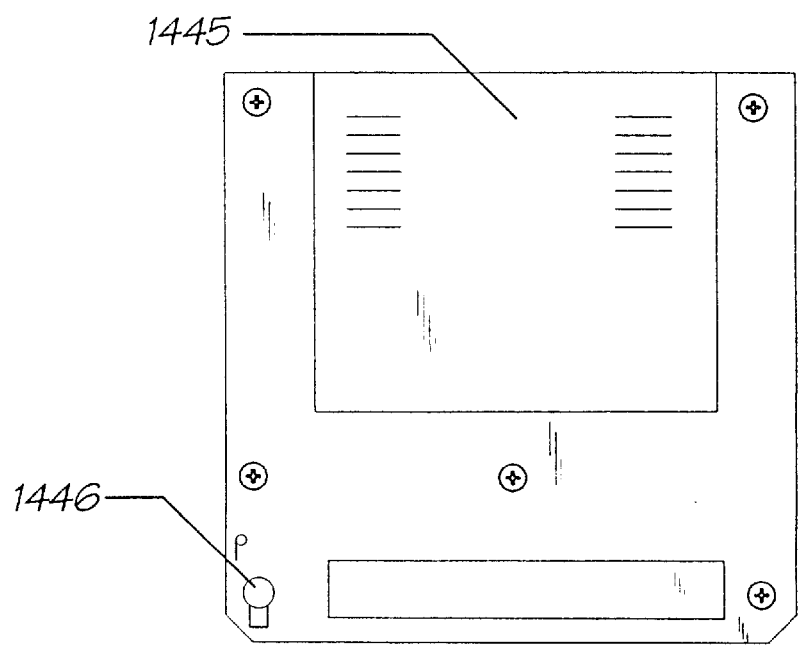
Figure 14B *(Prior Art)*

Direction of rotation

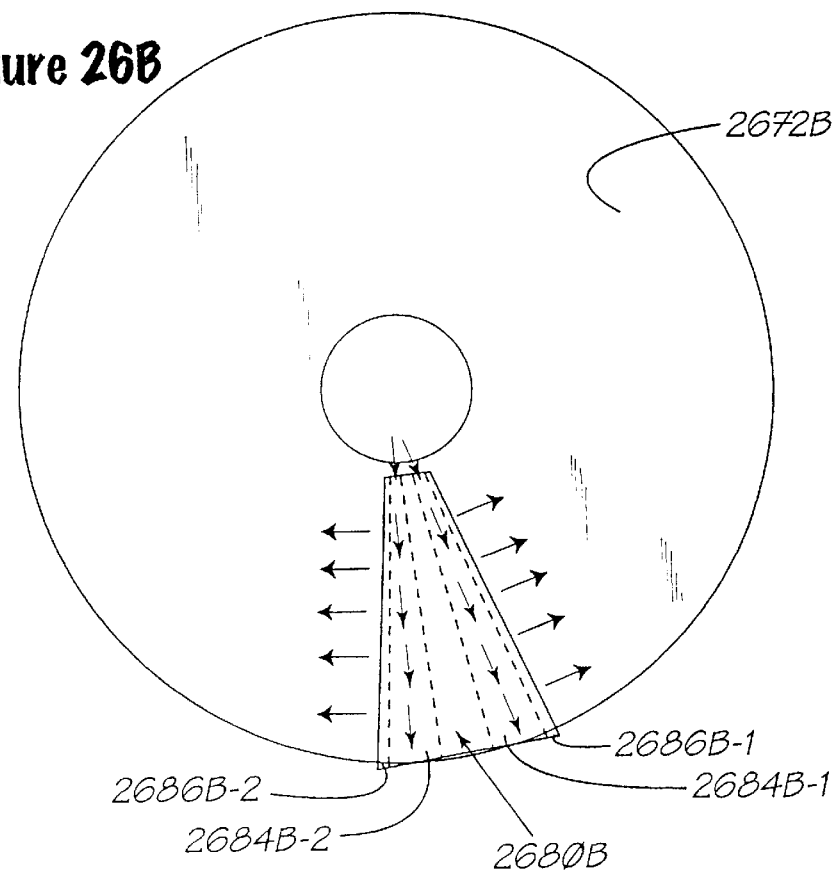
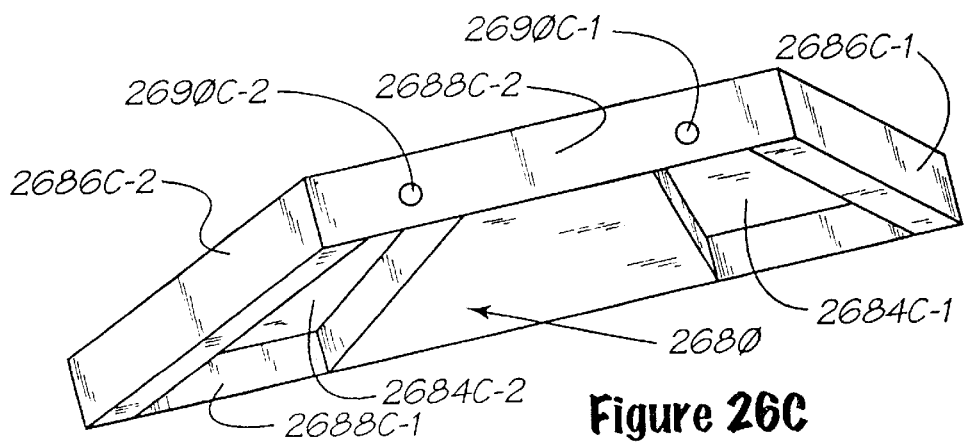

THIN FILM MAGNETIC DATA TRANSFER TRANSDUCER

RELATED APPLICATION

This application is a division of U.S. patent application Ser. No. 08/238,958 filed May 6, 1994, U.S. Pat. No. 5,761,166.

FIELD OF THE INVENTION

This invention relates to a method and system for storval of a plurality of binary information (data) involving a plurality of data transfer transducer means (simultaneous data transfer head means) and a data disk storval means. This simultaneous data storval means can be used in computer systems and other data processing systems utilizing data storval on rotatably mounted disk storval means and the disk means themselves. As generally defined, a storval means is a means for storing, retrieving, or erasing data on or in a device. Specifically, this invention is used with rotatably mounted disk storval means.

BACKGROUND OF THE INVENTION

Computers have a need for the storage of binary information on different types of mediums for eventual retrieval for processing in their central processing unit (CPU). This has led to different types and speeds of storval devices, from temporary to long term storval requirements. The speed of access to the information for the various types varies widely. The major classifications of storval devices associated with computer systems are: (1) immediate-access (typically core and cache storage); (2) random access (typically RAM or other devices in which the time to obtain information is independent of the location of the information most recently obtained); and (3) sequential access (typically storval devices in which the items or information stored become available only in a one-after-the-other sequence, whether or not all the information or only some of it is desired. (Typically disk, tape or drum storage). Information can be stored as either program instructions for the computer to execute in the CPU or as data used for computations. In this patent, data will refer to both program instructions and data interchangeably.

A random access memory (RAM) is a solid state type of device manufactured from semiconductor materials that retains information only as long as the machine is running. It has the advantage of nearly instant access for the CPU (from 10 nanoseconds to 150 nanoseconds) when the data is called for. However, this type of storval has been typically very expensive in the past. For intermediate long term storage, a hard disk with a magnetic coating on its' surface can presently store data without loss for as long as ten years, with access times of 4 milliseconds to 30 milliseconds. Intermediate storval of data is data that might be required by the CPU in its daily operations on an occasional usage. For long term storage, that is, storage that requires the archiving of information, a photo-optic storval disk that uses lasers for reading the information, called a CD Rom, should store data for 100 years or more, with present access times of typically more than 200 milliseconds.

For intermediate storval of data, it has been a long sought goal to use an inexpensive system while providing a computer with faster access to data and, also, to increase the capacity for storval of data. The time for a data storval operation using a disk utilizing a sequential data transfer head means is comprised of seek, latency and command overhead times. Referring to FIG. 1, seek time is defined as the time required to position a sequential data transfer head means 180-1 above a particular track 174. The shorter distance the sequential data transfer head means 180-1 has to travel, the shorter the seek time. Referring to FIG. 3, latency time is defined as the time required for the disk 372 to rotate beneath a positioned sequential data transfer head means 380-1 until a predetermined sector of the track 374 rotates past the sequential data transfer head means 380-1. The faster the disk rotates, the smaller is the latency time.

Data storval disk controllers, the "brains" that control the devices, can pre-access the data before it is required by the CPU and store it temporarily in a data cache. The data cache is typically a RAM device that can store relatively small amounts of data. When the data needed by the computer is stored in cache, both seek and latency times are eliminated. Caching includes CPU cache, RAM cache, hard drive cache, track buffering, pre-fetching and write cache. CPU cache stores a part of a program or data so it may be accessed quickly while the CPU is executing the program. RAM cache is used for storing the most frequently accessed disk information and speeds data retrieval but limits the amount of RAM available for the program itself. RAM cache minimizes small computer system interface (SCSI) bus traffic by serving I/O requests within the computer itself. Hard drive cache is located on the controller board and is slower than RAM cache. Hard drive cache stores the most recently requested disk information and frees the computer RAM for running the program. Track buffering works on the principle that when data is requested from a particular sector, it is likely that the CPU will then require data located in adjacent sectors. In anticipation, the controller reads the entire track and stores the read data in its RAM. This speeds up information retrieval for most applications. Pre-fetching is similar to buffering except it reads the next track by a sequential data transfer head means before it is required.

Command overhead time is the time required for the computer command to be interpreted and acted upon by the data storval controller. While this is taking place, requested data stored in the called for sectors of a track may have passed beneath the sequential data transfer head means requiring the rotation of the disk means almost a full revolution before the called for sector is once again located beneath the sequential data transfer head means. Interleaving and sector skewing are used to reduce this amount of command overhead time.

The central processing unit (CPU) of some computers cannot handle data as quickly as the hard drive controller can transfer data on the spinning disk. By the time the CPU digests the information that the sequential data transfer head means has just transferred data from one sector and issue orders to the disk controller to perform another data storval operation, the predetermined sector on the spinning disk may have already passed by the sequential data transfer head means. To perform the storval of data the disk device controller controlling the sequential data transfer head means must wait a full disk rotation for that sector to once again pass beneath the sequential data transfer head means. A disk controller is a circuit that transmits and retrieves signals to the disk drive. In a personal computer a disk device controller is a printed circuit board that plugs in the expansion spot in the bus or is a printed circuit board that contains circuits that reside in or near the disk housing.

Interleaving describes how sectors are arranged on the disk, so that the device controller controlling the sequential data transfer head means can transfer data in the fastest possible sequential order. This is illustrated in FIG. 12. The information allotted to ordered sectors does not follow the sectors actual sequential numerical order; information is placed on sectors that are not physically contiguous, as can be seen from the arrows in FIG. 12. As shown in this figure, the data storval occurs first from sector 1, then from sector 10, then sector 20, then sector 30. Thus the device controller controlling the sequential data transfer head means doesn't have to wait a full rotation for the sector the sequential data transfer head means has missed to come by again.

Sector skew optimizes transferring information on adjacent tracks, in much the same way interleaving optimizes movement within a track. It does this by taking into account the time it takes the sequential data transfer head means to move to another track and the distance a sector will travel in that time (due to the disk's rotational speed), and then offsetting the numbering for the sectors on the next track.

The time for storval of a particular piece of data on a rotatably mounted disk means would be reduced if one or more of the seek, latency or command overhead times could be reduced or eliminated entirely.

A computer can presently perform a storval of data from a floppy disk in typically an average of 200 milliseconds (ms). Storval of data on a hard disk drive can presently be typically performed in less than 20 ms. However, they are both slow compared to RAM which presently can typically perform a storval of data in under 200 nanoseconds (ns). Presently a hard disk typically rotates at 3600 revolutions per minute (RPM) or greater while a floppy disk presently typically rotates at 360 RPM. Presently the majority of hard disks rotate at a constant speed and are always ready for use. A floppy disk is turned on an off thus slowing the time to access the data stored thereon.

Contemporary data transfer rates between a computer and hard disks now average from 5 to 30 megabits per second (Mb/s or millions of bits per second), i.e., 0.625 megabytes per second (MB/s) to 3.75 MB/s. Data transfer rates for floppy drives are much slower than for hard disks, varying between 0.2 to 0.4 Mb/s. Since contemporary computers can receive data at rates of 100 MB/s or more, it is readily apparent that the slow rate of transfer of data between the disk means and the processing means is effectuated by the disk storval method of sequentiality and the seeking of the proper location by movement of the sequential data transfer head means therefore creating a bottleneck in the overall rate of computer operation.

An I/O channel is the physical high speed pathway between the computer and a peripheral device. In large computers it can consist of a channel between the CPU and a peripheral device. In small computers it includes the controller and cable between the CPU and peripheral device. The channel is merely a pathway between a computer an a peripheral device or between two computers. This nomenclature may refer to the physical medium such as a coaxial cable or to a carrier frequency within a larger channel or wireless medium. In effect it is the logical or the physical connection between two different devices.

While the data is transferred from the disk in a serial sequential manner it is usually reassembled into a single byte for transferring over the I/O channel between the CPU and the disk. The more information that is available in byte form makes the I/O transfer between the device controller and the CPU occur in a more effective manner. If the system is I/O bound then this refers to an excessive amount of time for transferring data into and out of the computer in relation to the time it takes for processing within the computer. Faster I/O channels and disk drives will improve the performance of an I/O bound computer.

The present limit for the typical amount of data that can be stored on a standard 3.5" [8.9 cm] floppy disk is 4 MB, and the typical limit for a 5.25" [13.3 cm] is approximately 1.6 gigabytes (GB, one GB equals 1,000 MB). The use of magnetically coated tapes (tapes) for storing data is advantageous in that the cost of storing great quantities of data on tapes is relatively inexpensive when compared to the use of disks, but disks provide a much faster storval time for data than the tapes. Tapes suffer another drawback since the storval of data cannot be occur randomly as is the case for disks.

The amount of information that can be packed onto a disk is determined in part by the gap width of the read/write head. A narrower gap magnetizes a smaller area of the disk surface allowing the data tracks to be recorded much closer together. The gap of a typical slider is about 40 millionth's of an inch (1.02 $\mu$m or micrometer) wide. Thin film read/write gaps are made by depositing layers of various materials on silicon and are only about half as wide as slider gaps and increase the storage capacity of a hard disk by nearly one third.

As shown in FIG. 1, the contemporaneous operation of disk drives involves the use of a mechanism 108, 106, 104 to position the sequential data transfer head means 180-1 over a predetermined track 174 and an electric motor 110 to rotate the disk, 172. The sequential data transfer head means positioning mechanism, which may include a stepping motor 110 as shown in FIG. 1 or a voice relay coil (or servo) 208 as shown in FIG. 2, generates heat which may create operational problems for the computer and, also, is a potential source of maintenance problems.

There are two methods for sequential data transfer head means actuator movement: A stepper motor, (the type of rotational pivot used in a floppy drive); and a servo voice-coil actuator, a more efficient and accurate method.

Stepper motors use a transmission-like system to convert an incremental rotary movement into linear travel. The motor rotates either direction a few degrees at a time; connected to it is the stepper band, which converts that incremental rotary motion into linear movement, repositioning the arm and thus changing the write/read (used interchangeably for storval) sequential data transfer head means position over the disk. These motors may experience problems with precision, known as head drift, because of normal wear and tear coupled with the unadjustable mechanical nature of the motor.

Voice coils, or servos, work like common audio speakers. The sound of a loudspeaker is determined by the strength of the current passed through its magnet, which pulls on a diaphragm connected to the speaker's cone. In a hard disk drive, the current passes through a voice-coil electromagnet, which pulls the arm toward it. The arm is held back by a spring; this provides a counter-force to the magnet that automatically moves the sequential data transfer head means back when the current is decreased. The current going to the voice coil determines the position of the sequential data transfer head means over the disk, making it infinitely adjustable.

The slightest fluctuation in the electric current can cause the sequential data transfer head means to wander away from the center of the track. To prevent this, servo data is embedded on the disk between the tracks in the form of magnetic bursts known as embedded servo or wedged servo. When sensors on the sequential data transfer head means sense that the bursts are too strong, the controller knows that the sequential data transfer head means is wandering from the center of the track and adjusts the current accordingly.

Some drives place servo information at the beginning of every sector to allow for even more accuracy. Others employ doubled embedded servos, placing servo information at the beginning and middle of the sector.

Embedded servo tracks take up space on the disk and reduce its data storval capacity. Some high capacity, multiple-disk drives utilize a dedicated servo surface, in which one side of one of the disks contains only servo data, used to guide the sequential data transfer head means. The sequential data transfer head means for that surface is used solely for positioning. Because all heads are attached to the same actuator, all of the heads will be aligned and all other surfaces can be used for data.

Voice coils provides an infinite degree of positioning control; this is superior to the stepper motor, whose accuracy is limited by its incremental rotational step. By moving the sequential data transfer head means in smaller increments, the voice coil actuator can take advantage of higher density disks, which squeeze more tracks onto the same disk. They are also less susceptible to sequential data transfer head means drift. However, like in a speaker, the fabric of the cone through aging and use can become brittle, too soft, tear, etc., causing a host of different problems with age.

As shown in FIG. 1A, disks are mounted on an axle called the spindle 160. A drive may contain more than one disk, yet all disks are mounted on a single spindle. The spindle is turned by a brushless, direct drive (no gears or belts), direct-current (DC) electric motor (not shown in FIG. 1A). It may be built into the spindle, or reside below it. A flat motor below the spindle is called a pancake motor because of its flat shape. Depending on the specific drive, hard drive motors spin the disks at 3,600 RPM, which is typical, or 4,800 RPM, 5,400 RPM or 6900 RPM. With higher spindle rates comes greater noise and heat.

As previously mentioned, latency is the time it takes for a desired sector on the disk to pass underneath the sequential data transfer head means after positioning is complete by the device controller. For a disk spinning at the standard 3,600 RPM rate, average latency is 8.33 milliseconds. The faster the disk rotates, and the more data transfer heads per disk (such as shown in U.S. Pat. No. 5,010,430), the smaller the latency and the better the performance.

With the current modern hard magnetic disk storval medium, physical contact between the sequential data transfer head means and the disk must be avoided to prevent destruction of data. During operation, an air bearing created by the rotation of the disk keeps the sequential data transfer head means out of physical contact with the disk. Referring to FIG. 3, when the motor that drives the disk 372 is turned off, the sequential data transfer head means 380-1 is moved away from the active area of the disk 374 to a parking space or landing zone 338, usually located toward the center of the disk. This process is called head parking. The use of sequential data transfer head means parking reduces the chances of the sequential data transfer head means accidentally contacting the surface of the disk particularly when the unit is being transported. Elimination of accidental contact between the sequential data transfer head means and the disk is achieved through autolocking, i.e., physically locking a parked sequential data transfer head means over the landing zone.

Referring to FIG. 1, the data storval operation is performed bit by bit in a sequential manner by the magnetic sequential data transfer head means 180-1 on a circular path 174 around the disk. Referring to FIG. 4, the tracks are subdivided into sectors (like sector 444). Sectors are a logical subdivision of tracks. That is, they are a grouping of data stored on a track into separate units. This facilitates the addressing scheme for location of where the data storval is physically performed. Usually, a sector contains 4,096 bits of data, i.e., 512 bytes at 8 bits per byte stored sequentially along the direction of the track.

A sequential data transfer head means used with a disk operating at 3600 RPM has barely one thousandth (0.001) of a second to store/retrieve one sector of data. To insure that the sequential data transfer head means can keep track of its position on the disk, encoding processes have been developed. Encoding processes include timing mechanisms to correlate a disk's constant speed with the distance traveled to yield a precise calculation of the sequential data transfer head means position over the disk. Timing mechanisms include frequency modulation (FM), modified frequency modulation (MFM) and run length limited (RLL). FM requires the use of every other magnetic domain (one domain is the area required to store one bit of data, i.e., a zero and a one) to represent a clock pulse. FM uses half the disk's storval capacity for timing information. MFM moves the timing information onto a single track. MFM enables twice the magnetic data storval as FM and is known as double density recording. RLL uses a sequential data transfer head means that can create smaller magnetic domains than those used with MFM encoding. RLL also uses a code that can read 16-bit patterns of information rather than the 8-bits used by MFM. There are several RLL codes, each depends on the number of zero bits (bits are stored as zero or one) that can be stored as a consecutive string before inserting a one bit. RLL (2,7) allows two to seven consecutive bits resulting in a 50% increase in storval capacity over the standard MFM. RLL (3,9) allows three to nine consecutive bits resulting in a 100% increase in storval capacity over the standard MFM.

When data is lost, entire operations of a computer can come to a halt. Therefore, it is critical that information is archived on a regular basis in case of damage or loss to the original data. Data archiving may be achieved in a number of ways. The data may be copied onto floppy disks or backed up on a tape. Additionally, data may be saved through the use of a second hard drive which is operated either manually or with an automatic utility program. Two other ways to archive data is through disk duplexing, i.e., using one drive to duplicate the storval moves of another, and disk mirroring, i.e., using a single disk controller connected to two drives.

Several types of intermediate storval devices for storval of data have been developed within the past several years that have the advantages of floppy disks (removable storval) and the capacity of hard disks. These advances in storval mediums are known, respectively, as Winchester Removable Cartridge Drives, FIGS. 13, 13A, Bernoulli Drives, FIGS. 14, 14A, 14B, and Magneto-optic Drives, FIGS. 15, 15A.

As shown in FIGS. 13, 13A Winchester Removable Cartridge Drives are removable magnetic media drives using 5.25 inch [13.3 cm or centimeters] disk cartridges. The unit is essentially a rigid magnetically coated disk 1372 in a self contained hard plastic case (FIG. 13A) that can be inserted or removed from a chassis unit usually separate from the cpu chassis. When the cartridge is inserted, a sliding access door 1345 opens on the cartridge to allow the sequential data transfer head means 1380-1 access to the disk media 1372. The sequential data transfer head means 1380-1 floats on a cushion of air generated by the disk 1372 spinning. Thus the disk 1372 must first spin up to speed before the sequential data transfer head means 1380-1 is allowed to be moved over the disk 1372. When the encased disk is desired to be removed, first the sequential data transfer head means 1380-1 is removed from above the surface of the disk 1372 by the arm 1302, and then the disk's motor quits spinning the disk 1372. The opening of the disk then closes, and the cartridge is ejected from the drive unit. These drives are typically used for data archival, storval intensive activities and are thus popular among desktop publishing, graphic design, and multimedia persons because they can be used instead of hard drives and have the advantage of portability of information from one computer to the next. They are frequently referred to as Syquest or Ricoh cartridges, after the two main manufacturers of the cartridges. They offer data access almost as fast as some hard disk drives, and are relatively inexpensive in the speed/cost/bit comparison to other storval technologies. The do, however, suffer from questionable reliability because of the possibility of dust entering through the cartridge opening, and this increases with extensive use. They have severe shock problems of the sequential data transfer head means 1380-1 crashing onto the disk 1372 and destroying the magnetic medium of the disk 1372. This causes the disk 1372 to be unusable most of the times. The cartridges do hold a limited amount of data, dictated by the problem of fine movement of sequential data transfer head means 1380-1 and the repeatability of the location of the sequential data transfer head means 1380-1 by the arm 1304. The movement of the sequential data transfer head means is accomplished in discrete steps that is governed by the technology used for moving the arm 1304, such as a voice coil or stepper motor.

A Bernoulli drive, which uses 5.25 inch [13.3 cm] cartridges, is shown in FIGS. 14, 14A, 14B containing a flexible disk 1472 that spins within a cushion of filtered air 1454. The Bernoulli effect is observed when the velocity of a fluid, such as air, over a surface is increased and the pressure of that fluid on the surface decreases. The reduced air pressure draws the disk 1472 toward the sequential data transfer head means 1480-1, 1480-2. If a dust particle somehow enters the filter between the sequential data transfer head means 1480-1 and the disk 1472, the disk's capability to flex allows room for the particle to escape, while the filtered air 1454 blows it away. Flexing capability makes the drive less immune to a sequential data transfer head means crash (a Bernoulli drive has a shock rating of 1,000 g's). They have a similar 44/90-megabyte capacity as SyQuest units. Bernoulli drives have high reliability ratings (MTBF) as well as reasonably high marks for speed and data security. The cartridges are relatively cheap so that buying many of them will produce infinite storval capability. However, they have slightly slower speed performance than SyQuest Drives.

In FIGS. 15, 15A is shown the combination of optical and magnetic technology, the floptical media uses standard high density 3½ inch [8.9 cm] floppy diskette technology. The housing, or cartridge, is shown in FIG. 15A. The housing has a door 1545 that slides and allows access to the medium of the disk 1572 when the cartridge is inserted. A locking tab 1546 is located on the cartridge for preventing the writing of data as a security measure. When the tab 1546 is in one particular location, the disk unit senses this and disables the writing capability of the sequential data transfer head means of the drive. As in optical discs, the servo data is perforated into the disk 1572 and then used by an optical system to locate the sequential data transfer head means. This embedded servo is indelible and so cannot be destroyed or corrupted and allows the sequential data transfer head means assembly 1558 to follow the eccentricities of the media. This increases track density from typically 135 tracks per inch [342.9 tracks per cm] to over a 1,000 tracks per inch [2540 tracks per cm]. Formatted capacity is usually 20.8 megabytes, compared to a standard floppy's 1.44 MB. The magnetic data is located in between these optical grooves. The sequential data transfer head means assembly 1558 has two different sequential data transfer head means gaps 1550, 1552: a narrow gap 1552 for use with high density floptical discs and a wide gap 1550 for use with standard floppy disks. The drive senses which type of disk has been inserted and automatically uses the appropriate gap and servo system.

A more elaborate way of archiving data is by way of a technique known as RAID (redundant array of inexpensive disks). RAID comprises three elements: a disk array controller, a collection of disks and array management software which uses algorithms to distribute data across the disks and presents the array as a single virtual disk to the host operating system. RAID requires great care in building and programming and, thus, are quite expensive. RAID offers a high degree of data capacity, availability and redundancy (except level 0 which offers no redundancy). The degree of fault tolerance varies depending on the RAID level involved. All RAID levels feature redundancy (except level 0 which divides the data into blocks and interleaves or "stripes" each block across the disk drives) and can reconstruct the data stored on any single failed disk in the array from the information stored on the remaining disks.

RAID 1 is a "mirrored disk" concept featuring duplication of each disk in the array thereby increasing reliability and availability. Since the usable storval capacity of RAID 1 is 50% of the total capacity the relative cost is high. RAID 2 is a block interleave, i.e., interleaves the data across the drives, with check disk concept. RAID 2 has excellent transfer rates for large sequential data requests but does not efficiently handle frequent, short, random disk access. RAID 3 is a byte interleave concept using a single parity disk for error recovery; it uses an array of disk drives to transfer data in parallel while one redundant drive functions as the parity disk. RAID 3 is useful when there is a need for high transfer rate and high availability. RAID 4 is a bit interleave concept using an error-correcting code; it stripes the data across the many disks at the sector level rather than the byte level. RAID 4 features a single parity drive. RAID 4 outperforms RAID 3. RAID 5 is a block interleave concept with integrated check disk; it similar to RAID 0 except it offers redundancy. RAID 5 is also similar to RAID 3 except that parity is spread over the disks, more than one drive can write concurrently and it is faster when transferring small data blocks. Where data is critical, RAID should be used. Since physical damage is expensive to repair in RAID, good maintenance must be observed and care must be taken to avoid damage to the drive.

The prior Pat. No. 5,010,430, Head Slider Arrangement For Magnetic Disk Storage Device, Yanda et. al. discloses a magnetic disk storage device having the magnetic disk with the storing reproduction region form thereon and a head slider facing the disk surface with a plurality of parallel projections to generate an air bearing. The device makes is feasible to increase the number of heads per disk and to reduce the seek distance without increasing the weight of the head actuator. It further discloses a parallel system of circular grooves that are tangent to the tracks of a disk for providing an air bearing surface. As shown by device 91, in FIG. 17 of the aforesaid patent, this air bearing is created by the airflow through the head 91 from the movement of the disk platter. Our invention differs from this concept by using a forced air flow by a forced air means to force air flow along the radial direction of the platter. The air flow of our invention causes a positive pressure of air to flow away from the heads and cause any particles of dust to be directed away from the heads instead of moving towards the heads. This makes the device of our patent a self cleaning device.

Furthermore, Pat. No. 5,010,430, in column 2 lines 3 through 9, discloses that in a conventional magnetic disk storage device the relative speed between an air bearing surface of the head slider and a rotating magnetic disk is proportionate to the distance of the center of rotation of the magnetic disk to the air bearing section. The floating force generated in the air bearing section is relatively increased as the speed raises. This is different from the device of our invention.

In addition, the invention of the Pat. No. 5,010,430 uses a head floating above the disk that is moved by an actuator arm over the proper track of information. Pat. No. 5,010,430 involves a device that positions itself over different locations on the disk platter and responds to a servo position signal as indicated in column 12 lines 25 through 35, whereas ours does not, since ours is fixed in a predetermined location.

As an additional difference Pat. No. 5,010,430 does not disclose a method of reading all 8 data bits from the 8 heads at once and does not disclose any information on how the information is retrieved or stored on the data disk platter.

U.S. Pat. No. 5,084,781 to Kamo et. al., Parallel Transfer Type Disk System, discloses a parallel transfer disk system comprising of an arrangement of a plurality of disks storing a single bit of a byte by a sequential method on a track of each said disk. Thus data is converted from parallel in the computer to serial storage on the disk. When the information is retrieved it is retrieved in a serial fashion from each disk and sent back to the computer in a parallel manner of a single byte. As a further distinction U.S. Pat. No. 5,084,781 does not disclose a mass transfer of a plurality of bytes to a single disk platter surface in a concurrent manner.

U.S. Pat. No. 5,161,137, Disk Apparatus With A Plurality Of Heads, discloses an optical disk apparatus comprising of a plurality of heads for performing erasure of information from recorded information on an optical disk. However, each of the heads is moveable and consists of a head drive system for driving the heads so as to move the heads to a target track on the disk. The apparatus of our invention differs from this patent since the data transfer head means of our invention can also be an optical switch network incorporated with a laser light source.

SUMMARY OF THE INVENTION

Accordingly, besides the objects and advantages of the data storval devices described in the above patent, several objects and advantages of the present invention are:

(1) to provide a method of simultaneous storval of a plurality of bits of data on a disk means comprising the steps of providing a rotatably mounted disk means having a data storval area; providing a data transfer means having a plurality of data transfer transducer means for transferring data between said data transfer means and said data storval area, each one of said plurality of data transfer transducer means for transferring data being fixed at a different predetermined location relative to the center of rotation of said disk means, and extending generally across said data storval area in data transfer relationship thereto; rotating said disk means; and transferring simultaneously a plurality of bits of data between said plurality of data transfer transducer means for transferring data and said data storval area;

(2) to provide a method as aforedescribed including the step of providing signal means for signaling the location on the data storval area of the plurality of the bits of data to be transferred between said data transfer means and said data storval area;

(3) to provide a method as aforedescribed including the step of transferring simultaneously each of the bits of data in a predetermined sequence;

(4) to provide a method as aforedescribed in which the step of providing a rotatably mounted disk means includes providing a rotatably mounted disk means having a magnetic data storval area;

(5) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality of data transfer transducer means for transferring simultaneously data between said data transfer means and said data storval area, the number of said data transfer transducer means for transferring data between said data transfer means and said data storval area being greater adjacent the outer periphery of said data storval area than the inner periphery of said data storval area;

(6) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality of data transfer transducer means for transferring data between said data transfer means and said data storval area, said plurality of data transfer transducer means for transferring data being encompassed within a generally wedged-shaped configuration having an inner periphery coinciding with a portion of the inner periphery of said data storval area, an outer periphery coinciding with a portion of the outer periphery of said data storval area, and sides diverging in a direction proceeding from said inner periphery to said outer periphery, the sides of said wedge-shaped configuration subtending an angle equal to at least approximately the width of a domain occupied by a bit of data;

(7) to provide a method as aforedescribed in which the step of providing a data transfer means includes providing a data transfer means having a first and a second plurality of data transfer transducer means for transferring data between said transfer means and said data storval area, said first plurality of data transfer transducer means for transferring data being angularly spaced from said second plurality data transfer transducer means for transferring data by approximately 180°;

(8) to provide a method as aforedescribed in which the step of providing a data transfer means includes providing a data transfer means having a first, second and third plurality of data transfer transducer means for transferring data between said data transfer means and said data storval area, said first, second and third plurality of data transfer transducer means for transferring data being equally angularly spaced around said data storval area;

(9) to provide a method as aforedescribed in which the step of providing a data transfer means includes providing a first, second, third and fourth plurality of data transfer transducer means for transferring data between said data transfer means and said data storval area, said first, second, third and fourth plurality of data transfer transducer means for transferring data being equally angularly spaced around said data storval area;

(10) to provide a method as aforedescribed in which the step of providing a rotatably mounted disk means includes providing a rotatably mounted disk means having a data storval area including a reflective surface, and the step of providing a data transfer means including providing a data transfer means having a plurality of light carrying data transfer transducer means for transferring data between said data transfer means and the reflective surface of said data storval area;

(11) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality for transferring data between said data transfer means and said data storval area, the number of said data transfer transducer means for transferring data between said data transfer means and said data storval area being greater adjacent the outer periphery of said data storval area than the inner periphery of said data storval area;

(12) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality of data transfer transducer means for transferring data between said data transfer means and said data storval area, said plurality of data transfer transducer means for transferring data being encompassed within a generally wedged-shaped configuration having an inner periphery coinciding with a portion of the inner periphery of said data storval area, and outer periphery coinciding with a portion of the outer periphery of said data storval area, and sides diverging in a direction proceeding from said inner periphery to said outer periphery, the sides of said wedge-shaped configuration subtending an angle equal to at least approximately the width of a domain occupied by a bit of data;

(13) to provide a method as aforedescribed in which the step of providing a data transfer means includes providing a data transfer means having a first and a second plurality of data transfer transducer means for transferring data between said transfer means and said data storval area, said first plurality of data transfer transducer means for transferring data being angularly spaced from said second plurality data transfer transducer means for transferring data by approximately 180°;

(14) to provide a method as aforedescribed in which the step of providing a data transfer means includes providing a data transfer means having a first, second and third plurality of data transfer transducer means for transferring data between said data transfer means and said data storval area, said first, second and third plurality of data transfer transducer means for transferring data being equally angularly spaced around said data storval area;

(15) to provide a method as aforedescribed in which the step of providing a data transfer means includes providing a first, second, third and fourth plurality of data transfer transducer means for transferring data between said data transfer means and said data storval area, said first, second, third and fourth plurality of data transfer transducer means for transferring data being equally angularly spaced around said data storval area;

(16) to provide a method as aforedescribed in which the step of providing a rotatably mounted disk means includes providing a rotatably mounted disk means having a magnetic data storval area;

(17) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality for transferring data between said data transfer means and said data storval area, the number of said data transfer transducer means for transferring data between said data transfer means and said data storval area being greater adjacent the outer periphery of said data storval area than the inner periphery of said data storval area;

(18) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality of data transfer transducer means for transferring data between said data transfer means and said data storval area, said plurality of data transfer transducer means for transferring data being encompassed within a generally wedged-shaped configuration having an inner periphery coinciding with a portion of the inner periphery of said data storval area, and outer periphery coinciding with a portion of the outer periphery of said data storval area, and sides diverging in a direction proceeding from said inner periphery to said outer periphery, the sides of said wedge-shaped configuration subtending an angle equal to at least approximately the width of a domain occupied by a bit of data;

(19) to provide a method as aforedescribed in which the step of providing a data transfer means includes providing a data transfer means having a first and a second plurality of data transfer transducer means for transferring data between said transfer means and said data storval area, said first plurality of data transfer transducer means for transferring data being angularly spaced from said second plurality data transfer transducer means for transferring data by approximately 180°;

(20) to provide a method as aforedescribed in which the step of providing a data transfer means includes providing a data transfer means having a first, second and third plurality of data transfer transducer means for transferring data between said data transfer means and said data storval area, said first, second and third plurality of data transfer transducer means for transferring data being equally angularly spaced around said data storval area;

(21) to provide a method as aforedescribed in which the step of providing a data transfer means includes providing a first, second, third and fourth plurality of data transfer transducer means for transferring data between said data transfer means and said data storval area, said first, second, third and fourth plurality of data transfer transducer means for transferring data being equally angularly spaced around said data storval area;

(22) to provide a method as aforedescribed in which the step of providing a rotatably mounted disk means includes providing a rotatably mounted disk means having a data storval area including a reflective surface, and the step of providing a data transfer means including providing a data transfer means having a plurality of light carrying data transfer transducer means for transferring data between said data transfer means and the reflective surface of said data storval area;

(23) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality for transferring data between said data transfer means and said data storval area, the number of said data transfer transducer means for transferring data between said data transfer means and said data storval area being greater adjacent the outer periphery of said data storval area than the inner periphery of said data storval area;

(24) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality of data transfer transducer means for transferring data between said data transfer means and said data storval area, said plurality of data transfer transducer means for transferring data being encompassed within a generally wedged-shaped configuration having an inner periphery coinciding with a portion of the inner periphery of said data storval area, and outer periphery coinciding with a portion of the outer periphery of said data storval area, and sides diverging in a direction proceeding from said inner periphery to said outer periphery, the sides of said wedge-shaped configuration subtending an angle equal to at least approximately the width of a domain occupied by a bit of data;

(25) to provide a method as aforedescribed in which the step of providing a data transfer means includes providing a data transfer means having a first and a second plurality of data transfer transducer means for transferring data between said transfer means and said data storval area, said first plurality of data transfer transducer means for transferring data being angularly spaced from said second plurality data transfer transducer means for transferring data by approximately 180°;

(26) to provide a method as aforedescribed in which the step of providing a data transfer means includes providing a data transfer means having a first, second and third plurality of data transfer transducer means for transferring data between said data transfer means and said data storval area, said first, second and third plurality of data transfer transducer means for transferring data being equally angularly spaced around said data storval area;

(27) to provide a method as aforedescribed in which the step of providing a data transfer means includes providing a first, second, third and fourth plurality of data transfer transducer means for transferring data between said data transfer means and said data storval area, said first, second, third and fourth plurality of data transfer transducer means for transferring data being equally angularly spaced around said data storval area;

(28) to provide a system for simultaneous storval of a plurality of bits of data on a disk means comprising: a rotatably mounted disk means having a data storval area; means for rotating said disk means; and a data transfer means having a plurality of data transfer transducer means for transferring simultaneously a plurality of bits of data between said data transfer means and said data storval area, each one of said plurality of data transfer transducer means for transferring data being fixed at a different predetermined location relative to the center of rotation of said disk means and extending generally across said data storval area in data transfer relationship thereto;

(29) to provide a system as aforedescribed including signal means for signaling the location on the data storval area of the plurality of bits of data to be transferred between said data transfer means and said data storval area;

(30) to provide a system as aforedescribed including data transfer transducer means for transferring simultaneously each of the bits of data in a predetermined sequence;

(31) to provide a system as aforedescribed in which the rotatably mounted disk means has a magnetic data storval area;

(32) to provide a system as aforedescribed in which the rotatably mounted disk means has a data storval area having an inner periphery and an outer periphery, the data transfer means includes a plurality of data transfer transducer means for transferring simultaneously data between said data transfer means and said data storval area, the number of said data transfer transducer means for transferring data between said data transfer means and said data storval area being greater adjacent the outer periphery of said data storval area than the inner periphery of said data storval area;

(33) to provide a system as aforedescribed in which said rotatably mounted disk means has a data storval area having an inner periphery and an outer periphery, said data transfer means including a plurality of data transfer transducer means for transferring simultaneously data between said data transfer means and said data storval area, said plurality of data transfer transducer means for transferring data being encompassed within a generally wedge-shaped configuration having an inner periphery coinciding with a portion of the inner periphery of said data storval area, an outer peripheral coinciding with a portion of the outer periphery of said data storval area, and sides diverging in a direction proceeding from the inner periphery to the outer periphery, the sides of said wedge shaped configuration subtending an angle equal to at least the width of a domain occupied by a bit of data;

(34) to provide a system as aforedescribed in which the data transfer means includes a first and second plurality of data transfer transducer means for transferring data between said data transfer means and said data storval area, said first plurality for transferring data being angularly spaced from said second plurality of data transfer transducer means for transferring data by approximately 180°;

(35) to provide a system as aforedescribed in which the data transfer means includes a first, second and third plurality of data transfer transducer means for transferring data between said data transfer means and said data storval area, said first, second and third plurality of data transfer transducer means for transferring data being equally angularly spaced around said data storval area;

(36) to provide a system as aforedescribed in which the data transfer means includes a first second, third and fourth plurality of data transfer transducer means for transferring data between said data transfer means and said data storval area, said first, second, third and fourth plurality of data transfer transducer means for transferring data being equally angularly spaced around said data storval area;

(37) to provide a system as aforedescribed in which the rotatably mounted disk means includes a data storval area having a reflective surface, and the data transfer means includes a plurality of light carrying data transfer transducer means for transferring data between said data transfer means and the reflective surface of said data storval area;

(38) to provide a system as aforedescribed in which the rotatably mounted disk means has a data storval area having an inner periphery and an outer periphery, the data transfer means includes a plurality of data transfer transducer means for transferring simultaneously data between said data transfer means and said data storval area, the number of said data transfer transducer means for transferring data between said data transfer means and said data storval area being greater adjacent the outer periphery of said data storval area than the inner periphery of said data storval area;

(39) to provide a system as aforedescribed in which said rotatably mounted disk means has a data storval area having an inner periphery and an outer periphery, said data transfer means including a plurality of data transfer transducer means for transferring simultaneously data between said data transfer means and said data storval area, said plurality of data transfer transducer means for transferring data being encompassed within a generally wedge-shaped configuration having an inner periphery coinciding with a portion of the inner periphery of said data storval area, an outer periphery coinciding with a portion of the outer periphery of said data storval area, and sides diverging in a direction proceeding from the inner periphery to the outer periphery, the sides of said wedge shaped configuration subtending an angle equal to at least the width of a domain occupied by a bit of data;

(40) to provide a system as aforedescribed in which the data transfer means includes a first and second plurality of data transfer transducer means for transferring data between said data transfer means and said data storval area, said first plurality for transferring data being angularly spaced from said second plurality of data transfer transducer means for transferring data by approximately 180°;

(41) to provide a system as aforedescribed in which the data transfer means includes a first, second and third plurality of data transfer transducer means for transferring data between said data transfer means and said data storval area, said first, second and third plurality of data transfer transducer means for transferring data being equally angularly spaced around said data storval area;

(42) to provide a system as aforedescribed in which the data transfer means includes a first, second, third and fourth plurality of data transfer transducer means for transferring data between said data transfer means and said data storval area, said first, second, third and fourth plurality of data transfer transducer means for transferring data being equally angularly spaced around said data storval area;

(43) to provide a system as aforedescribed in which the rotatably mounted disk means has a magnetic data storval area;

(44) to provide a system as aforedescribed in which the rotatably mounted disk means has a data storval area having an inner periphery and an outer periphery, the data transfer means includes a plurality of data transfer transducer means for transferring simultaneously data between said data transfer means and said data storval area, the number of said data transfer transducer means for transferring data between said data transfer means and said data storval area being greater adjacent the outer periphery of said data storval area than the inner periphery of said data storval area;

(45) to provide a system as aforedescribed in which said rotatably mounted disk means has a data storval area having an inner periphery and an outer periphery, said data transfer means including a plurality of data transfer transducer means for transferring simultaneously data between said data transfer means and said data storval area, said plurality of data transfer transducer means for transferring data being encompassed within a generally wedge-shaped configuration having an inner periphery coinciding with a portion of the inner periphery of said data storval area, an outer periphery coinciding with a portion of the outer periphery of said data storval area, and sides diverging in a direction proceeding from the inner periphery to the outer periphery, the sides of said wedge shaped configuration subtending an angle equal to at least the width of a domain occupied by a bit of data;

(46) to provide a system as aforedescribed in which the data transfer means includes a first and second plurality of data transfer transducer means for transferring data between said data transfer means and said data storval area, said first plurality for transferring data being angularly spaced from said second plurality of data transfer transducer means for transferring data by approximately 180°;

(47) to provide a system as aforedescribed in which the data transfer means includes a first, second and third plurality of data transfer transducer means for transferring data between said data transfer means and said data storval area, said first, second and third plurality of data transfer transducer means for transferring data being equally angularly spaced around said data storval area;

(48) to provide a system as aforedescribed in which the data transfer means includes a first, second, third and fourth plurality of data transfer transducer means for transferring data between said data transfer means and said data storval area, said first, second, third and fourth plurality of data transfer transducer means for transferring data being equally angularly spaced around said data storval area;

(49) to provide a system as aforedescribed in which the rotatably mounted disk means includes a data storval area having a reflective surface, and the data transfer means includes a plurality of light carrying data transfer transducer means for transferring data between said data transfer means and the reflective surface of said data storval area;

(50) to provide a system as aforedescribed in which the rotatably mounted disk means has a data storval area having an inner periphery and an outer periphery, the data transfer means includes a plurality of data transfer transducer means for transferring simultaneously data between said data transfer means and said data storval area, the number of said data transfer transducer means for transferring data between said data transfer means and said data storval area being greater adjacent the outer periphery of said data storval area than the inner periphery of said data storval area;

(51) to provide a system as aforedescribed in which said rotatably mounted disk means has a data storval area having an inner periphery and an outer periphery, said data transfer means including a plurality of data transfer transducer means for transferring simultaneously data between said data transfer means and said data storval area, said plurality of data transfer transducer means for transferring data being encompassed within a generally wedge-shaped configuration having an inner periphery coinciding with a portion of the inner periphery of said data storval area, an outer periphery coinciding with a portion of the outer periphery of said data storval area, and sides diverging in a direction proceeding from the inner periphery to the outer periphery, the sides of said wedge shaped configuration subtending an angle equal to at lest the width of a domain occupied by a bit of data;

(52) to provide a system as aforedescribed in which the data transfer means includes a first and second plurality of data transfer transducer means for transferring data between said data transfer means and said data storval area, said first plurality for transferring data being angularly spaced from said second plurality of data transfer transducer means for transferring data by approximately 180°;

(53) to provide a system as aforedescribed in which the data transfer means includes a first, second and third plurality of data transfer transducer means for transferring data between said data transfer means and said data storval area, said first, second and third plurality of data transfer transducer means for transferring data being equally angularly spaced around said data storval area;

(54) to provide a system as aforedescribed in which the data transfer means includes a first, second, third and fourth plurality of data transfer transducer means for transferring data between said data transfer means and said data storval area, said first, second, third and fourth plurality of data transfer transducer means for transferring data being equally angularly spaced around said data storval area;

(55) to provide a method of simultaneous storval of a plurality of bits of data on a disk means comprising the steps of providing a rotatably mounted spherically-shaped means having a data storval area; providing a data transfer means having a plurality of data transfer transducer means for transferring data between said data transfer means and said data storval area, each one of said plurality of data transfer transducer means for transferring data being fixed at a different predetermined location relative to the center of rotation of said spherically-shaped means and extending generally across said data storval area in data transfer relationship thereto; rotating said spherically-shaped means; and transferring simultaneously a plurality of bits of data between said plurality of data transfer transducer means for transferring data and said data storval area;

(56) to provide a method as aforedescribed including the step of providing signal means for signaling the location on the data storval area of the plurality of the bits of data to be transferred between said data transfer means and said data storval area;

(57) to provide a method as aforedescribed including the step of transferring simultaneously each of the bits of data in a predetermined sequence;

(58) to provide a method as aforedescribed in which the step of providing a rotatably mounted disk means includes providing a rotatably mounted disk means having a magnetic data storval area;

(59) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality for transferring data between said data transfer means and said data storval area, the number of said data transfer transducer means for transferring data between said data transfer means and said data storval area being greater adjacent the outer periphery of said data storval area than the inner periphery of said data storval area;

(60) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality of data transfer transducer means for transferring data between said data transfer means and said data storval area, said plurality of data transfer transducer means for transferring data being encompassed within a generally wedged-shaped configuration having an inner periphery coinciding with a portion of the inner periphery of said data storval area, and outer periphery coinciding with a portion of the outer periphery of said data storval area, and sides diverging in a direction proceeding from said inner periphery to said outer periphery, the sides of said wedge-shaped configuration subtending an angle equal to at least approximately the width of a domain occupied by a bit of data;

(61) to provide a method as aforedescribed in which the step of providing a data transfer means includes providing a data transfer means having a first and a second plurality of data transfer transducer means for transferring data between said transfer means and said data storval area, said first plurality of data transfer transducer means for transferring data being angularly spaced from said second plurality data transfer transducer means for transferring data by approximately 180° and encompass, at the inner periphery of each zone, the width of the domain occupied by a bit of data;

(62) to provide a method as aforedescribed in which the step of providing a data transfer means includes providing a data transfer means having a first, second and third plurality of data transfer transducer means for transferring data between said data transfer means and said data storval area, said first, second and third plurality of data transfer transducer means for transferring data being equally angularly spaced around said data storval area;

(63) to provide a method as aforedescribed in which the step of providing a data transfer means includes providing a first, second, third and fourth plurality of data transfer transducer means for transferring data between said data transfer means and said data storval area, said first, second, third and fourth plurality of data transfer transducer means for transferring data being equally angularly spaced around said data storval area;

(64) to provide a method as aforedescribed in which the step of providing a rotatably mounted disk means includes providing a rotatably mounted disk means having a data storval area including a reflective surface, and the step of providing a data transfer means including providing a data transfer means having a plurality of light carrying data transfer transducer means for transferring data between said data transfer means and the reflective surface of said data storval area;

(65) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality for transferring data between said data transfer means and said data storval area, the number of said data transfer transducer means for transferring data between said data transfer means and said data storval area being greater adjacent the outer periphery of said data storval area than the inner periphery of said data storval area;

(66) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality of data transfer transducer means for transferring data between said data transfer means and said data storval area, said plurality of data transfer transducer means for transferring data being encompassed within a generally wedged-shaped configuration having an inner periphery coinciding with a portion of the inner periphery of said data storval area, and outer periphery coinciding with a portion of the outer periphery of said data storval area, and sides diverging in a direction proceeding from said inner periphery to said outer periphery, the sides of said wedge-shaped configuration subtending an angle equal to at least approximately the width of a domain occupied by a bit of data;

(67) to provide a system as aforedescribed in which the data transfer means includes a first and second plurality of data transfer transducer means for transferring data between said data transfer means and said data storval area, said first plurality for transferring data being angularly spaced from said second plurality of data transfer transducer means for transferring data by approximately 180°;

(68) to provide a system as aforedescribed in which the data transfer means includes a first, second and third plurality of data transfer transducer means for transferring data between said data transfer means and said data storval area, said first, second and third plurality of data transfer transducer means for transferring data being equally angularly spaced around said data storval area;

(69) to provide a system as aforedescribed in which the data transfer means includes a first, second, third and fourth plurality of data transfer transducer means for transferring data between said data transfer means and said data storval area, said first, second, third and fourth plurality of data transfer transducer means for transferring data being equally angularly spaced around said data storval area;

(70) to provide a method of transferring simultaneously a plurality of bytes of data comprising the steps of providing a rotatably mounted disk means having a data storval area; providing a data transfer means having a plurality of data transfer transducer means for transferring data between said data transfer means and said data storval area, each one of said plurality of data transfer transducer means for transferring data being fixed at a different predetermined location relative to the center of rotation of said disk means and extending generally across said data storval area in data transfer relationship thereto; rotating said disk means; and transferring simultaneously a plurality of bytes of data between said plurality for transferring data and said data storval area;

(71) to provide a method as aforedescribed including the step of providing signal means for signaling the location on the data storval area of the plurality of the bytes of data to be transferred between said data transfer means and said data storval area;

(72) to provide a method as aforedescribed including the step of transferring simultaneously each of the bytes of data in a predetermined sequence;

(73) to provide a method as aforedescribed in which the step of providing a rotatably mounted disk means includes providing a rotatably mounted disk means having a magnetic data storval area;

(74) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality for transferring data between said data transfer means and said data storval area, the number of said data transfer transducer means for transferring data between said data transfer means and said data storval area being greater adjacent the outer periphery of said data storval area than the inner periphery of said data storval area;

(75) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality of data transfer transducer means for transferring data between said data transfer means and said data storval area, said plurality of data transfer transducer means for transferring data being encompassed within a generally wedged-shaped configuration having an inner periphery coinciding with a portion of the inner periphery of said data storval area, and outer periphery coinciding with a portion of the outer periphery of said data storval area, and sides diverging in a direction proceeding from said inner periphery to said outer periphery, the sides of said wedge-shaped configuration subtending an angle equal to at least approximately the width of a domain occupied by a bit of data;

(76) to provide a method as aforedescribed in which the step of providing a data transfer means includes providing a data transfer means having a first and a second plurality of data transfer transducer means for transferring data between said transfer means and said data storval area, said first plurality of data transfer transducer means for transferring data being angularly spaced from said second plurality data transfer transducer means for transferring data by approximately 180° and encompass, at the inner periphery of each zone, the width of the domain occupied by a bit of data;

(77) to provide a method as aforedescribed in which the step of providing a data transfer means includes providing a data transfer means having a first, second and third plurality of data transfer transducer means for transferring data between said data transfer means and said data storval area, said first, second and third plurality of data transfer transducer means for transferring data being equally angularly spaced around said data storval area;

(78) to provide a method as aforedescribed in which the step of providing a data transfer means includes providing a first, second, third and fourth plurality of data transfer transducer means for transferring data between said data transfer means and said data storval area, said first, second, third and fourth plurality of data transfer transducer means for transferring data being equally angularly spaced around said data storval area;

(79) to provide a method as aforedescribed in which the step of providing a rotatably mounted disk means includes providing a rotatably mounted disk means having a data storval area including a reflective surface, and the step of providing a data transfer means including providing a data transfer means having a plurality of light carrying data transfer transducer means for transferring data between said data transfer means and the reflective surface of said data storval area;

(80) to provide a method as aforedescribed in which the step of providing a rotatably mounted disk means includes providing a rotatably mounted disk means having a data storval area having an inner periphery and an outer periphery, and the step of providing a data transfer means includes providing a data transfer means having a plurality of data transfer transducer means for transferring data between said data transfer means and said data storval area, said plurality of data transfer transducer means for transferring data being encompassed within a generally wedged-shaped configuration having an inner periphery coinciding with a portion of the inner periphery of said data storval area, and outer periphery coinciding with a portion of the outer periphery of said data storval area, and sides diverging in a direction proceeding from said inner periphery to said outer periphery, the sides of said wedge-shaped configuration subtending an angle equal to at least approximately the width of a domain occupied by a bit of data;

(81) to provide a method as aforedescribed in which the step of providing a data transfer means includes providing a data transfer means having a first and a second plurality of data transfer transducer means for transferring data between said transfer means and said data storval area, said first plurality of data transfer transducer means for transferring data being angularly spaced from said second plurality data transfer transducer means for transferring data by approximately 180°;

(82) to provide a method as aforedescribed in which the step of providing a data transfer means includes providing a data transfer means having a first, second and third plurality of data transfer transducer means for transferring data between said data transfer means and said data storval area, said first, second and third plurality of data transfer transducer means for transferring data being equally angularly spaced around said data storval area;

(83) to provide a method as aforedescribed in which the step of providing a data transfer means includes providing a first, second, third and fourth plurality of data transfer transducer means for transferring data between said data transfer means and said data storval area, said first, second, third and fourth plurality of data transfer transducer means for transferring data being equally angularly spaced around said data storval area;

(84) to provide a system for simultaneous storval of a plurality of bits of data on a disk means comprising a rotatably mounted, spherically-shaped means having data storval area; a data transfer means having a plurality of data transfer transducer means for transferring data between said data transfer means and said storval area, each one of said plurality of data transfer transducer means for transferring data being fixed at a different predetermined location relative to the center of rotation of said spherically shaped means and extending across said data storval area and data transfer relationship thereto; rotating said spherically-shaped means; transferring simultaneously a plurality of bits of data between said plurality of data transfer transducer means for transferring data and said data storval area;

(85) to provide a system as aforedescribed including signal means for signaling the location on the data storval area of the bits of data to be transferred between said data transfer means and said data storval area;

(86) to provide a system as aforedescribed including data transfer transducer means for transferring simultaneously each of the bits of data in a predetermined sequence;

(87) to provide a system as aforedescribed in which the rotatably mounted disk means has a magnetic data storval area;

(88) to provide a system as aforedescribed in which the rotatably mounted disk means has a data storval area having an inner periphery and an outer periphery, the data transfer means includes a plurality of data transfer transducer means for transferring simultaneously data between said data transfer means and said data storval area, the number of said data transfer transducer means for transferring data between said data transfer means and said data storval area being greater adjacent the outer periphery of said data storval area than the inner periphery of said data storval area;

(89) to provide a system as aforedescribed in which said rotatably mounted disk means has a data storval area having an inner periphery and an outer periphery, said data transfer means including a plurality of data transfer transducer means for transferring simultaneously data between said data transfer means and said data storval area, said plurality of data transfer transducer means for transferring data being encompassed within a generally wedge-shaped configuration having an inner periphery coinciding with a portion of the inner periphery of said data storval area, an outer periphery coinciding with a portion of the outer periphery of said data storval area, and sides diverging in a direction proceeding from the inner periphery to the outer periphery, the sides of said wedge shaped configuration subtending an angle equal to at least the width of a domain occupied by a bit of data;

(90) to provide a system as aforedescribed in which the data transfer means includes a first and second plurality of data transfer transducer means for transferring data between said data transfer means and said data storval area, said first plurality for transferring data being angularly spaced from said second plurality of data transfer transducer means for transferring data by approximately 180°;

(91) to provide a system as aforedescribed in which the data transfer means includes a first, second and third plurality of data transfer transducer means for transferring data between said data transfer means and said data storval area, said first, second and third plurality of data transfer transducer means for transferring data being equally angularly spaced around said data storval area;

(92) to provide a system as aforedescribed in which the data transfer means includes a first, second, third and fourth plurality of data transfer transducer means for transferring data between said data transfer means and said data storval area, said first, second, third and fourth plurality of data transfer transducer means for transferring data being equally angularly spaced around said data storval area;

(93) to provide a system as aforedescribed in which the rotatably mounted disk means includes a data storval area having a reflective surface, and the data transfer means includes a plurality of light carrying data transfer transducer means for transferring data between said data transfer means and the reflective surface of said data storval area;

(94) to provide a system as aforedescribed in which the rotatably mounted disk means has a data storval area having an inner periphery and an outer periphery, the data transfer means includes a plurality of data transfer transducer means for transferring simultaneously data between said data transfer means and said data storval area, the number of said data transfer transducer means for transferring data between said data transfer means and said data storval area being greater adjacent the outer periphery of said data storval area than the inner periphery of said data storval area;

(95) to provide a system as aforedescribed in which said rotatably mounted disk means has a data storval area having an inner periphery and an outer periphery, said data transfer means including a plurality of data transfer transducer means for transferring simultaneously data between said data transfer means and said data storval area, said plurality of data transfer transducer means for transferring data being encompassed within a generally wedge-shaped configuration having an inner periphery coinciding with a portion of the inner periphery of said data storval area, an outer periphery coinciding with a portion of the outer periphery of said data storval area, and sides diverging in a direction proceeding from the inner periphery to the outer periphery, the sides of said wedge shaped configuration subtending an angle equal to at least the width of a domain occupied by a bit of data;

(96) to provide a system as aforedescribed in which the data transfer means includes a first and second plurality of data transfer transducer means for transferring data between said data transfer means and said data storval area, said first plurality for transferring data being angularly spaced from said second plurality of data transfer transducer means for transferring data by approximately 180°;

(97) to provide a system as aforedescribed in which the data transfer means includes a first, second and third plurality of data transfer transducer means for transferring data between said data transfer means and said data storval area, said first, second and third plurality of data transfer transducer means for transferring data being equally angularly spaced around said data storval area;

(98) to provide a system as aforedescribed in which the data transfer means includes a first, second, third and fourth plurality of data transfer transducer means for transferring data between said data transfer means and said data storval area, said first, second, third and fourth plurality of data transfer transducer means for transferring data being equally angularly spaced around said data storval area;

(99) to provide a method of increasing the density of data stored on a data storval area, comprising the steps of providing a rotatably mounted disk means containing a data storval area; providing a data transfer means containing a plurality of data transfer transducer means for transferring data between said data transfer means and said disk means, said plurality of data transfer transducer means for transferring data extending generally across said data storval area and disposed in data transfer relationship relative to said data storval area; rotating said data storval area past said data transfer transducer means for transferring data; providing a signal means for signaling on said data storval area the location of the plurality of bits of data to be transferred between said data transfer means and said data storval area and transferring a plurality of bits of data between said plurality of data transfer transducer means for transferring data and said data storval area;

(100) to provide a disk means constructed to be mounted for rotation in a data transfer system and having a data storval area formed thereon, said data storval area having an inner periphery and an outer periphery, said disk means having a plurality of generally wedge-shaped zones formed thereon, each wedged shaped zone having means associated therewith identifying each said zone, each zone extending from the inner periphery to the outer periphery, each zone containing a plurality of bits of data, the sides of each zone diverging in a direction proceeding from the inner periphery to the outer periphery, the included angle formed by the diverging sides of each zone subtending an angle of a size to encompass, at the inner periphery of each zone, at least the width of the domain occupied by a bit of data;

(101) to provide a disk means as aforedescribed in which the outer periphery of said data storval area is more than twice the length of the inner periphery, and the density of data contained within each zone is greater adjacent the outer periphery than adjacent the inner periphery of each zone;

(102) to provide a method of increasing the density of data stored on a data storval area, comprising the steps of providing a rotatably mounted disk means containing a data storval area having an inner periphery and an outer periphery, said outer periphery being more than twice the length of said inner periphery; providing a data transfer means containing a plurality of data transfer transducer means for transferring data, said data transfer transducer means for transferring data being formed in a Y-shaped configuration, said Y-shaped configuration extending from the inner periphery to the outer periphery of said data storval area and disposed in data transfer relationship to said data storval area, each data transfer transducer means for transferring data disposed in the trunk and in the arms of said Y-shaped configuration, being separated by an amount equal to the domain occupied by a bit of stored data, and the distance separating each arm of said Y-shaped configuration equaling the diameter of the domain occupied by a bit of stored data, the trunk of the Y-shaped configuration being disposed adjacent the inner periphery of the data storval area and extending generally across said data storval area, the arms of said Y-shaped configuration being disposed adjacent the outer periphery of the data storval area and extending generally across said data storval area; and rotating said data storval area past the data transfer transducer means for transferring data contained in each Y-shaped configuration and transferring simultaneously a plurality of bits of data between said data transfer transducer means for transferring data and said data storval area;

(103) to provide a method of simultaneous storval of a plurality of bits of data on a disk means comprising the steps of providing a disk means having an annular shaped data storval area formed on at least one side thereof; providing a data transfer means having a plurality of data transfer transducer means for transferring data between said data transfer means and said data storval area, each one of said plurality of data transfer transducer means for transferring data being fixed at a different predetermined location relative to the center of rotation of said disk means and extending generally across said data storval area in data transfer relationship thereto; effecting movement between the data storval area between said disk means and said data transfer transducer means for transferring data; transferring simultaneously a plurality of bits of data between said plurality of data transfer transducer means for transferring data and said data storval area;

(104) to provide a method as aforedescribed including the step of providing signal means for signaling the location on the data storval area of the plurality of the bits of data to be transferred between said data transfer means and said data storval area;

(105) to provide a method as aforedescribed including the step of transferring simultaneously each of the bits of data in a predetermined sequence;

(106) to provide an apparatus for simultaneous storval of a plurality of bits of data on a disk means comprising a disk means having an annular data storval area formed on one side thereof; a data transfer means having a plurality of data transfer transducer means for transferring simultaneously a plurality of bits of data between said data transfer means and said data storval area, each one of said plurality of data transfer transducer means for transferring data being fixed at a different predetermined location relative to the center of rotation of said disk means and extending generally across said data storval area in data transfer relationship thereto; and means for effecting movement between the data storval area formed on said disk means and said data transfer transducer means for transferring simultaneously a plurality of bits of data;

(107) to provide an apparatus as aforedescribed including signal means for signaling the location on the data storval area of the plurality of bits of data to be transferred between said data transfer means and said data storval area;

(108) to provide an apparatus as aforedescribed including data transfer transducer means for transferring simultaneously each of the bits of data in a predetermined sequence;

(109) to provide a simultaneous data transfer head means for use in a data transfer system utilizing a rotatably mounted disk means having a data storval area formed thereon, comprising a plurality of sets of data transfer transducer means for transferring simultaneously a plurality of bytes of data to and from the data storval area formed on the rotatably mounted disk means; and means for sensing the position of a predetermined portion of the data storval area relative to said plurality of sets of means during rotation of said disk means;

(110) to provide a disk means having a data storval area formed thereon, said data storval area having data stored thereon at a density of approximately 100 MB/in2 or greater;

(111) to provide a disk means as aforedescribed in which said data storval area has data stored at a density of approximately 150 MB/in2 or greater;

(112) to provide a disk means as aforedescribed in which said data storval area has data stored at a density of approximately 200 MB/in2 or greater;

(113) to provide a method of eliminating seek time in a data storval system utilizing a rotatably mounted disk means having a data storval area formed thereon, comprising the steps of providing a rotatably mounted disk means having a data storval area; providing a data transfer means having a plurality of data transfer transducer means for transferring data between said data transfer means and said data storval area, each one of said plurality of data transfer transducer means for transferring data being fixed at a different predetermined location relative to the center of rotation of said disk means and extending generally across said data storval area in data transfer relationship thereto; rotating said disk means; and transferring simultaneously a plurality of bits of data between said plurality of data transfer transducer means for transferring data and said data storval area;

(114) to provide a method of transferring data between a transfer means and data disk means at the rate of 50 MB/sec. or more in a data storval system utilizing a rotatably mounted disk means having a data storval area formed thereon, comprising the steps of providing a rotatably mounted disk means having a data storval area; providing a data transfer means having a plurality of data transfer transducer means for transferring data between said data transfer means and said data storval area, each one of said plurality of data transfer transducer means for transferring data being fixed at a different predetermined location relative to the center of rotation of said disk means and extending generally across said data storval area in data transfer relationship thereto; rotating said disk means; and transferring simultaneously a plurality of bits of data between said plurality of data transfer transducer means for transferring data and said data storval area;

(115) to provide a method of simultaneous storval of a plurality of bits of data on a disk means comprising the steps of providing a rotatably mounted disk means having a data storval area formed thereon, said data storval area having an inner portion and an outer portion; providing a data transfer means including a movable support means, said movable support means supporting a plurality of means arranged thereon in a predetermined pattern for transferring data between said data transfer means and said data storval area, said plurality of data transfer transducer means for transferring data extending generally across said data storval area in data transfer relationship thereto; providing a means for moving said support means and said plurality of data transfer transducer means supported thereon to at least a first and second predetermined position relative to said data storval area between said inner and outer portions of said data storval area; rotating said disk means; positioning said support means in a predetermined first position relative to said data storval area and transferring simultaneously a plurality of bits of data between said plurality of data transfer transducer means for transferring data and said data storval area; and positioning said support means in a predetermined second position relative to said data storval area and transferring simultaneously a plurality of bits of data between said plurality of data transfer transducer means for transferring data and said data storval area;

(116) to provide a method as aforedescribed including the step of providing signal means for signaling the location on the data storval area of the plurality of the bits of data to be transferred between said data transfer means and said data storval area;

(117) to provide a method as aforedescribed including the step of transferring simultaneously each of the bits of data in a predetermined sequence;

(118) to provide a system of simultaneous storval of a plurality of bits of data on a disk means comprising rotatably mounted disk means having a data storval area formed thereon, said data storval area having an inner portion and an outer portion; means for rotating said disk means; data transfer means including a movable support means, said movable support means supporting a plurality of data transfer transducer means arranged thereon in a predetermined pattern for transferring simultaneously data between said data transfer means and said data storval area, each one of said plurality of data transfer transducer means for transferring data extending generally across said data storval area in data transfer relationship thereto; and means for moving said support means and the data transfer means supported thereon between said inner and outer portions of said data storval area;

(119) to provide a method as aforedescribed including the step of providing signal means for signaling the location on the data storval area of the plurality of the bits of data to be transferred between said data transfer means and said data storval area;

(120) to provide a method as aforedescribed including the step of transferring simultaneously each of the bits of data in a predetermined sequence;

(120) to provide a method as aforedescribed including the step of transferring simultaneously each of the bits of data in a predetermined sequence;

(121) to provide a disk means having a data storage area formed on at least one side thereof, said data storage area comprising a plurality of radially disposed data storage area zones, each zone comprising a plurality of bytes of data arranged in a predetermined pattern for simultaneous access;

(122) to provide a disk means as aforedescribed in which each zone comprises a plurality of bytes of data arranged in a predetermined pattern for simultaneous access thereto before data is stored in an adjacent zone is accessed;

(123) to provide a method as aforedescribed including the step of providing, during rotation of the disk means, means for maintaining a predetermined separation between said plurality of data transfer transducer means for transferring data and the data storval area of said disk means;

(124) to provide a method as aforedescribed in which the step of providing a data transfer means includes providing a data transfer means having (i) a first generally planarly disposed support surface portion upon which is supported a plurality of data transfer transducer means, (ii) a second planarly disposed surface portion surrounding at least a part of said first planarly disposed surface portion and being spaced apart therefrom, and (iii) a fluid cavity formed within said data transfer means and in fluid communication with first and second planarly disposed surface portions; and during rotation of said disk means, providing means for maintaining a predetermined separation between said plurality of data transfer transducer means supported on said first support surface portion and the data storval area of said disk means, said means for maintaining separation including a source of pressurized, filtered gas disposed in fluid communication with said fluid cavity and the predetermined separation between said second generally planarly disposed surface portion and opposed surface portions of said data storval area;

(125) to provide a method as aforedescribed including the step of providing means for sensing the location of the disk means relative to the plurality of data transfer transducer means for transferring data and effecting movement between said plurality of data transfer transducer means and said disk means until said plurality of data transfer transducer means is fixed at a predetermined location relative to the center of rotation of said disk means;

(126) to provide a method as aforedescribed in which the step of providing a rotatably mounted disk means includes providing a rotatably mounted disk means having a location means formed thereon, and the step of providing a data transfer means having a plurality of data transfer transducer means for transferring data includes providing means for sensing the location means formed on said disk means and moving said plurality of data transfer transducer means until said plurality of data transfer transducer means is fixed a a predetermined location relative to the center of rotation of said disk means;

(127) to provide a system as aforedescribed including means for maintaining a predetermined separation between said plurality of data transfer transducer means for transferring data and the data storval area on said disk means;

(128) to provide a system as aforedescribed in which said data transfer means includes a first planarly disposed support surface portion upon which is supported a plurality of data transfer transducer means, a second planarly disposed surface portion surrounding at least a part of said first planarly disposed surface portion and being spaced apart therefrom, and a fluid cavity formed within said data transfer means, said fluid cavity being disposed and in fluid communication with first and second planarly disposed surface portions, and means for maintaining a predetermined separation between said plurality of data transfer transducer means supported on said first support surface portion and the data storval area of said disk means, said means for maintaining separation including a source of pressurized, filtered gas disposed in fluid communication with said cavity and the predetermined separation between said second planarly disposed surface portion and opposed surface portions of said data storval area;

(129) to provide a system as aforedescribed including means for sensing the location of the disk means relative to the plurality of data transfer transducer means for transferring data and effecting movement between said plurality of data transfer transducer means for transferring data and said disk means until said plurality of data transfer transducer means for transferring data is fixed by a predetermined location relative to the center of rotation of said disk means;

(130) to provide a system as aforedescribed in which said disk means has location means formed thereon and means for sensing the location means formed on said disk means and moving said plurality of data transfer transducer means for transferring data until said plurality of data transfer transducer means is fixed at a predetermined location relative to the center of rotation of said disk means;

(131) To provide a system for simultaneous storval of a plurality of data comprising; a rotatably mounted disk means having a data storval area; means for rotating said disk means; a data transfer means having a plurality of data transfer transducer means for transferring simultaneously a plurality of bits of data between said data transfer means and said data storval area; a location means for locating said disk means relative to said plurality of data transfer transducer means; and means for effecting said disk means relative to said plurality of data transfer transducer means for transferring data until each of said plurality of data transfer transducer means or transferring data is fixed at a predetermined location relative to the center of rotation of said disk means and extending generally across said data storval area in data transfer relationship thereto;

(132) to provide a method as aforedescribed including the step of providing at least one data storval area portion for duplicate storval of data stored thereon said disk means;

(133) to provide a method as aforedescribed including the step of providing one or more disk means having at least one data storval area portion for duplicate storval of data stored thereon said disk means;

(134) to provide a system as aforedescribed in which said disk means includes a data storval area portion for duplicate storval of data thereon stored on said disk means;

(135) to provide a system as aforedescribed including one or more disk means having at least one data storval area for duplicate storval of data thereon stored on said disk means;

(136) to provide a method of simultaneous storval of a plurality of bits of data comprising the steps; providing a disk means having an annular data storval area formed on at least one side thereof, said data storval area having an inner periphery and an outer periphery; providing a plurality of data transfer transducer means for transferring simultaneously a plurality of bytes of data, said plurality of data transfer transducer means being arranged in longitudinally extending wedge-shaped pattern; positioning said plurality of data transfer transducer means in a data transfer relationship relative to the data storval area of said disk means, said wedge-shaped pattern of plurality of data transfer transducer means extending generally from the inner periphery to the out periphery of said data storval area; and effecting movement between said plurality of data transfer transducer means and said data storage while transferring simultaneously a plurality of data between said plurality of data transfer transducer means and said storval area;

(137) to provide a system for simultaneous storval of a plurality of data comprising: a disk means having an annular data storage area formed on at least one side thereof, said data storval area having an inner periphery and an outer periphery; a plurality of data transfer head means having a plurality of data transfer transducer means for transferring simultaneously a plurality of bytes of data, said plurality of data transfer head means being arranged in a longitudinally extending, wedge-shaped pattern extending generally from the inner periphery to the outer periphery of said data storval area and disposed in data transfer relationship relative to the data storval area; and means for effecting movement between said plurality of data transfer head means and said data storval area while transferring simultaneously data between said data transfer head means and said data storval area;

(138) to provide a method of providing a thin film magnetic transducer means comprising the steps of; providing a substrate having at least two openings formed therethrough; forming on said substrate a first predetermined pattern of thin film material formed from electrically conductive material, said first predetermined pattern having a portion thereof disposed in electrical communication with each of the openings formed through said substrate; positioning a substantially magnetically permeable piece of material on at least a portion of said first predetermined thin film pattern disposed on said substrate; forming on a portion of said piece of substantially magnetically permeable material a second predetermined pattern of thin film material formed from electrically conductive material whereby said first and second predetermined patterns of the electrically conductive thin film material form a coil about said substantially magnetically permeable piece of material; forming and positioning on at least a portion of said substantially magnetically permeable material and second electrically conductive thin film pattern a substantially magnetically non-permeable material; forming and positioning on at least a portion of said substantially magnetically non-permeable material a second thin film substantially magnetically permeable material in communication with first substantially magnetically permeable material; and creating a magnetic field at a predetermined time for the transfer of data by said thin film magnetic transducer means by passing an electric current through said coil formed thereon;

(139) to provide a thin film magnetic data transfer transducer means comprising: a substrate having at least two openings formed therethrough; a first predetermined pattern of thin film material formed from electrically conductive material, said first predetermined pattern having a portion thereof disposed in electrical communication with each of the openings formed through said substrate; a substantially magnetically permeable piece of material formed on at least a portion of said first predetermined thin film pattern disposed on said substrate; a second predetermined pattern of thin film material formed from electrically conductive material formed on a portion of said piece of substantially magnetically permeable material whereby said first and second predetermined patterns of the electrically conductive thin film material form a coil about said substantially magnetically permeable piece of material; on at least a portion of said substantially magnetically permeable material and second electrically conductive thin film pattern forming a substantailly magnetically non-permeable material; on at least a portion of said substantially magnetically non-permeable material forming a second thin film substantially magnetically permeable material in communication with first substantially magnetically permeable material;

(140) to provide a thin film diamond coated magnetic data transfer transducer means comprising: a substrate having at least two openings formed therethrough; a first predetermined pattern of thin film material formed from electrically conductive material, said first predetermined pattern having a portion thereof disposed in electrical communication with each of the openings formed through said substrate; a substantially magnetically permeable piece of material formed on at least a portion of said first predetermined thin film pattern disposed on said substrate; a second predetermined pattern of thin film material formed from electrically conductive material formed on a portion of said piece of substantially magnetically permeable material whereby said first and second predetermined patterns of the electrically conductive thin film material form a coil about said substantially magnetically permeable piece of material; on at least a portion of said substantially magnetically permeable material and second electrically conductive thin film pattern forming a substantially magnetically non-permeable material; on at least a portion of said substantailly magnetically non-permeable material forming a second thin film substantially magnetically permeable material in communication with first substantailly magnetically permeable material; and forming on said magnetic data transfer transducer means a diamond coating on at least a portion of said magnetic data transfer transducer means that opposes the surface of a disk means for data storval;

(141) to provide a method as aforedescribed including the step of providing means for sensing the location of the location signal means on the disk means relative to the plurality of data transfer transducer means and effecting lateral movement between said plurality of data transfer transducer means and said disk means until said plurality of data transfer transducer means is fixed at a predetermined location relative to the location of said location signalling means on disk means;

(142) to provide a disk means having a data storval area formed on at least one side thereof, said data storval area comprising a plurality of radially disposed region of simultaneously transferred data domains, each region of simultaneously transferred data domains comprising a plurality of bits of data arranged in a predetermined pattern for simultaneous access;

(143) to provide a disk means as aforedescribed in which each region of simultaneously transferred data domains comprising a plurality of bits of data arranged in a predetermined pattern for simultaneous access thereto before data is stored in an adjacent region of simultaneously transferred data domains is accessed;

(144) to provide a method as described in claim 1 including the step of providing a disk means having a disk means having a data storval area formed thereon having a diamond coating on the surface of said disk means that moves past said data transfer transducer means, and providing a data transfer transducer means having a diamond coating on at least a portion of said magnetic data transfer transducer means;

(145) to provide a method as aforedescribed in which the step of forming said diamond coating on a surface of a disk means includes forming a thin film diamond coating on a surface of a disk means, and the step of forming said diamond coating on said data transfer transducer means includes forming said a thin film diamond coating on said data transfer transducer means;

(146) to provide a method of simultaneous retrieval of a plurality of bits of data on a disk means for use as a video server comprising the steps of: providing a rotatably mounted disk means having a data storval area with a plurality of regions of simultaneously transferred data domains stored thereon in the form of video binary data; providing a data transfer means having a plurality of data transfer transducer means for transferring data between said data transfer means and said data storval area, each one of said plurality of data transfer transducer means for transferring data being fixed at a different predetermined location relative to the center of rotation of said disk means and the plurality of data transfer transducer means extending generally across said data storval area in data transfer relationship thereto; rotating said disk means; retrieving simultaneously from a predetermined region of simultaneously transferred data domains a plurality of bits of data between said plurality of data transfer transducer means and said data storval area; transferring at least a portion of said transferred plurality of bits of data to a data processing unit for transmittal to an end user for viewing said video picture; and repeating the process of transferring at least a portion of said transferred plurality of bits of data to a data processing unit for transmittal to an end user for viewing said video picture until a predetermined quantity has been transferred.

(147) to provide a method of simultaneous retrieval of a plurality of bits of data on a disk means for use as a voice recognition device comprising the steps of: providing a rotatably mounted disk means having a data storval area with a plurality of regions of simultaneously transferred data domains stored thereon in the form of voice recognition binary data; providing a data transfer means having a plurality of data transfer transducer means for transferring data between said data transfer means and said data storval area, each one of said plurality of data transfer transducer means for transferring data being fixed at a different predetermined location relative to the center of rotation of said disk means and the plurality of data transfer transducer means extending generally across said data storval area in data transfer relationship thereto; rotating said disk means; retrieving simultaneously from a predetermined region of simultaneously transferred data domains a plurality of bits of data between from said data storval area; comparing at least a portion of said retrieved plurality of simultaneously transferred data with a captured spoken word to see if a match has occurred, and if not then comparing another portion of said retrieved plurality of simultaneously transferred data; and repeating the process of retrieving and comparing until a match has been found or not found.

Still further objects and advantages will become apparent from a consideration of the ensuing description and drawings.

BRIEF DESCRIPTION OF THE DRAWINGS

In the drawings, closely related parts have the same number but different alphabetic or numeric suffixes. The numbering system with each separate different figure number starts anew, so that the last two digits specify the part number. Thus, in a three digit number the first digit indicates the drawing number, and in a four digit number, the first and second number indicates the drawing number. Items with the same last two numbers usually have the same function in the different drawings.

FIG. 2 shows a top or plan view of a prior art data storval disk unit that uses a voice coil 208 type of mechanism for positioning the sequential data transfer head means 280-1 relative to the disk 272;

FIG. 3 shows a plan view of a prior art storval disk unit showing a disk 372 with a sequential data transfer head means 380-1 positioned above one of the tracks 374 of the disk 372 as the disk rotates; it further shows how the tracks are divided into sectors for data storval;

FIG. 4 shows of a hard disk 472 illustrating the divisions of tracks into sectors;

FIG. 5 shows a hard disk 572 broken into four logical divisions 528, called quations, for storing data;

FIG. 8 shows a prior art disk divided into different typical sector arrangements 844-1 and 844-2 depending upon where the sector is located on the surface of the disk;

FIG. 9 shows another embodiment of a prior art disk 972 fragmented by a single file stored over different sectors 990-1, 990-2, 990-3, 990-4 on the disk 972;

FIG. 10 shows the files reassembled on a prior art disk to become unfragmented into a single file 1092 that occupies sequential sectors on the disk;

FIGS. 13 and 13A show the construction of a prior art Winchester removable hard disk and its case;

FIGS. 14, 14A, 14B show the construction of a prior art Bernoulli hard disk and its case;

FIG. 26B shows a top view of a disk means and the simultaneous data transfer head assembly of FIG. 26 along with the air flow patterns; and FIG. 26 C shows a perspective view of the head assembly of FIG. 26 with the end pieces in place and showing the air inlets end and end cap.

DRAWING REFERENCE NUMBERS

Figure 1:
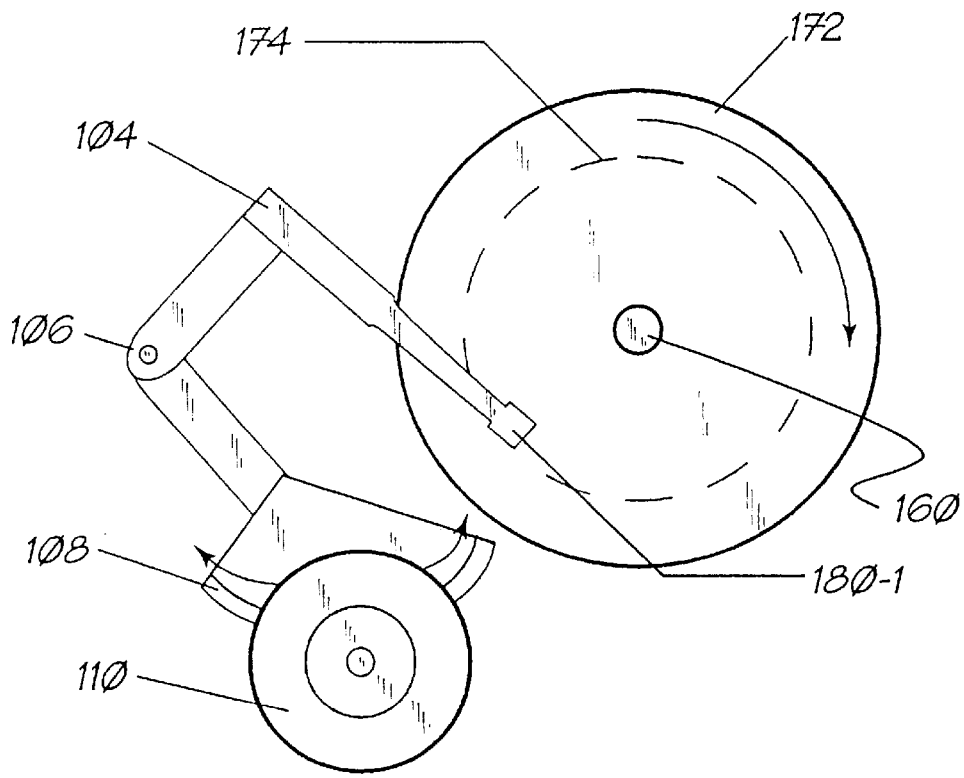
FIG. 1 shows a top or plan view of a prior art storval disk unit that uses a stepper motor means 110 or similar mechanism type for positioning the sequential data transfer head means 180-1 relative to the disk 172 or track 174.

| | |
|---|---|
| 104 | moveable arm |
| 106 | moveable arm |
| 108 | pivot |
| 110 | stepper motor |
| 160 | spindle |
| 172 | disk |
| 174 | track |
| 180-1 | sequential data transfer head means |
| 180-2 | sequential data transfer head means |
| 208 | voice coil |
| 238 | safe landing zone |
| 272 | disk |
| 274 | track |
| 280-1 | sequential data transfer head means |
| 338 | safe landing zone |
| 372 | disk |
| 374 | track located in Sector |
| 380-1 | sequential data transfer head means |
| 444 | sector |
| 472 | disk |
| 528 | quation |
| 572 | platter |
| 620 | data bit domain |
| 628 | quation |
| 630 | data transfer area |
| 728 | quation |
| 720 | data bit domain |
| 730 | data transfer area |
| 844-1 | sector |
| 844-2 | sector |
| 972 | disk |
| 990-1 | file segment |
| 990-2 | file segment |
| 990-3 | file segment |
| 990-4 | file segment |
| 1092 | file |
| 1304 | arm |
| 1345 | sliding door |
| 1346 | lock tab |
| 1372 | disk |
| 1380-1 | sequential data transfer head means |
| 1445 | sliding access door |
| 1446 | locking disk tab |
| 1454 | air flow |
| 1472 | disk |
| 1480-1 | sequential data transfer head means |
| 1480-2 | sequential data transfer head means |
| 1480A-1 | sequential data transfer head means |
| 1480A-2 | sequential data transfer head means |
| 1548 | mirror |
| 1534 | led |
| 1536 | lens |
| 1558 | sequential data transfer head means assembly |
| 1550 | wide gap |
| 1552 | narrow gap |
| 1572 | disk |
| 1518 | track |

-continued

| | |
|---|---|
| 1545 | sliding access door |
| 1546 | locking tab |
| 1694 | data transfer transducer means |
| 1696 | simultaneous data transfer head |
| 1730-1 | region of simultaneously transferred data domains |
| 1730-2 | second region of simultaneously transferred data domains |
| 1730-3 | region of simultaneously transferred data domains |
| 1731 | first row of simultaneously transferred data domain bit |
| 1732 | second row of simultaneously transferred data domain bit |
| 1733 | third row of simultaneously transferred data domain bit |
| 1830-1 | first region of simultaneously transferred data domains |
| 1830-2 | second region of simultaneously transferred data domains |
| 1830-3 | third region of simultaneously transferred data domains |
| 1830-4 | fourth region of simultaneously transferred data domains |
| 1920-1 | data transfer transducer means |
| 1920-2 | data transfer transducer means |
| 1920-3 | data transfer transducer means |
| 1930 | region of simultaneously transferred data domains |
| 1956-1 | first row of data bits in region of simultaneously transferred data domains |
| 1956-2 | second row of data bits in region of simultaneously transferred data domains |
| 1956-3 | third row of data bit in region of simultaneously transferred data domains |
| 2030-1 | first region of simultaneously transferred data domains |
| 2030-2 | second region of simultaneously transferred data domains |
| 2030-3 | third region of simultaneously transferred data domains |
| 2030-4 | region of simultaneously transferred data domains |
| 2194 | data transfer transducer means |
| 2196-1 | first simultaneous data transfer head |
| 2196A-1 | second simultaneous data transfer head |
| 2196B-1 | third simultaneous data transfer head |
| 2196C-1 | fourth simultaneous data transfer head |
| 2214 | motor |
| 2216 | mounting plate |
| 2218 | spacers/standoffs |
| 2222 | screws for mounting motor |
| 2224-1 | disk spindle nut |
| 2224-2 | disk spindle nut |
| 2226 | disk spindle adapter to motor |
| 2260 | spindle |
| 2272 | disk |
| 2282-1 | simultaneous data transfer head |
| 2282-2 | simultaneous data transfer head |
| 2301 | simultaneous transferred data domain address register |
| 2303 | simultaneous transferred data domain address bit comparator |
| 2305 | data transfer transducer means |
| 2307 | threshold comparator |
| 2309 | data transfer control circuitry |
| 2311 | memory latch |
| 2313 | threshold comparator |
| 2315 | data transfer transducer means |
| 2317 | memory |
| 2319 | data bus from computer |
| 2321 | control bus from computer |
| 2323 | address bus from computer |
| 2325 | sector location circuitry |
| 2327 | data storage bytes-bits |
| 2329 | data transfer trigger |
| 2462 | thin film coil |
| 2464 | substrate |
| 2466-1 | magnetically permeable material |
| 2466-2 | magnetically permeable material |
| 2468 | glass type material |
| 2562 | thin film electrically conductive deposited material |
| 2562-1 | thin film electrically conductive deposited material |
| 2564 | substrate |
| 2566 | magnetically permeable material |
| 2568 | glass type material |
| 2570 | data transfer transducer means |
| 2672 | disk means |
| 2672B | disk means |
| 2578 | thin film diamond coating |
| 2680 | data transfer head structure |
| 2680B | data transfer head structure |
| 2684-1 | channel means for air flow |
| 2684A-1 | channel means for air flow |
| 2684B-1 | channel means for air flow |
| 2684C-1 | channel means for air flow |

-continued

| | |
|---|---|
| 2684-2 | channel means for air flow |
| 2684A-2 | channel means for air flow |
| 2684B-2 | channel means for air flow |
| 2684C-2 | channel means for air flow |
| 2686-1 | side piece |
| 2686A-1 | side piece |
| 2686B-1 | side piece |
| 2686C-1 | side piece |
| 2686-2 | side piece |
| 2686A-2 | side piece |
| 2686B-2 | side piece |
| 2686C-2 | side piece |
| 2688C-1 | end piece |
| 2688C-2 | end piece |

DESCRIPTION OF THE PRIOR ART

FIG. 1 shows an illustration of a present conventional embodiment of a data storval disk device that consists of a data storval disk 172, spindle 160 attached to the center of the data storval disk 172 to cause motion when the spindle 160 is rotated, a pair of singular sequential data transfer head means 180-1, 180-2 for causing the transferring of data from/to the surface of the data storval disk 172, an arm 104, 106 for moving the sequential data transfer head means 180-1, 180-2, pivot structure 108 for causing the arm 104, 106 to move the sequential data transfer head means 180-1, 180-2 inward or outward from the center of rotation, and a stepper motor 110 that moves the pivot structure 108 upon command from the computer (or drive controller means). In FIG. 1 data is transferred, along the track 274, in a sequential manner until the computer (or disk drive controller means) has determined that all the data for the track has been transferred, and then the sequential data transfer head means 180-1, 180-2 positions itself to the next available track for data transference. The data storval disk 172 turns in a clockwise rotation, although the rotation direction is not critical to the fundamental operation of the unit.

Figure 1A:
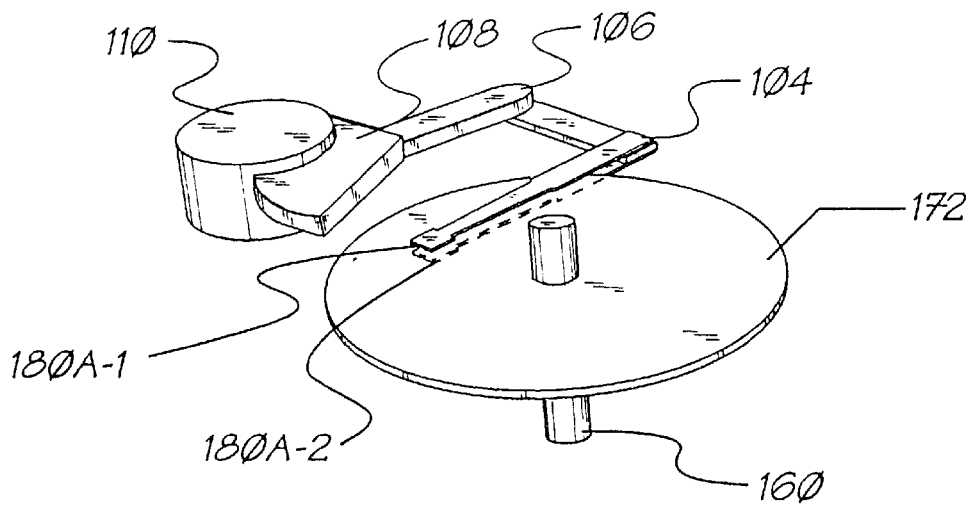
FIG. 1A is a perspective view of the same prior art mechanism shown in FIG. 1.

FIG. 1A shows a perspective illustration of FIG. 1. It illustrates that the disk storval device has a sequential data transfer head means 180A-1 for a data storval disk surface and a lower sequential data transfer head means 180A-2 for an opposing data storval disk surface.

FIG. 2 shows the same general device, but with the stepper motor function being replaced by a voice coil or servo motor 208 to position the sequential data transfer head means 280-1 above the surface of the data storval disk 272. The data storval disk 272 turns in a clockwise direction but the direction of rotation is not critical.

Both of these storval devices transfer their data along a circular path as the disk rotates beneath their sequential data transfer head means. The data is transferred in sequential form, that is, one bit after another bit.

FIG. 3 shows a sequential data transfer head means 380-1, which moves along a radial path towards the center of rotation. The disk uses tracks for the storval of data, shown by track 374, on the disk 372. When the disk 372 is not rotating, the sequential data transfer head means 280-1 must be moved to a safe zone parking area 338. If this has not occurred, then the sequential data transfer head means may crash against the disk 372 and cause damage to the surface of the magnetic storval medium and render the disk unusable to store/retrieve any further data. The sequential data transfer head means 380-1 floats above the surface of the disk 372 on a air bearing created by air flowing between the disk 372 and the sequential data transfer head means 380-1.

FIG. 4 shows an illustration of a disk 472 divided into sectors. The sectors are used to denote the logical divisions of tracks for the convenience of locating data and provides simplification of the hardware and software. As defined in "The Computer Glossary", Fifth Edition, by Alan Freedman, published by Tab Books for American Management Association, Amacom© 1991, a sector is defined as: "The smallest unit of storage read or written by a disk. Sectors are fixed in length, and the same number of sectors usually reside in one track. However, the hardware may vary the disk speed to fit more sectors into tracks located on the outer edges of the disk. The sector is the physical unit called for by an instruction, for example, READ TRACK 17, SECTOR 23."

Using normal present sectoring methods the density of the data in a sector is greater towards the center tracks than the tracks closer to the outer periphery. This has caused different strategies to be used to improve the density of data stored via the sector method to utilize the wasted space. This involves using different sector densities for the inner tracks as opposed to the outer tracks. That is, more sectors are used on the peripherally tracks than on the inner tracks. In this method, however, the data is still written in a sequential manner bit by bit along the course of the path of a track.

FIG. 8, shows an illustration of a variable sector allocation method whereby the number of sectors 844-1 on the outer periphery is twice the number of sectors 844-2 in the inner periphery. It is accomplished by either changing the speed of the disk or changing the computer (or drive controller means) operating system or mode. This method introduces another level of complexity in the disk allocation tables and file allocation tables, FAT, along with the electronics control. In this method, however, the data is still written in a sequential manner bit by bit along the course of the path of a track. The access method to retrieve the information from the disk is defined as the software routine that is part of the operating system which performs the storval of data. The access methods are widely used to keep track of records of files. A disk file is defined as any set of instructions or data that is recorded, cataloged and treated as a single unit on a disk. Source language programs, machine language programs, spread sheets, data files, text documents, graphic files and batch files are all examples.

An index is a table of contents for each file or each record residing upon the disk. Thus a file allocation table (FAT) is generated. The file allocation table is the part of the file system that keeps track of where the data is stored on a disk. It is a table with an entry for each sector on the disk. A directory is generated which contains the file ID and points to the file allocation table where the files start. If a file is larger than 1 sector then that particular entry points to another one and so on. If a sector becomes damaged on a disk, its corresponding entry in the file allocation table is marked as so and not used again.

FIG. 9 shows a disk 972 with several segments of a file 990-1, 990-2, 990-4, 990-3, stored on it. A file is any collection of data or information treated as a single unit on a peripheral device. Fragmentation is the non-sequential distribution of file data spread out over a disk. This occurs for the reason that files are stored in a sequential manner, that is bit after bit in a sector. When the sector cannot store any more data then another sector is used to receive the addition data needed to be stored. If the available sector to be used for the data storage is not contiguous physically to the previous sector written to, then the file becomes fragmented. As this happens files become less contiguous on the disk. As a result files wind up in different sectors of the disk not adjacent to one another and on different tracks, causing additional arm movement when the files are sequentially written to or read from. A disk maintenance, or optimization, program is used to reorder files in a contiguous manner. This program can either be built into the device controller or can be a separate program executed by the CPU that the disk is attached to.

As can be seen from the illustration the file is fragmented that is, broken up into different file segments stored in different non-contiguous sectors. This is typical of how a contemporary data file is stored. The computer (or driver controller means) typically looks for the next open sector that can receive the data and causes a data storval operation to this sector. The computer (or disk drive controller means) decides if more data is needed to be transferred for the file it has open, and if the decision is positive, that is, it needs to transfer more data for an open file, it then looks in an allocation table for the next available sector to perform a data storval. This increases the seek, latency and access times and considerably slows down the process of transferring data in a storval operation.

FIG. 10 shows an illustration of the file 1092 after it has been defragmented from the four segments of FIG. 9 and stored in three sequential sectors. Both FIGS. 9 and 10 use the method of performing a storval operation in a serial fashion, that is one bit is sequentially transferred after the prior bit. Thus each stored bit is subsequent to the prior bit in the byte that is transferred.

For transferring a large file, a considerable amount of time is needed to move the sequential data transfer head means, find the right location, transfer the information, then repeat these steps again until all of the data is transferred. An example will illustrate this.

A typical seek time to move the arm to the proper track is 5 milliseconds. With the disk, rotating at 3,600 RPM, in a diameter of 3.375 inches (8.58 centimeters), then it takes the disk approximately 16.6 milliseconds to complete one revolution, one half this time is 8.3 milliseconds and is considered the approximately average latency time to access where the data is located.

Without any overhead figured in, this is approximately 13.3 milliseconds to retrieve the first bit of information. A large file, 2 MBytes, for example will be used. A single outer track will have a circumference of $\pi r^2$, or 11.04 inches (28.04 centimeters) along the track. Assuming a writing density of 40,000 bits per inch (101,600 bits per centimeter), this yields 441,600 bits per track, or 55,200 bytes per track. A further assumption is that the tracks that are written to are all approximately the same circumference, although this is not the case in real life. However, it will yield satisfactory results for our computations, thus this data file would require approximately 36 tracks, or 3,881 sectors if each sector can contain 512 bytes. The time to store such a file would be greater than one second under ideal conditions, and more likely to take more than 5 seconds on a hard disk and could take more than 30 seconds on a floppy disk because of moving the sequential data transfer head means from track to track. It will be shown that with the method and system of our invention it takes less than 6 milliseconds to transfer the same file.

Figure 11:
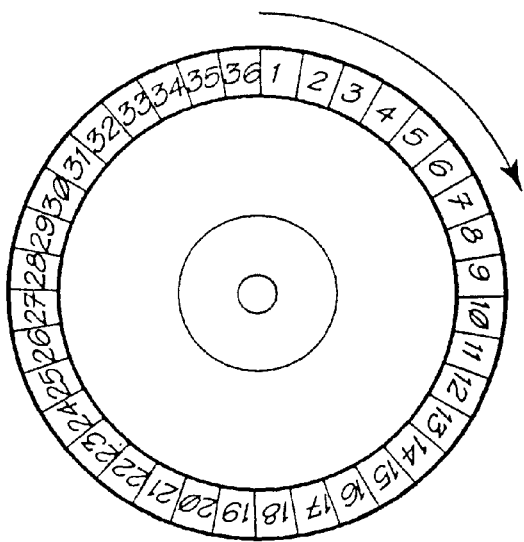
FIG. 11 shows data written to a disk on a 1:1 interleaving around the different sectors.

FIG. 11 shows an illustration of a current method of transferring information from/to a disk. The disk rotates in a clockwise manner and has a sector numbering scheme for illustrative purposes from 1 to 36. When the disk has been newly formatted and has not had any information stored on it, the computer (or disk drive controller means) will first store data on sector 1 and when the sector is not able to hold any further data it will then store data on sector 2, then sector 3, etc. In this method however, the data is still stored in a sequential manner bit by bit along the course of the path of a track.

Figure 12:
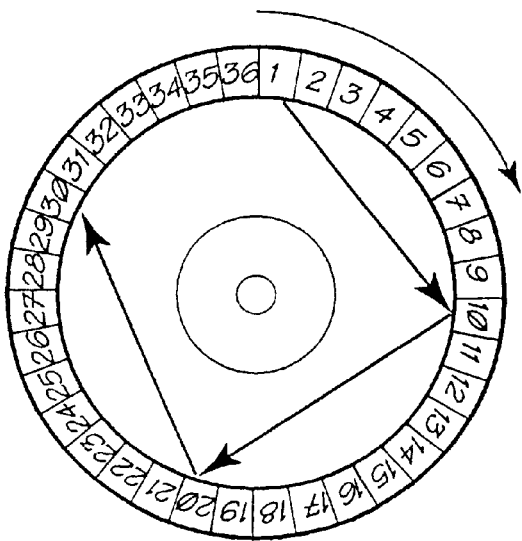
FIG. 12 shows data written to a disk on a 1:10 interleaving around the different sectors.

When a disk system cannot transfer data as quickly as the computer is transferring the data, then a method called interleaving is used as shown in the illustration FIG. 12. That is, first, sector number 1 has data transferred and then when the disk system is ready to transfer data again then sector 10 has data transferred, then sector 20, then sector 30. This method is utilized so that the disk does not have to rotate completely to be able to transfer data to sector 2. This sequences and synchronizes the data flow transfer between the computer and the disk controller. Another method of interleaving, not shown, is to number the sectors in a non sequential manner. The first sector is number 1, the second is number 5, the third is number 10, the fourth is number 15, the fifth is number 2, the sixth is number 6, etc., until all of the sectors have been numbered around the disk, Thus, when the computer must transfer data, the computer (or disk drive controller means) transfers data to sector 1, then sector 2, etc., but because the sectors are spatially not adjacent to each other, there is a lag between the time that the sequentially numbered sectors are available to the computer (or disk drive controller means) for transferring data. This causes a built in delay for the transferring of data.

FIG. 13 shows an illustration of a removable hard disk 1372. The storval method and system used to transfer information for these disks utilizes a single sequential data transfer head means per surface per disk that transfers the information sequentially, one bit after another bit. The sequential data transfer head means travels along the circular path of a track. When this track cannot achieve any further information transfer, the arm 1304 will move the sequential data transfer head means 1380-1 in a radial direction inwardly or outwardly to another track. The sliding access door 1345 allows the sequential data transfer head means to gain access to the disk from the disk carrier unit. Locking tab 1346 is a two position device, and when in the locking position it will not allow the computer (or disk drive controller means) to write any more information to the surface of the disk 1372. The removable hard disk system may be modified to use the storval method and system disclosed within this patent to use the parallel transference of data between the disk means and the new simultaneous data transfer head means of this invention.

FIG. 14 shows a Bernoulli removable disk system with heads 1480-1, 1480-2 to transfer information from/to the disk 1472. As the disk begins rotating the Bernoulli effect causes increased air flow along the surface 1472 which separates the disk from the sequential data transfer head means system. The name comes from the 18th century Swiss scientist, Daniel Bernoulli, whose principle of fluid dynamics is demonstrated in the disk mechanism. When the floppy disk is spun at high speed, it moves toward the head means or bends up and maintains a thin band of air between it and the sequential data transfer head means. Unlike a hard disk in which the sequential data transfer head manes flies over a rigid disk, the floppy disk in the Bernoulli drive flies up to a rigid sequential data transfer head means. Upon power failure, a hard disk has to retract the sequential data transfer head means to prevent a recording failure or sequential data transfer head means crash, whereas the floppy disk in the Bernoulli drive automatically moves or bends down. Sliding access door 1445 moves to allow the heads and armatures to access the disk. Locking tab 1446 can be moved to a position that does not allow the computer (or disk drive controller means) to write any more information to the surface of the disk 1472. The method used to transfer information from/to these disks is a single sequential data transfer head means per surface per disk that transfers the information sequentially, one bit after another bit sequentially around the disk using the sector/track method for transferring data. The Bernoulli removable disk system may be modified to use the method disclosed within this patent to use the parallel transfer of information from/to the disk by the new simultaneous data transfer head means of this invention.

Figure 15:
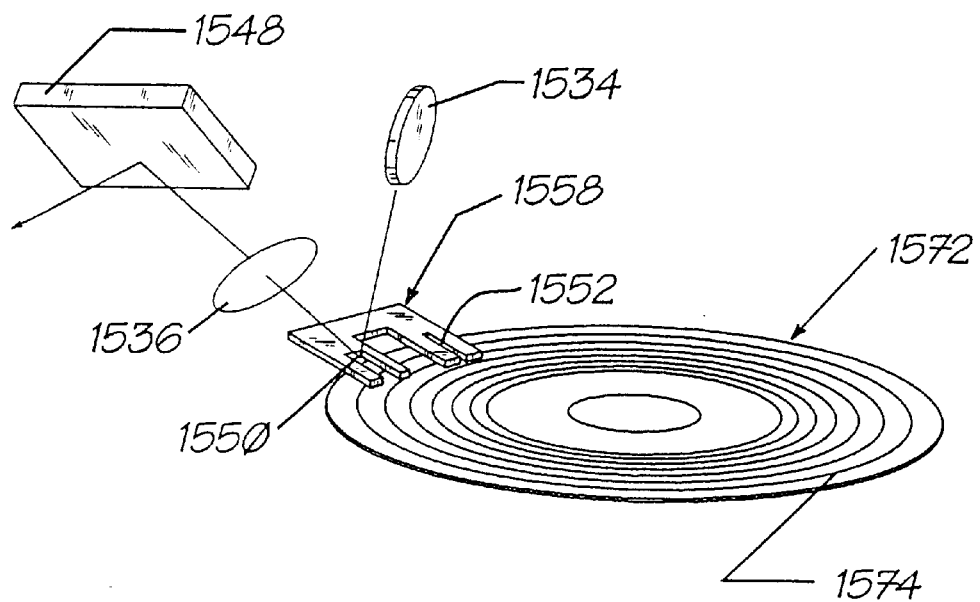
FIGS. 15 and 15A show the construction of a prior art floptical removable disk 1572 and its case.
Figure 15A:
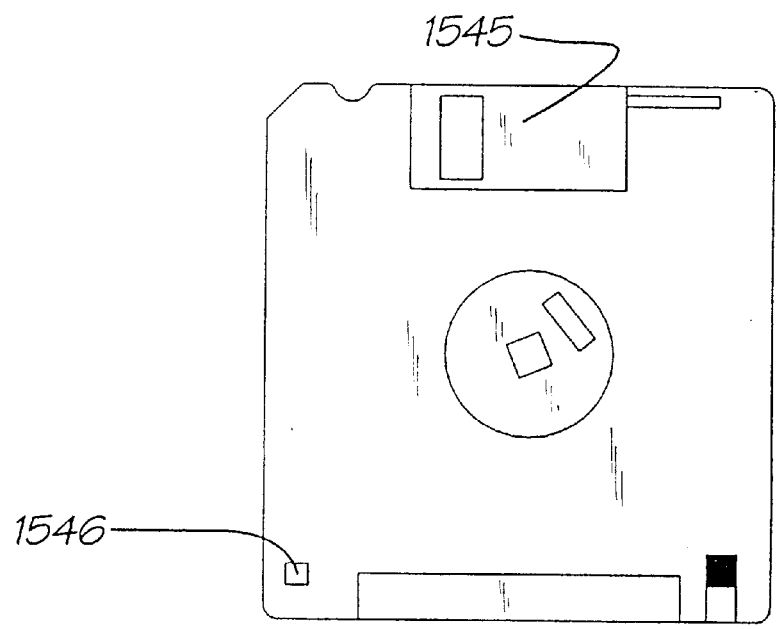

FIG. 15 shows the currently practiced embodiment of a magneto optical or floptical system. It uses the method of transferring information from/to these disks of a single sequential data transfer head means per surface per disk that transfers the information sequentially, one bit after another bit sequentially around the disk using the sector/track method for transferring data. The floptical has a sliding access door 1545, to allow the sequential data transfer head means 1558 access to the surface of the disk 1572, and a locking tab 1546 that can be moved to a locking position that will not allow the computer (or disk drive controller means) to write to the disk surface. The floptical removable disk system may be modified to use the method disclosed within this patent to use the simultaneous data transfer for storval of data by the disk with the new simultaneous data transfer head means of this invention.

Figure 24:
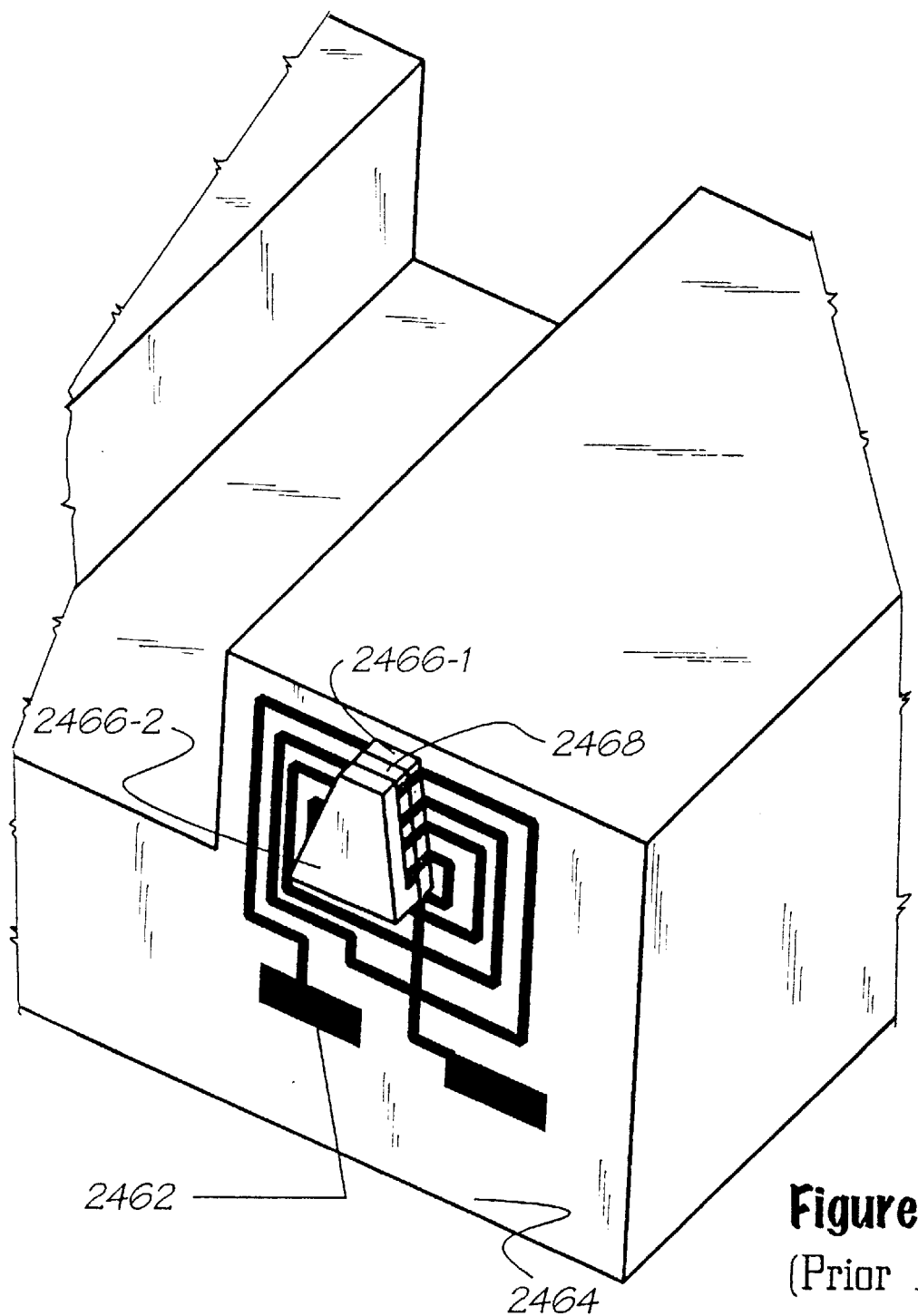
FIG. 24 shows an illustration of a prior art thin film head fabricated on the tip of a sequential data transfer head.

FIG. 24 is shows a prior art thin film head fabricated on the tip of a sequential data transfer head. A thin film circuit is a circuit in which the passive components and conductors are produced as films on a substrate by evaporation or sputtering; active components may be similarly produced or mounted separately. The film itself is a film of a material from 1 to several 100 molecules thick deposited on a solid substrate such as glass ceramic or as a layer on a supporting liquid by a variety of chemical, mechanical or high vacuum evaporation techniques.

Generally, the thin film head is fabricated on the end of the substrate 2464 after the substrate has been cleaned and prepared to take the thin film material. A mask is then laid down so that only the material will be deposited where the mask is not on the substrate. Then a magnetically permeable material 2466-1, such as an alloy of nickel-iron, is deposited by thin film techniques. Next, a mask is applied, and the glass type of material 2468 for a gap for the sequential data transfer head is deposited on top of the magnetically permeable material 2466-1. Then the mask is removed and another mask is laid down for the thin film circuitry that will provide the thin film coil 2462 with conductive pads to which wires may be bonded or connected to. After the thin film circuitry is formed, the mask is removed and another mask is applied for the final magnetically permeable material 2466-2 to be deposited. As a result a magnetic read/write head for use on a magnetic recording material, such as a magnetic tape or disk has now been formed. The substrate would then be cut and mounted onto a sequential data transfer head means with wires bonded onto the large pads of the circuitry 2462 for attachment to the read/write circuitry.

DESCRIPTION OF THE PREFERRED EMBODIMENTS

FIG. 5 illustrates a new definition of lexicology used in this patent for a quation 528 residing on disk 572. It is defined as a quarter section of the disk 572.

Figure 6:
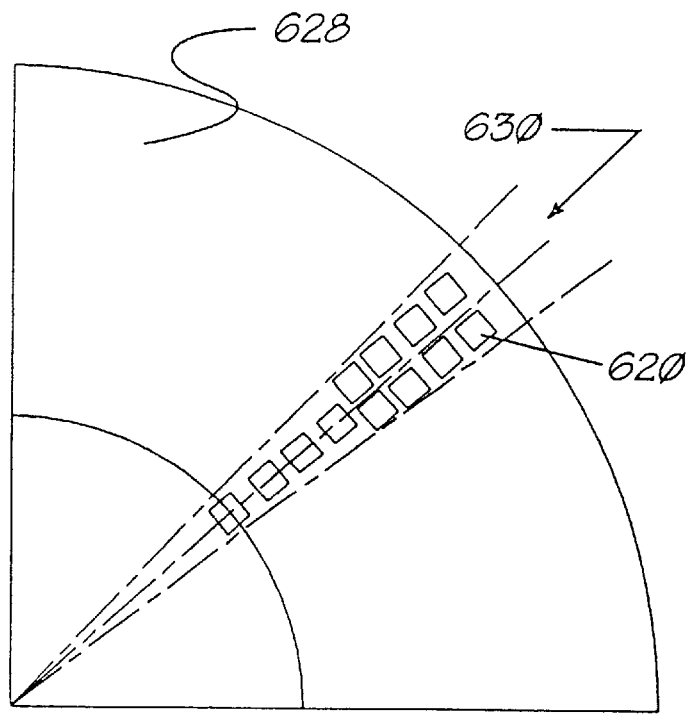
FIG. 6 shows another embodiment of a quation 628 and the data domains of a plurality of individual data domains in a region of simultaneously-transferred data domains 630; the individual pictorially enlarged data domains 620 are shown positioned in the region of simultaneously-transferred data domains 630 with only a limited number of data domains 620 being shown for clarity (the data domains are illustrated as a square shape, not necessarily the true shape for a domain shape)

FIG. 6 shows, for a disk means, a quation 628, a single region of simultaneously transferred data domains 630, and a single data bit domain 620. It further illustrates that the single region of simultaneously transferred data domains 630 has different densities of bit domains depending upon the relative location of the bit domains from the center of rotation. The region of simultaneously transferred data domains 630 no loner has tracks, but rather rows of bit domains located in a radial direction outward from the center of rotation. The number of bit domains in any given row is dependent upon the included angle of the region of simultaneously transferred data domains, the distance (or radius) from the center of rotation, the size of a simultaneous data transfer head means, and the packing density of the data transfer transducer means on a simultaneous data transfer head means. FIG. 6 further exemplifies that all the data bit domains in a particular region of simultaneously transferred data domains 630 is able to be stored simultaneously rather than sequentially or serially. That is, all the bit domains in a region of simultaneously transferred data domains 630 are written concurrently. In an alternate embodiment, the data in a region of simultaneously transferred data domains 630 can be stored or retrieved either one bit, one byte or a plurality of bytes at one time, depending upon the computer's operation mode (or drive controller means) and the operating software.

The fact that all the bits can be transferred simultaneously allows the computer (or disk drive controller means) to transfer information from/to the disk means in either a predetermined manner or pattern set by the circuitry, a random manner determined by the software, or a predetermined manner that is determined by a removable circuit means that is inserted between the simultaneous data transfer head means and the circuitry of the data transfer transducer means for transferring the information to the data processing means or data processing channel communication means (I/O channel). This removable circuit means could be a card, a preprogrammed EPROM, a one time coded scheme on a smart card, etc. this removable circuit means would provide additional security by requiring the proper connection means to be made between the data transfer means and the interface to the data transfer transducer means for transferring decodable information between the disk system means and the data processing means. Furthermore, the disk device controller could have a compression circuit built into it to handle the compression of data before it was stored on the disk and after it was retrieved. For use as a video server, a compression standard that is currently used is called MPEG level 1. The initials stand for Motion Picture Experts Group, World Wide Standards Making Committee, and level 1 is the first step in audio/video digitization that eventually will evolve towards high definition video products. The compression ratio of MPEG/1 is 180:1. MPEG does not discard information but it does condense the video so that it does not repeat information that hasn't changed from one frame to the next. This is necessary because of the large amounts of data that is required to digitize a 2 hour long movie. If we are using 640 by 480 resolution, a typical resolution for a computer screen and the next generation of television sets, it needs to repeat this resolution 30 times a second. For instance a movie that previously required 180 megabytes to be stored would now only require 1 megabyte of disk space under this encoding scheme. In a typical computer, a 640 by 480 resolution screen 921,600 (using 24 bit color) bytes must be produced every 1/30th of a second or 27,648,000 bytes per second. This yield 199 gigabytes for a 2 hour movie. Using a 181:1 data compression technique would cut this requirement down to 1.1 gigabytes. 1.1 gigabytes is easily stored on a single disk means for our invention of this patent. If a standard television resolution is used (512 scan lines, broadcast around 400) then the requirements are reduced to storing around 760 MB. For HDTV the requirements would be greater than 2.9 giga bytes for storage.

Furthermore, the device controller that controls the disk device of the region of simultaneously transferred data domains can store information, defragment it and compress it before it stores it to the disk thereby increasing the transfer rates. This would consist of either firmware or another processor controlling the brains of the operation before transferring it to the main CPU. One of the advantages of this is that the main CPU might request a file from the disk device controller saying for instance "I want file A," and the device controller then reads the entire file A and notifies the main computer that the entire file is then available. Used as a video server, the entire disk sector transfer area would be read which would consist of a multiplicity of data bytes. However, because the requested user only requires a certain number of bytes, for instance two bytes for 16 bit color display at any given time, there is excess number of bytes not being used. As the controller sequences through the stream of data, the next byte is used and the previous byte is no longer needed, however this frees up the previous byte to then be sent to another user.

The term data processing means used in this patent includes broadly any device or method for processing information, including computers, microprocessors, fixed machine instruction devices, RISC chips, CISC chips, etc., and is not meant to be limited in scope.

Figure 7:
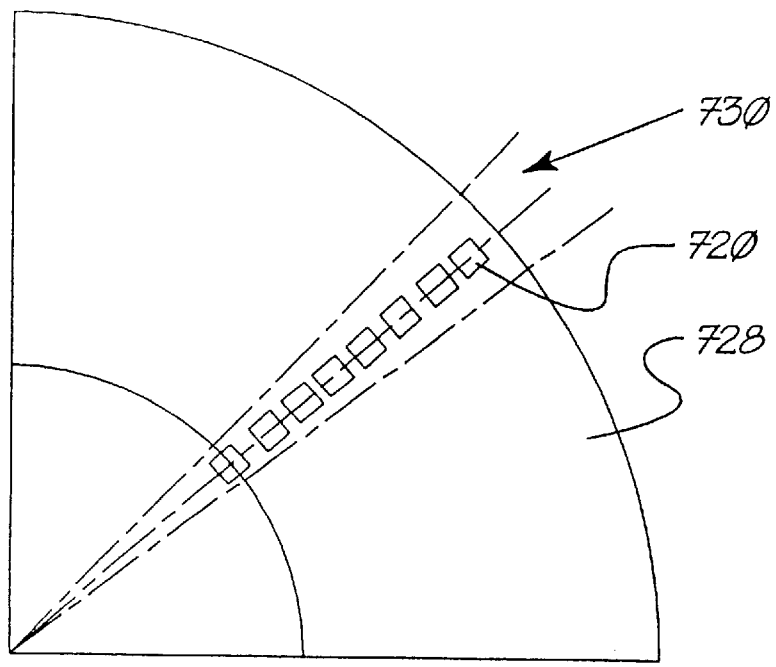
FIG. 7 shows another embodiment of a quation 728 and the data domains of a plurality of individual data domains in a region of simultaneously-transferred data domains 730; the individual pictorially enlarged data domains 720 are shown positioned in the region of simultaneously-transferred data domains 730 with only a limited number of data domains 720 being shown for clarity (the data domains are illustrated as a square shape, not necessarily the true shape for a domain shape)

FIG. 7, shows for a disk means, an alternate embodiment of a region of simultaneously transferred data domains 730 on the surface of a disk 728. This embodiment illustrates that the number of the bit domains in the rows of the region of simultaneously transferred data domains stays the same irregardless of the position of the row with respect to the center of rotation. Another embodiment, not shown, has the center of the data bit domains offset from each other along the radii of the center of the region of simultaneously transferred data domains. This would not affect the operation of the transfer of information from/to the disk, but would increase the distance that the individual data transfer transducer means would be separated from each other. The geometrical distribution of the data transfer transducer means use a fabrication decision based upon design philosophy rather that a matter of operational functionality.

Figure 16:
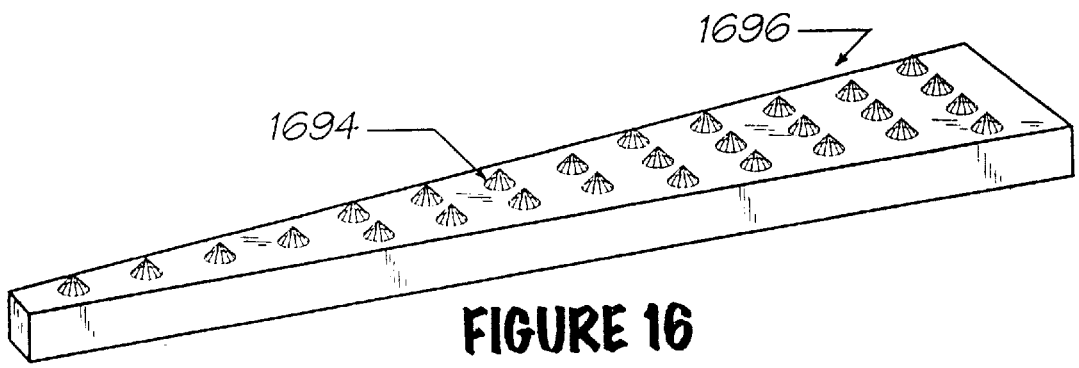
FIG. 16 shows a preferred embodiment of a plurality of data transfer transducer means for a disk, typified by a data transfer transducer means 1694, on a simultaneous data transfer head means 1696 of the invention, with only a limited number of the plurality of data transfer transducer means being shown pictorially enlarged for purposes of clarity.

This invention uses for disk means, a plurality of data transfer transducer means 1694 as shown in FIG. 16. On the simultaneous data transfer head means 1696 there are said plurality of data transfer transducer means 1694 arranged in a radial fashion from the center of the disk to the outer periphery of the disk with said simultaneous data transfer head means 1696 spanning the surface area of the disk surface from the center (or near the center) to the outer periphery. The data transfer transducer means can be deposited upon a substrate with either vapor deposition using a thin film process or alternately, be deposited using ion deposition processes, where the heads are deposited on and into a substrate. The techniques are well known in the practiced art, and currently yields heads that have gap sizes of 40 millionths of an inch (1.02 $\mu$m). One embodiment of this invention utilizes a substrate with plated through holes or openings for making the connections to each individual data transfer transducer means using a printed circuit technique or a thin film deposition technique to bring the connections to the surface on the opposite side of the said simultaneous data transfer head means. On this opposite surface is connected a very large scale integrated circuit (VLSI) that handles all the data transfer protocols and contains a RAM for the buffering of the data to and from the disk. As the data fills up the RAM contained on the simultaneous data storval means the controller determines where the information is to be stored and how it is to be stored. When the RAM's information is ready to be transferred, the computer (or disk drive controller means) causes a signal to be generated that transfers the information to the data disk surface via the data transfer transducer means. The computer (or disk drive controller means) will transfer all the information contained in the RAM concurrently at one time effectuating a mass transfer of data between the simultaneous data transfer head means and the data disk means. Thus it can be seen that this method transfers a large body of information instantly and concurrently and that to transfer the entire body of information from the disk means to the data processing means requires one turn of the disk with the appropriate circuity constructed thereon in the disk device controller. This is in opposition of the currently practiced method of transferring one bit after another bit sequentially from a particular track, and then changing tracks, then repeating this operation until all of the data contained on the disk thereon is transferred. If a prior art disk means contains 1,700 tracks, it would take 1,700 revolutions to transfer all the data one bit at a time. The floppy removable disk system, unremovable hard disk system, removable hard disk system, CD-ROM system, floptical, etc. can be modified to use the method and system disclosed with our invention to use the parallel transfer of data from/to the disk means by the new simultaneous data transfer head means or plurality of simultaneous data transfer head means. An embodiment for these systems would require only changing to the head design of our disclosed invention in this patent and would yield higher densities of information stored on the disk surface and a faster transfer rate of information between the data processing system and the disk system.

As an alternate embodiment, not shown, the simultaneous data transfer head means are formed to conform to the shape of a storval means formed as a sphere. While the geometrical shape of the data transfer head means 1696 is built to conform to a predetermined geometrical shape, the function and operation of the data transfer head means 1696 is the same for the simultaneous transfer of a plurality of data bits.

Another embodiment, not shown, has the data transfer head means 1696, formed with a space the size of a row between alternating rows of data transfer transducer means 1694 that have been formed on the surface of the simultaneous data transfer head means 1696. When performing a data storval operation, simultaneous data transfer head means 1696 would be in one of two positions over the surface of the disk means. By shifting the data transfer head means 1696, to one of the two predetermined positions it would allow one half of the data to be transferred on the surface of a disk in one rotation, while allowing the other half of the data to be transferred when in the other predetermined position.

Figure 17:
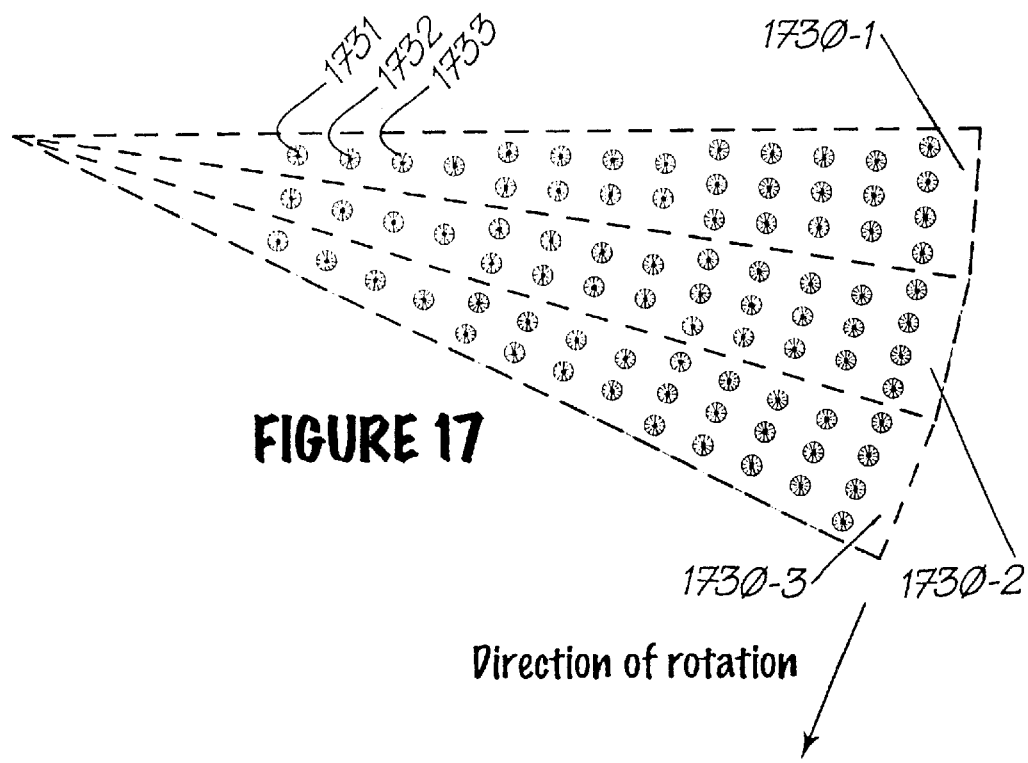
FIG. 17 shows a preferred arrangement of a region of simultaneously transferred data domains 1730-1, 1730-2, 1730-3 with only a limited number of enlarged domains being shown pictorially enlarged for purposes of clarity.

FIG. 17 shows a region of simultaneously transferred data domains 1730-1, 1730-2 and 1730-3. These region of simultaneously transferred data domains are generated by the simultaneous data transfer head means 1696 shown in FIG. 16. The first region of simultaneously transferred data domains 1730-1, is caused by the storage of data to the disk by the simultaneous data transfer head means 1696. When the simultaneous data transfer head means 1696 is signalled to transfer data as the disk rotates clockwise the data transfer occurs and generates the region of simultaneously transferred data domains 1730-2 on the disk surface. As the simultaneous data transfer head means 1696 continues to move relative to the surface of the disk means and is signalled to again transfer data, it generates the region of simultaneously transferred data domains 1730-3. This continues to occur until all the information has been transferred that is desired by the computer (or disk drive controller means).

FIG. 17 further illustrates simultaneously transferred data domains 1731, 1732, 1733 in rows from the center of rotation. These data domains can be used as signalling means for indicating the positional location of regions of simultaneously transferred data domains.

Figure 18:
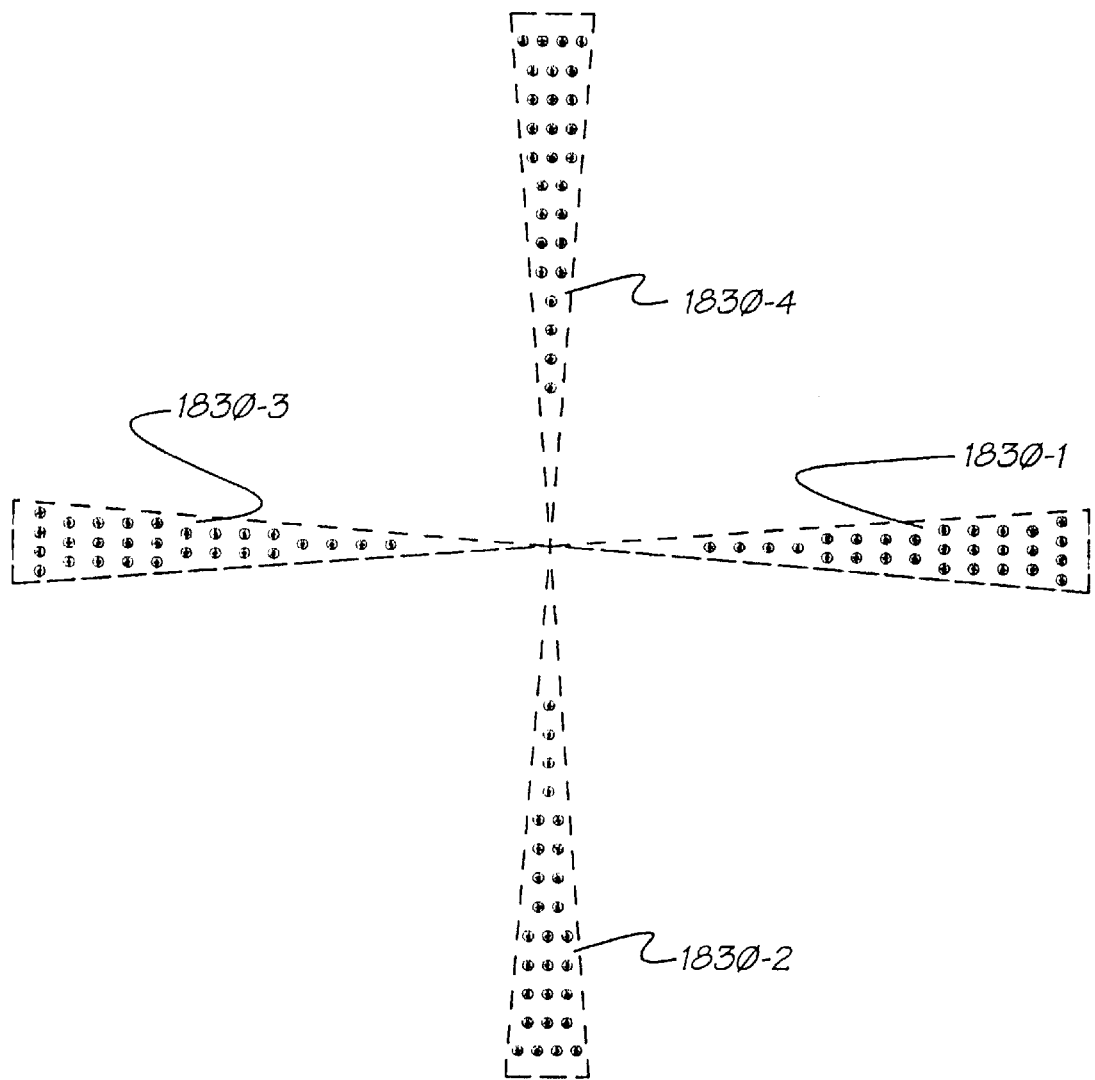
FIG. 18 shows a preferred embodiment of the positions of four regions of simultaneously transferred data domains 1830-1, 1830-2, 1830-3, 1830-4 with only a limited number of domains being shown pictorially enlarged for purposes of clarity.
Figure 22:
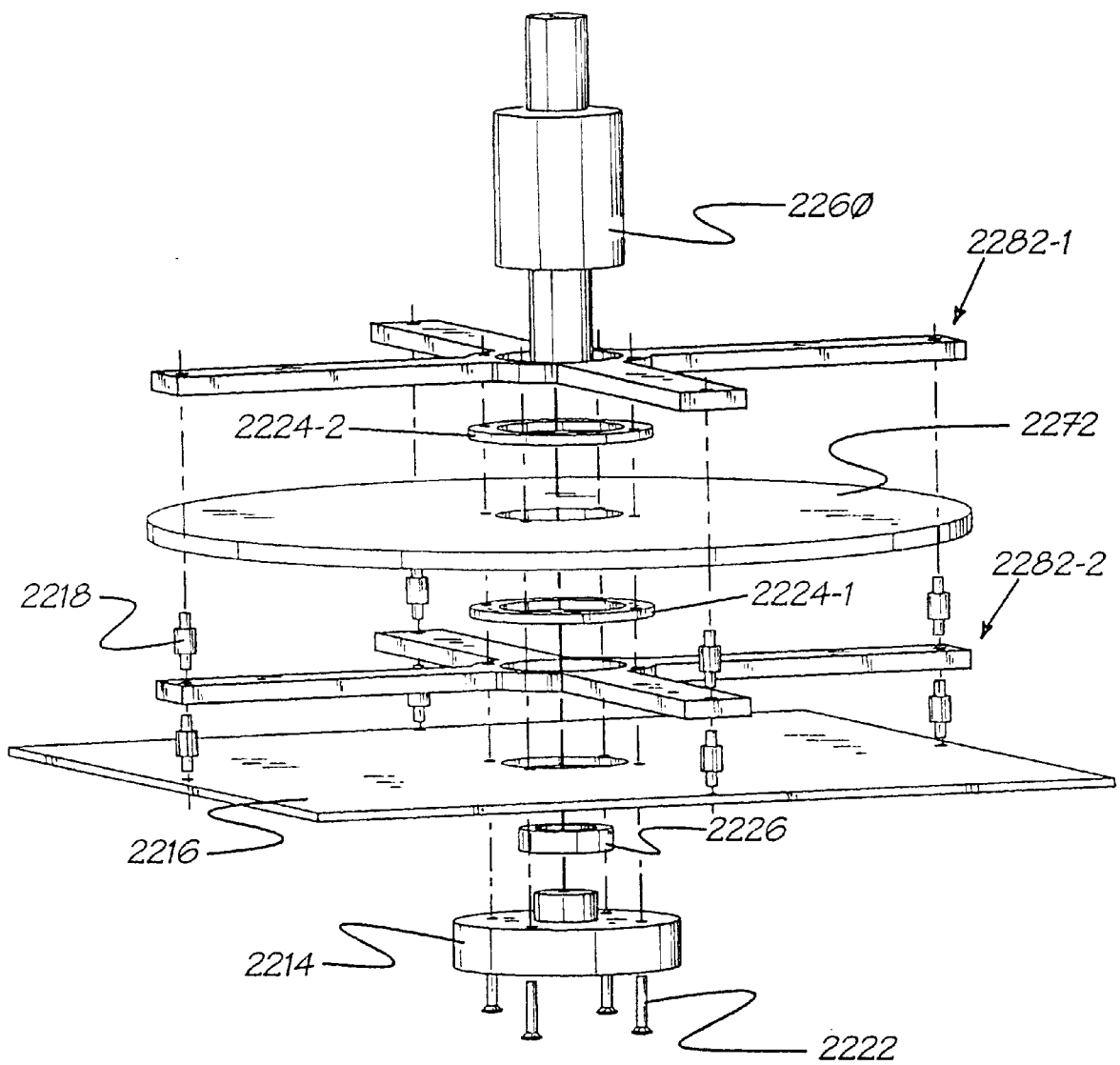
FIG. 22 shows a preferred embodiment of the invention of quad simultaneous data transfer head means 2282-1, 2282-2, fixed relative to the center of rotation of the disk 2272.

FIG. 18, shows for a disk means a preferred region of simultaneously transferred data domains on the disk means surface when the simultaneous data transfer head means has stored data in a particular region. This region of simultaneously transferred data domains can be generated either by a single simultaneous data transfer head means or by the plurality of simultaneous data transfer head means 2282-1 or 2282-2 as shown in FIG. 22. This pattern can be generated by a single simultaneous data transfer head means storing at various times, by four simultaneous data transfer head means storing at one time, or by a combination of the above. Furthermore, the region of simultaneously transferred data domains can be generated by storing a single bit domain a single byte, or a plurality of bytes at one time to complete the pattern of region of simultaneously transferred data domains 1830-1, 1830-2, 1830-2, & 1830-4.

Figure 19:
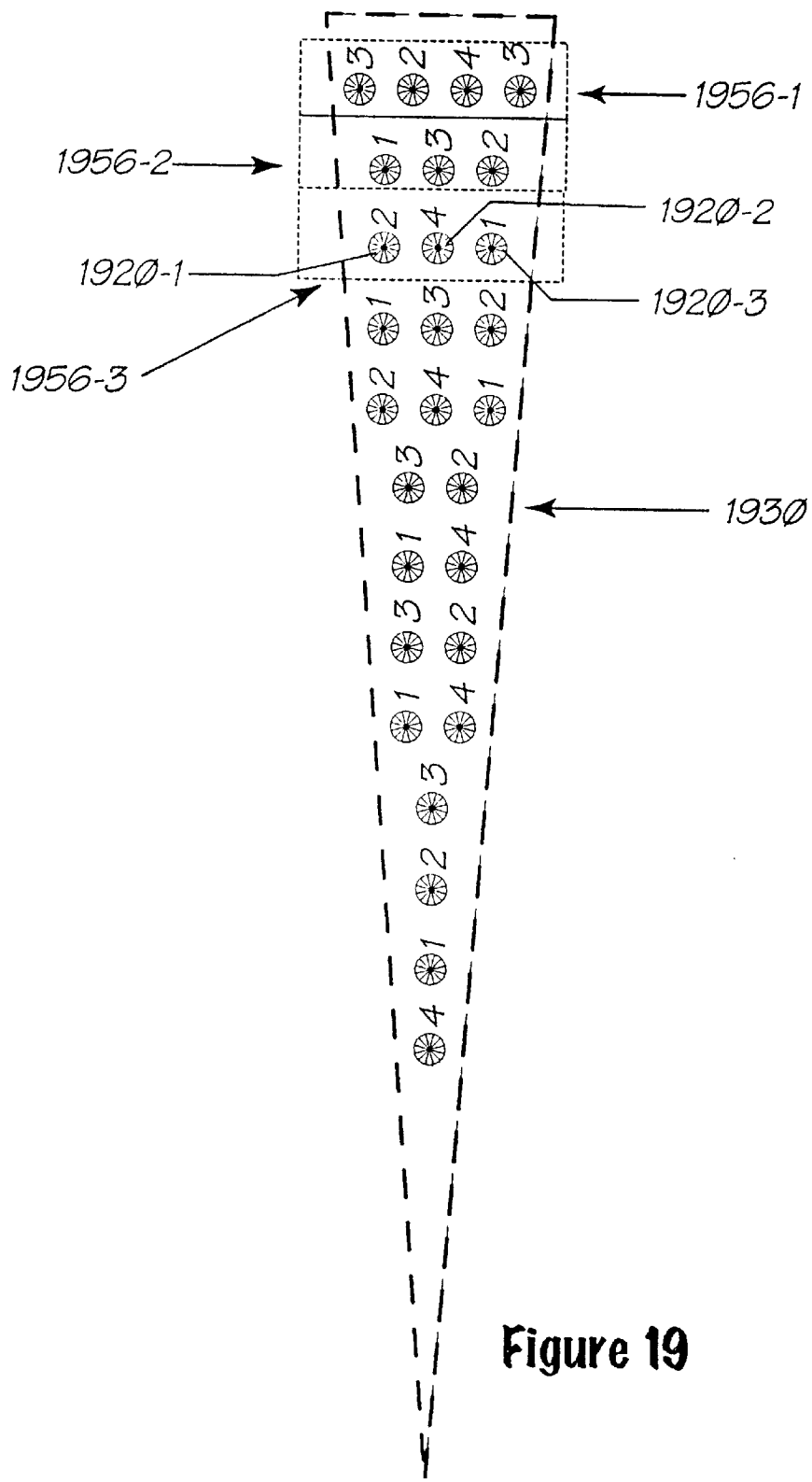
FIG. 19 shows an enlarged embodiment of a preferred region of simultaneously transferred data domains 1930 (each domain being shown pictorially enlarged), each of the individual domains having a number associated therewith to indicate said individual domain associated with a predetermined transducer means on a simultaneous data transfer head, with only a limited number of domains being shown for purposes of clarity.
Figure 21:
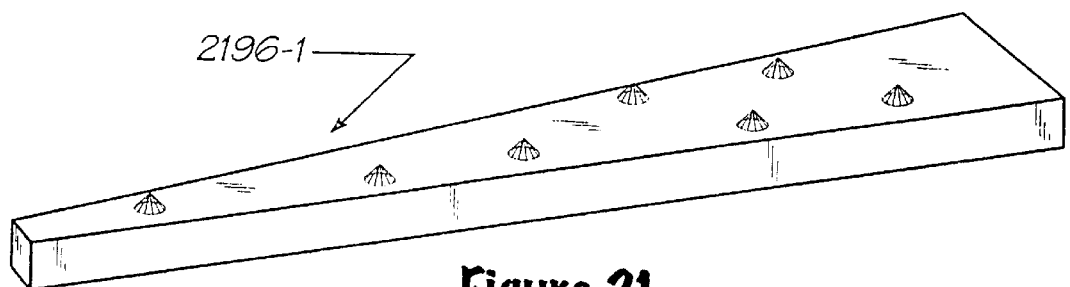
FIGS. 21–21C show alternate embodiments of simultaneous data transfer transducer means on different simultaneous data transfer head means with a limited number of enlarged simultaneous data transfer transducer means 2194 shown for purposes of clarity.
Figure 21A:
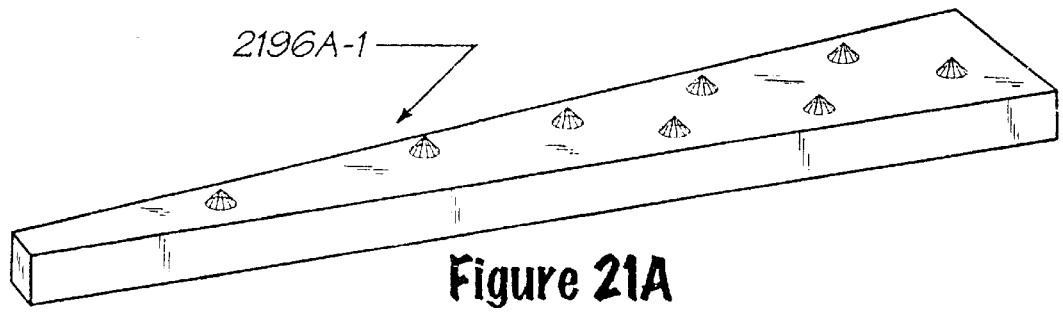
Figure 21B:
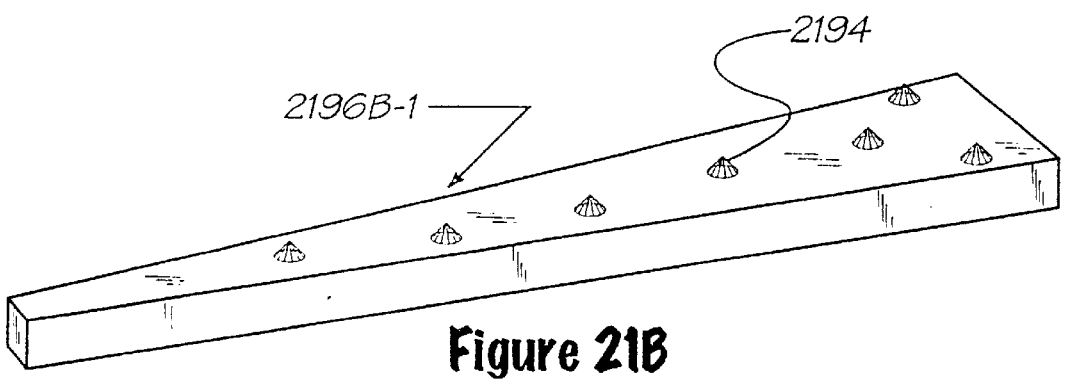
Figure 21C:
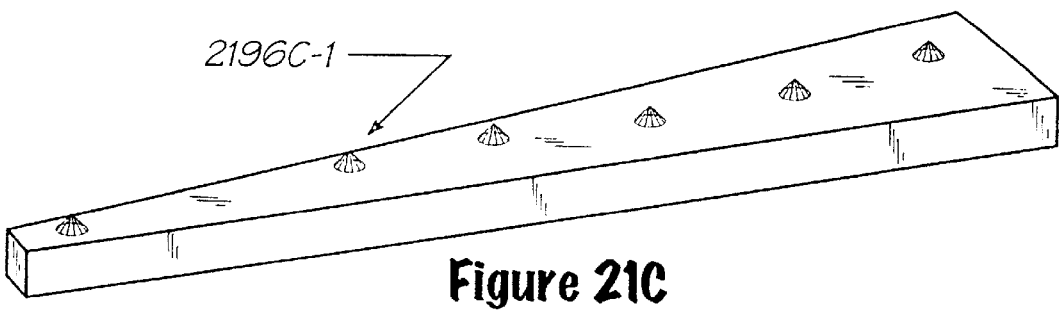

FIG. 19 illustrates a disk means having a region of simultaneously transferred data domains with a plurality of data bit domains stored therein. It further illustrates that the data bit domains stored therein can be generated from different simultaneous data transfer head means that a have region of simultaneously transferred data domains as shown in FIGS. 21 thru 21C. It should be understood that this region of simultaneously transferred data domains is shown for illustration purposes only, and is representative of a method of storing information in a region of simultaneously transferred data domains of our invention of this patent. It illustrates a first data row 1956-1, a second data row 1956-2 and a third data row 1956-3. In data row 1956-3 there is a first data bit domain 1920-1, a second data bit domain 1920-2, and a third data bit domain 1920-3. As shown, the data bit domains in row 1956-1 have been generated from data transfer head means 2196A-1, 2196B-1, 2196C-1 from FIGS. 21A–21C. Data transfer head means 2196B-1, is shown in FIG. 21B. Data transfer head means 2196C-1, is shown in FIG. 21C and data transfer head means 2196A-1, is shown in FIG. 21A. Row 1956-2 has its data bit domains generated from data transfer head means 2196-1 as shown in FIG. 21, data transfer head means 2196B-1 as shown in FIG. 21B, and data transfer head means 2196A-1, as shown in FIG. 21A. Row 1956-3 has its data bit domains generated by data transfer head means 2196-1, data transfer head means 2196A-1, and data transfer head means 2196C-1. The rest of the data bit domains in the region of simultaneously transferred data domains shown in FIG. 19 are self explanatory with the above explanation given and the numbers adjacent to the data transfer transducer means. The reason for the alternating spacing on the data bit domains is for the purposes of a spatial distinction between the data transfer transducer means that would store data in a region of simultaneously transferred data domains that are in close spatial arrangement to one another.

Thus high density can be achieved with a plurality of data transfer transducer means that are spread over a plurality of data transfer head means.

Figure 20:
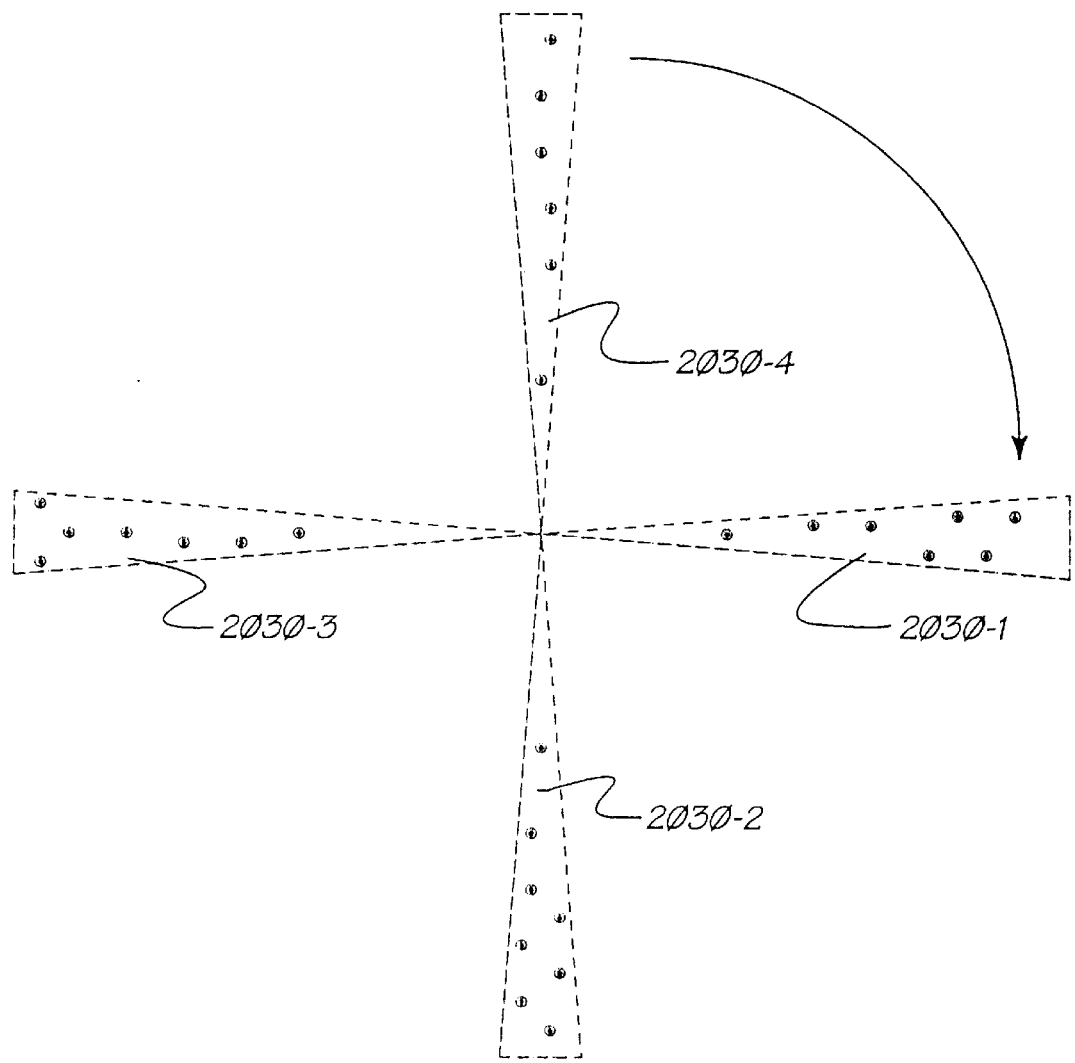
FIG. 20 shows an alternate embodiment of a region of simultaneously transferred data domains (each shown pictorially enlarged) concurrently stored by data transfer heads shown in FIGS. 21–21C.

FIG. 20, shows how the data transfer head means shown in FIG. 21 thru 21C would generate region of simultaneously transferred data domains as one single transfer function. As the disk rotates in a clockwise position as shown in FIG. 20 the plurality of data transfer transducer means would transfer data as the disk rotated under the proper region of simultaneously transferred data domains 2030-1, 2030-2, 2030-3, 2030-4, at the appropriate time. After the region of simultaneously transferred data domains rotates underneath all four simultaneous data transfer head means then the total of the data bit domains would be transferred as shown in FIG. 18.

FIGS. 21 thru 21C show an illustration of an embodiment for data transfer transducer means consisting of individual data transfer transducer means typified by data transfer transducer means 2194, have a spatially differentiated arrangement on 4 simultaneous data transfer head means. This arrangement allows for a maximum spacing between the data transfer transducer means on each individual simultaneous data transfer head means yet yields a high density of data domains on the disk.

FIG. 22 shows a preferred embodiment of an illustration of our invention of this patent. It consists of a spindle 2260, that connects the disk means 2272 to the motor 2214. Motor 2214 is connected to a mounting plate 2216 by screws 2222. The disk spindle 2260 has an adapter 2226 that is used to connect the spindle 2260 to the motor 2214. The data transfer head means 2282-1, 2282-2 consist of a plurality of simultaneous data transfer head means arranged in a cross type of arrangement such that each simultaneous data transfer head means spans a radii of the disk means 2272. The disk means 2272 is attached to the spindle 2260 via the disk spindle nuts 2224-1, 2224-2. The plurality of data transfer head means are spaced away from the disk via the standoffs (or data transfer head means spacers) 2218. When a voltage is applied to the motor 2214 this causes rotation of the disk spindle 2260 to which the disk means 2272 is attached. Thus, a relative motion is effected between the disk means 2272 and the plurality of simultaneous data transfer head means 2282-1, 2282-2. The computer (or disk drive controller means) causes a transfer of information according to the logic schematic shown in FIG. 23 when the proper signal is generated. It should be understood that this is an illustrative embodiment of our invention and that other embodiments of the arrangements can be practiced without changing the methodology of this patent.

Figure 23:
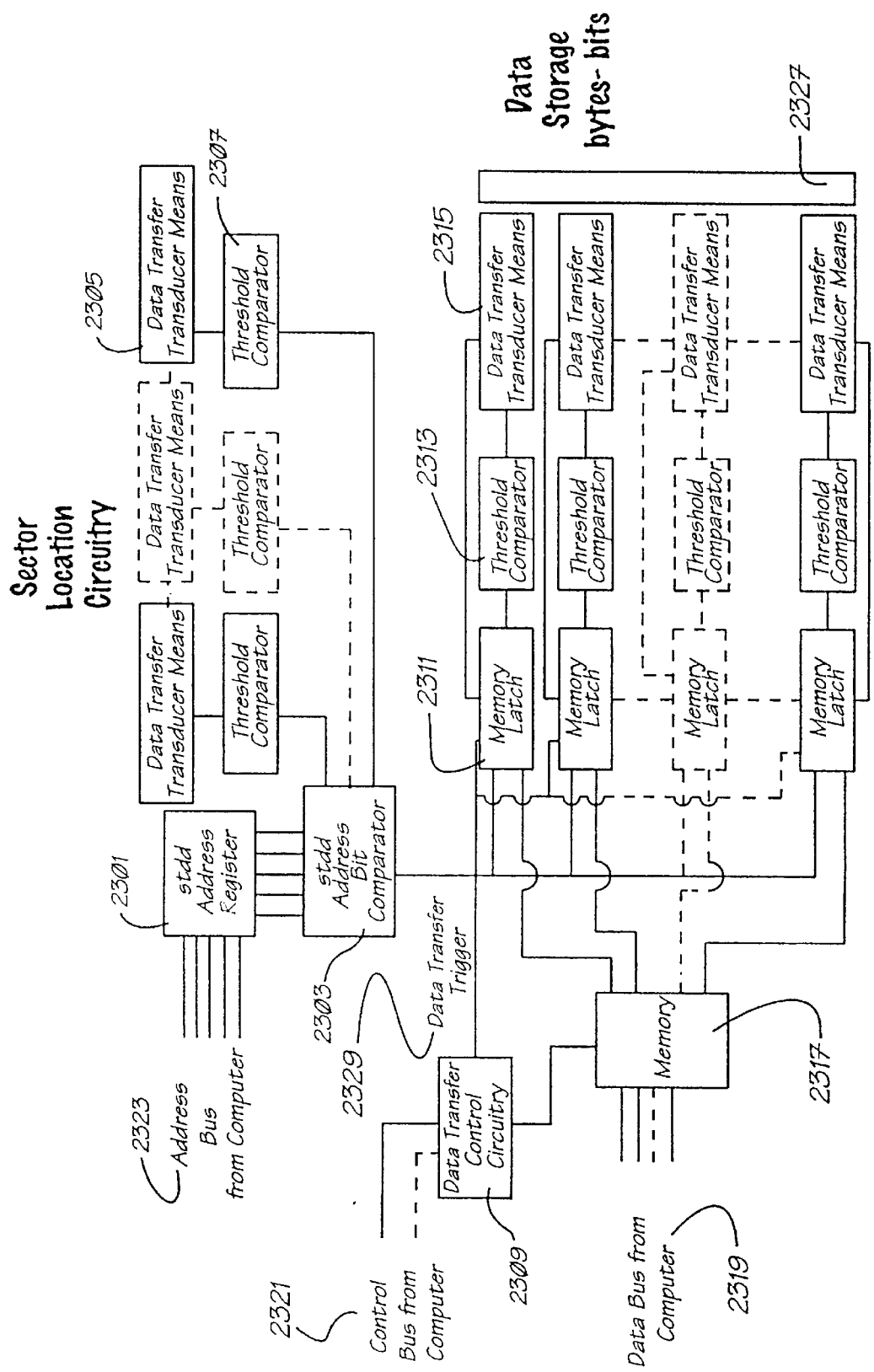
FIG. 23 shows a preferred embodiment of a master logic diagram of the electronics for controlling the data transfer of the invention.

FIG. 23 shows an illustration of a preferred embodiment of a master logic diagram of the electronics for controlling the data transfer of the invention. The address bus 2323 from the computer is connected to a region of simultaneously transferred data domains address register 2301. The region of simultaneously transferred data domains address register 2301 is connected to a region of simultaneously transferred data domains bit comparator 2303. Furthermore, the bus from the computer's control signals 2321 are connected to the data transfer control circuitry 2309 of the disk device controller. A data bus 2319 carrying the information to be transferred has a direct line to a ram memory located in the disk device unit. These data lines also could be connected to the CPU directly, or to a fast cache, or any other device that would allow quick access to the data stored in the fast memory of the disk means. As the disk means rotates beneath the plurality of simultaneous data transfer head means, the first several rows of data 1731, 1732, 1733 (see FIG. 17) in a region of simultaneously transferred data domains 1730-1, 1730-2, 1730-3 are used as a location indicator for the region of simultaneously transferred data domains address bit comparator 2303. It will be understood that more than these rows are normally used as a location indicator. The data transfer head means utilize the data transferred from the rows that are designated as the location rows and do a comparison with the region of simultaneously transferred data domains address register 2301. When this comparison is true, or positive, indicating that the disk is in the correct relative position underneath the data transfer head means then a transfer data trigger 2329 is generated that moves the information from the data transfer transducer means 2315 to either the memory latch 2311 or to the disk 2327, depending upon if the signal generated was the storage or retrieval trigger. The data transfer transducer means 2315 for the actual data that will be stored on the disk are connected to a threshold comparator 2313 which is in turn connected to a memory latch 2311. When a read trigger 2329 is generated then the information that is present at the data transfer transducer means 2315 is also present at the threshold comparator 2313, this threshold comparator 2313 will indicate whether data transfer transducer means 2315 has generated a one or zero bit. This data at the time of the read trigger is then latched into the appropriate memory latch 2311 and the device controller then moves the appropriate data bit from the memory latch 2311 to the memory 2317. The device controller then signals the computer that the data is available for transferring to the computer when the computer is ready for said information. If a write trigger 2329 has been generated then the information that has been stored in the memory 2317 will be moved to a memory latch 2311. The memory latch 2311 is connected directly to the data transfer transducer means 2315 and generates the appropriate signal for transferring the information to the disk 2327 when the write trigger 2329 is signaled. All the logic circuitry that is illustrated in this schematic is commercially available and can also be incorporated into a single very large scale integrated circuit (VLSI) if so desired.

Figure 25:
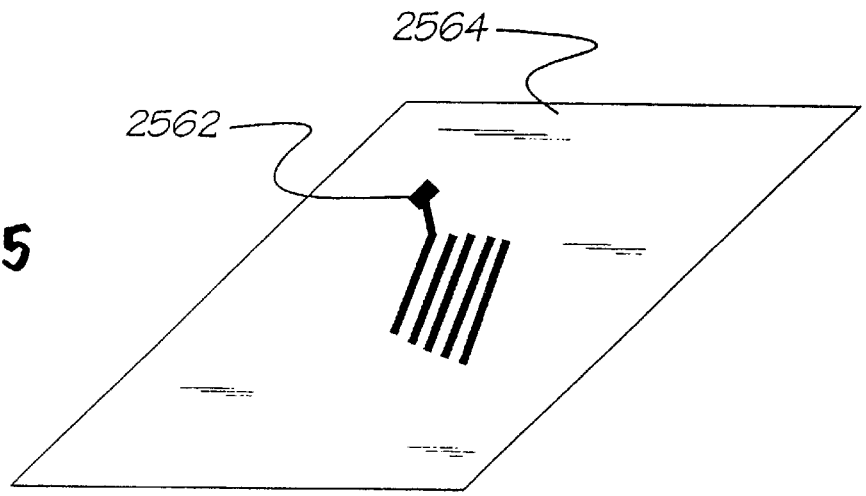
FIGS. 25–25E show a manufacturing technique for making the data transfer transducer means of this invention.
Figure 25A:
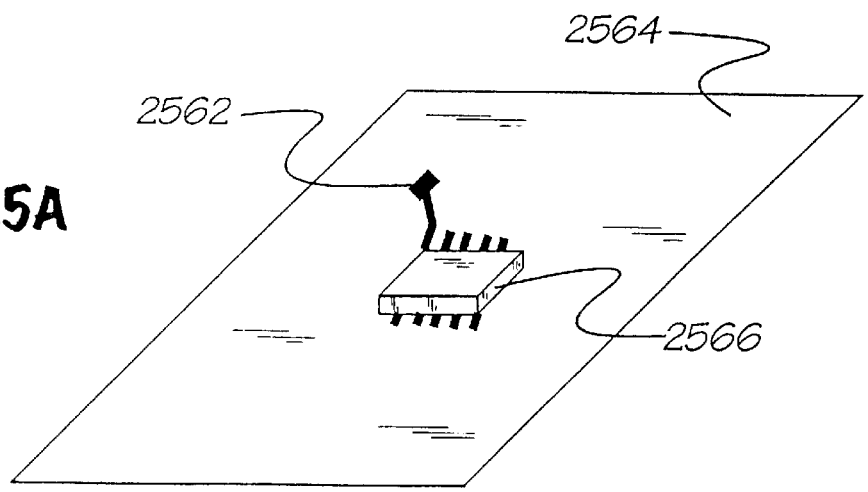
FIG. 25F shows an embodiment of a plurality of simultaneous data transfer transducer means after same have been coated with a thin film diamond coating on the substrate.
Figure 25B:
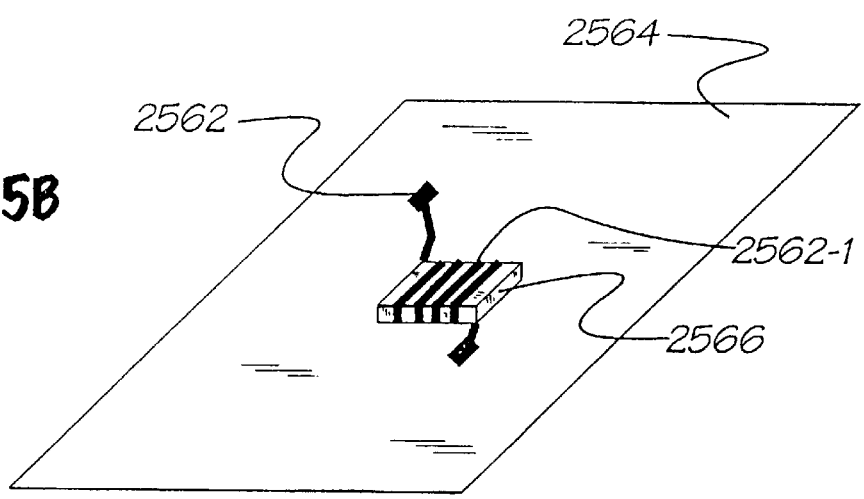
Figure 25C:
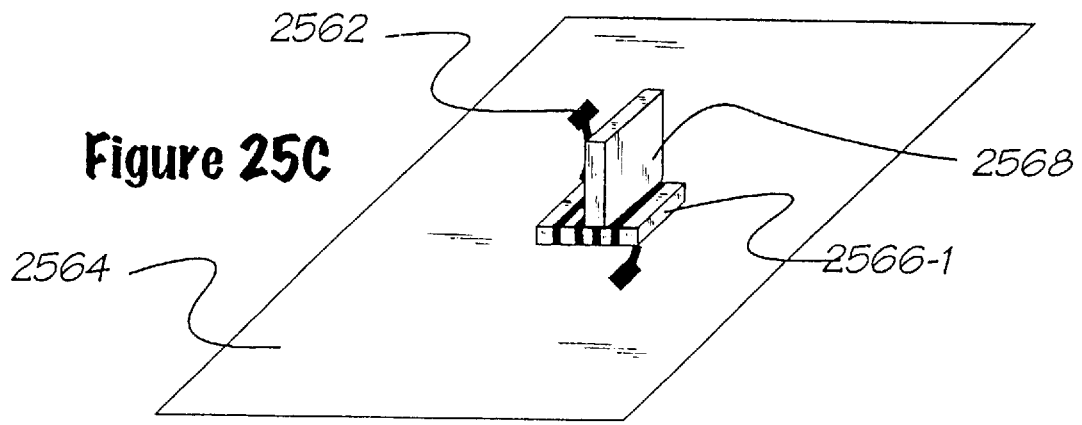
Figure 25D:
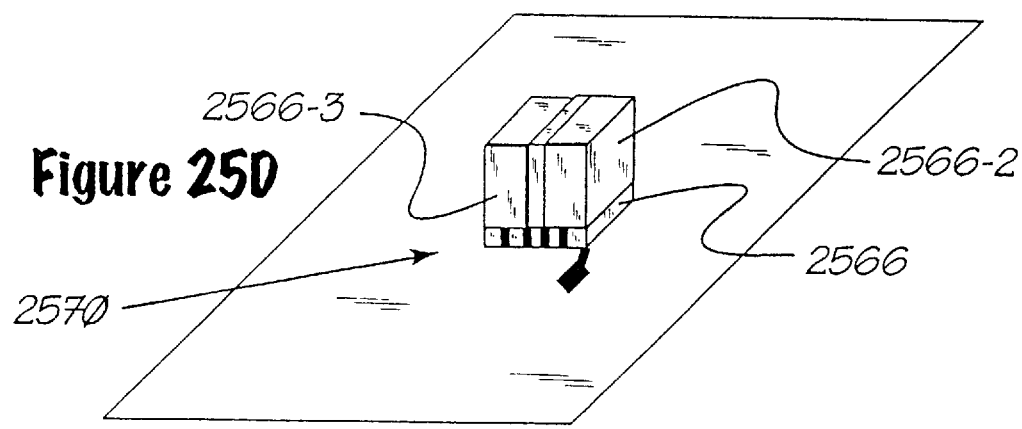
Figure 25E:
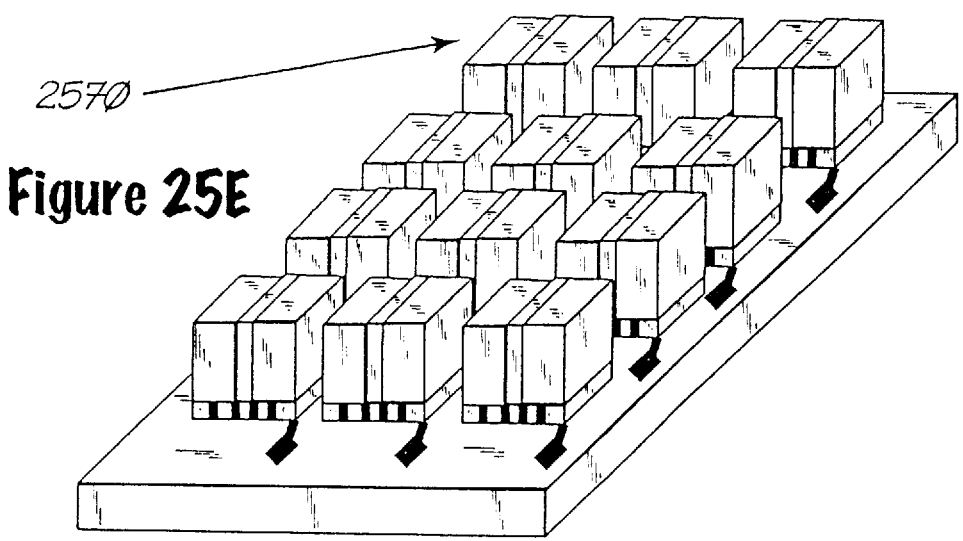

FIGS. 25–25E show a manufacturing technique for making the data transfer transducer means of this invention. It should be appreciated that this is only one of many ways that this patent can be practiced and that changes to the techniques described herein do not limit or change the scope of the method described.

As described by Eckertova, L., in Physics of Thin Films, 2d rev. ed. (1986) and Klabunde, J., ed., Thin Films (1986): Thin-film technology makes it possible to deposit a very thin layer of material—down to a few atoms in thickness—upon a substrate. This can be achieved in many ways. In the various methods of epitaxy, a crystalline layer of molecules is artificially grown on the substrate; the added layer mimics the geometric structure of the substrate. In the sputtering method of deposition, materials are bombarded with an inert gas, such as argon, and the resultant element beams deposit the materials on glass, plastic, metal, or other surfaces. In the Langmuir-Blodgett technique, long-chain organic molecules called amphiphiles are suspended on a water surface, and are then transferred to a substrate, such as glass that has been submerged in the water.

Referring to FIG. 25, the thin film head is fabricated on the substrate 2564 after the substrate has been cleaned and prepared to take the thin film material. A mask (not shown) is then laid down so that only the material will be deposited where the mask is not on the substrate. A thin film electrically conductive material 2562 is deposited for the start of the formation of the circuitry that will make the thin film coil 2562, 2562-1 wrapped around the magnetically permeable material 2566 for the head. Referring to FIG. 25A, another mask (not shown) is applied and then a magnetically permeable material 2566, such as an alloy of nickel-iron, is deposited by thin film techniques. Referring to FIG. 25B, a thin film electrically conductive material 2562-1 is deposited to wrap around the magnetically permeable material 2566 for the head. Now, in FIG. 25C, the mask (not shown) is removed and another mask is laid down for the depositing of the glass type material 2568 for the head gap. After the glass type material 2568 head gap is deposited, the mask is removed and another mask (not shown) is formed for the formation of the remainder of the data transfer transducer means. As shown in FIG. 25D and in the final illustrative formation of FIG. 25E, the remainder of the data transfer transducer means 2570 is formed by depositing magnetically permeable material 2566-2, 2566-3 in contact with magnetically permeable material 2566-1. The next step is to remove the mask. This process forms a plurality of data transfer transducer means for use on a magnetic recording material, such as a magnetic tape or disk. The substrate is then prepared in a suitable manner for mounting of the data transfer means circuity on another face of the substrate.

Figure 25F:
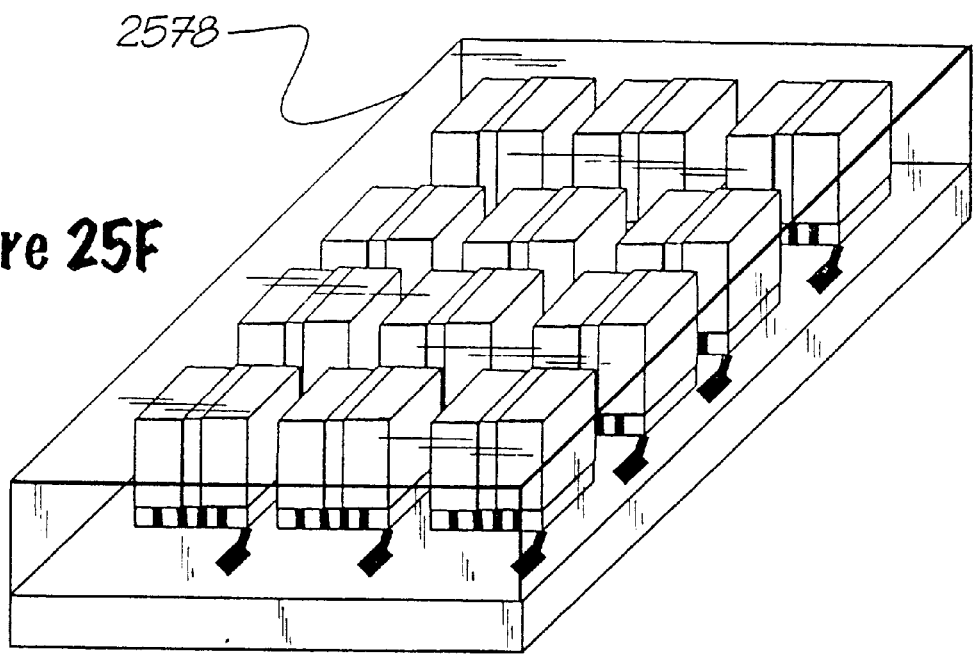

FIG. 25F shows an illustrative embodiment of a plurality of simultaneous data transfer transducer means after having been coated with a thin film diamond coating 2578 on the substrate. The coating will form a hard coating on both the data transfer heads (shown in FIG. 25E) and the surface of the disk means. This coating can be formed by a thin film coating process that is well known in the art. The diamond coating on the plurality of data transfer transducer means and the diamond coating on the disk make the materials slide against each other so that they are impervious so that if any dust gets in between them, the dust is literally ground up and nothing happens. The dust that is ground up between the diamond coated data transfer transducer means and the disk means is then blown away by the air on either side of the head.

Figure 26:
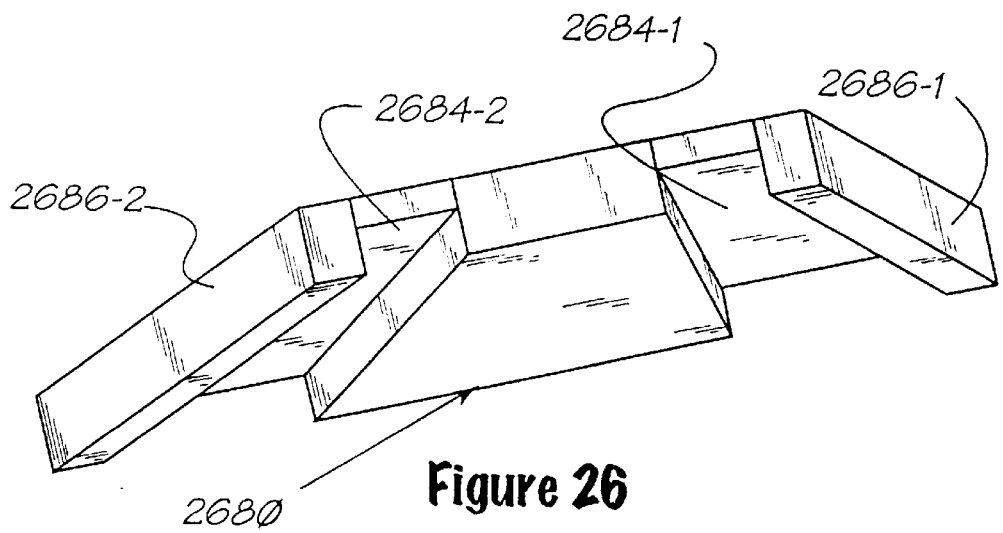
FIG. 26 shows a preferred embodiment of a simultaneous data transfer head assembly with aero-dynamic grooves forward in the head assembly for channeling pressurized filtered gas through the assembly to force the head structure away from the surface of the disk, end pieces not being shown for purposes of clarity.

FIG. 26 shows a preferred embodiment of the assembly of the simultaneous data transfer head structure 2680 with aero-dynamic channel means 2684-2, 2684-1 in the data transfer head structure 2680 for forcing, through the flow of pressurized gas or air, the data transfer transducer means structure 2680 away from the surface of the disk 2672A, without the side pieces 2686-1, 2686-2 shown for illustrative purposes. The side pieces 2686-2, 2686-1 will force the pressurized gas or air to stay in the channel means 2684-1, 2684-2.

Figure 26A:
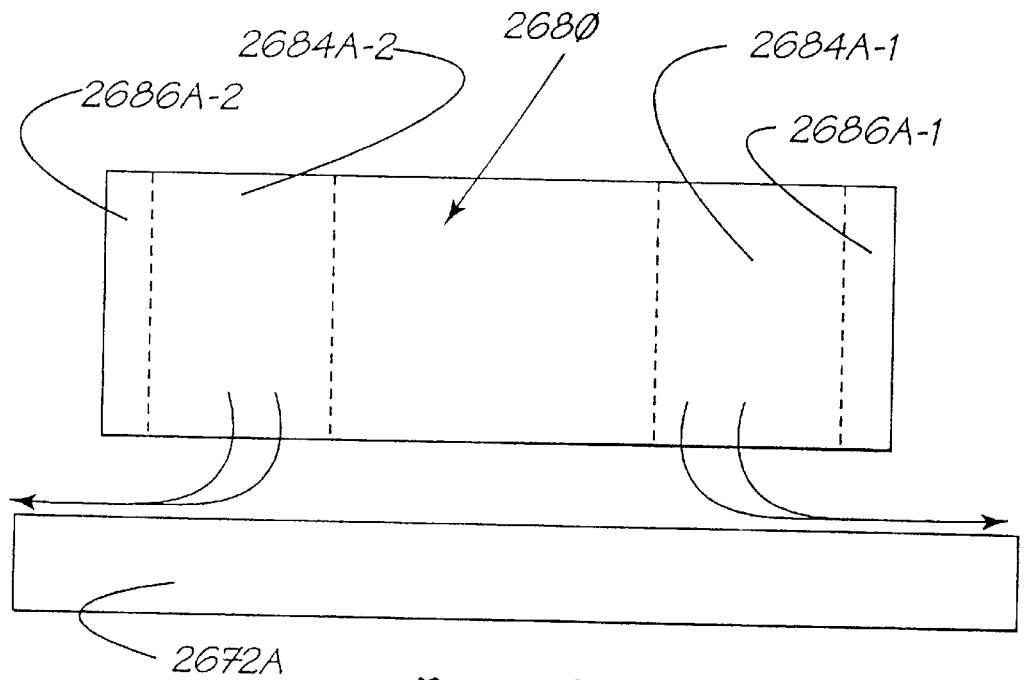
FIG. 26A shows an end view of FIG. 26 and the air patterns forcing said data transfer head away from the disk surface.

FIG. 26A shows an end view of FIG. 26 and the air patterns forcing said data transfer head structure 2680 away from the surface of the disk means 2672A including the end pieces. As shown, the air flows through the channel means 2684A-2, 2684-1 and down onto the surface of the disk means 2672A, forcing the disk away from the head assembly. The positive air flow stream down will force the data transfer head structure 2680 to move upwardly away from the surface of the disk. This causes a lifting action over the entire data transfer head structure 2680. As this occurs on both sides of the center structure containing the data transfer head structure 2680, this will cause the data transfer head structure 2680 to have a negative pressure radiant beneath the data transfer head structure 2680 itself thereby causing the disk means 2672A to want to suck up close to the data transfer head structure 2680 while causing an opposite force on either side of the data transfer head structure 2680 causing it to be pushed away. As the data transfer head structure 2680 approaches closer to the surface of the disk means 2672A the pressure increases in the slotted area of channels 2684-1, 2684-2 thereby causing a greater pressure to push the data transfer head structure 2680 away from the disk means 2672A. Thus by controlling the amount of air pressure within said slotted channels 2684A-1, 2684A-2 causes an automatic repellent force that forces the data transfer head structure 2680 away from the disk. This acts as a natural spring counter force to the spring action forcing the data transfer head structure 2680 towards the disk means 2672A.

The springs (not shown) that are used to force the data transfer head structure 2680 can be a leaf spring or it can actually a bimetallic material that increases it's spring function as voltage is applied. The heating of the material will force the data transfer head structure 2680 closer. As the voltage is removed from the bimetallic material, the spring function is decreased and the data transfer head structure 2680 move away from the disk.

When a G force is applied towards the disk 2672A and data transfer head structure 2680 and one or the other is accelerated towards one or the other, then the pressure underneath the data transfer head structure 2680 increases, acting as a natural barrier to prevent the data transfer head structure 2680 from crashing into the disk 2672A. Furthermore, since both surfaces are protected by a diamond coating then this makes both the data transfer head structure 2680 and the disk means 2672A relatively impervious to head crashes.

FIG. 26B shows a top view of a disk means 2672B, the disk means 2672B is being positioned beneath the simultaneous data transfer head structure 2680B, along with the air flow patterns. Air flows in from the near center of the disk through the channel means 2684B-1, 2684B-2 and is forced downward and outward by the air pressure.

FIG. 26C shows a perspective view of FIG. 26 with the end pieces 2688C-1, 2688C-2 in place and showing the air inlets 2690C-1, 2690C-2 in end cap 2688C-2.

SUMMARY

Accordingly, the reader will see that the invention of simultaneous storage and/or retrieval of a plurality of data on a disk means can be used easily and conveniently for large data transfers. In addition, such a invention can be used for video servers, voice speech recognition, large computing services, recording of large transfer of data information from space vehicles, etc.

As an example we will calculate the the amount of information that can be stored on a floppy disk that is used in today's personal computers using this invention. A standard high density floppy is formatted as 1.4 megabytes. This 1.4 megabytes is recorded on a floppy disk that is known as the 3½ inch [8.89 cm] disk. The disk is housed in a plastic housing that is 3½ inches [8.89 cm] by 3½ inches [8.89 cm] square with an opening to allow the head to make contact with the floppy disk surface, either on one or both sides. The recording medium has a diameter of 3⅜ inches [8.57 cm] with a center metallic ring attached to the magnetic recording area. The center ring is approximately 1³⁄₁₆ inches [3.02 cm] in diameter. This gives an inner recordable radius of 0.593 inches [1.51 cm] and an outer recordable radius of 1.6875 inches [4.29 cm] (For the purposes of this calculation we will use an inner radius of 0.75 inches [1.9 cm] and an outer radius of 1.5 inches [3.81 cm]). The circumference of the inner radius of 0.75 inches [1.9 cm] gives us a recordable length of 2•π•R or π∩D which is equal to approximately 4.71 inches [11.96 cm]. Since we are dividing the inner radius up into a region of simultaneously transferred data domains of which the region of simultaneously transferred data domains, angular rotation time is approximately 3.52 microseconds (3.52 $\mu$sec or 0.00000352 seconds or 3.52•10$^{-6}$ seconds). The rotation of the floppy disk at 360 rpm (revolutions per minute) gives us a revolution every 166 milliseconds (166 msec or 0.166 seconds or 166•10$^{-3}$ seconds). 166 msec divided by 3.52 $\mu$sec is 47,100 divisions. If we divide the circumference which is approximately 4.71 inches [11.96 cm] by 47,100 division we get an inner arc length of 10 $\mu$inches [2.54 $\mu$m] (100 microinches or 100•10$^{-6}$ inches). If we assume a recording density of 12,500 bits per inch [4,921 per cm], then each region of simultaneously transferred data domains is capable of storing 9,375 rows of data with 2 to 4 data bit domains per row. Current technology for a read/write head is at least 40 millionths of an inch [1.02 $\mu$m] for the magnetic domain. This works well with the 100 $\mu$inch [1.54 $\mu$m] calculation for the inner arc length calculated above. The outer arc length for the diameter of 1.5 inches [3.91 cm] is approximately 200 $\mu$inches [5.08 cm], thus capable of holding at least 5 data domains. We will assume an average of 3 data domains for all of the rows. A data transfer transducer means gap of 40 $\mu$in. [1.02 $\mu$m] will give 25,000 domains per inch [9,842 per cm], but we will assume 12,500 domains per inch [4,921 per cm] for the floppy disk. For each region of simultaneously transferred data domains were calculate the total of data domains as equal to: 3 data bit domains•9,375 rows=28,125 data bit domains, or 3,515 bytes of data. Since there are 41,700 regions of simultaneously transferred data domains with 3,515 bytes per region of simultaneously transferred data domains, this yields a total number of bytes for the floppy disk of 165 megabytes (165•10$^6$ bytes or 165 MB) per side, or 330 MB per disk. 165 MB is possible to be transferred in one rotation of the disk which yields a effective rate of approximately 1 gigabyte/sec (1ω10$^9$ per second or 1 GB/s). With the use of 4 data transfer head means with a plurality of data transfer transducer means as practiced by this invention this yields 4 GB/s.

These calculations can also apply to a hard disk unit, but with a greater storage density for the region of simultaneously transferred data domains. For instance, with a heard disk rotating at 3600 RPM and an outer diameter of 5.25 inches [13.34 cm] we can store more per side. The calculations are: The recording medium has a diameter of 5.25 inches [13.34 cm] with a center metallic ring attached to the magnetic recording area. The center ring is approximately 1³⁄₁₆ inches [3.02 cm] in diameter. This gives an inner recordable radius of 0.593 inches [1.51 cm] and an outer recordable radius of 2.625 inches [6.67 cm]. For the purposes of this calculation we will use an inner radius of 0.75 inches [1.91 cm] and an outer radius of 2.5 inches [6.35 cm]. The circumference of the inner radius of 0.75 inches [1.91 cm] gives us a recording length of 2•π•R or π•D which is equal to approximately 4.71 inches [11.96 cm]. Since were are dividing the inner radius up into region of simultaneously transferred data domains of which the region of simultaneously transferred data domains angular rotation time is approximately 141 ns (141 nanoseconds or 141•10$^{-9}$ seconds). The rotation of the disk at 3600 rpm gives us a revolution every 16.6 msec. 16.6 msec divided by 141 ns is 117,800 divisions. IF we divide the inner circumference which is approximately 4.71 inches [11.96 cm] by 117,800 divisions we get an inner arc length of 40 $\mu$inches [1.02 $\mu$m]. If we assume a recording density of 25,000 bits per inch [9,842 cm], then each region of simultaneously transferred data domains is capable of storing 43,750 rows of data with 1 to 3 data bit domains per row. From the radius of 0.5 inch [1.27 cm] to 1 inch [2.54 cm] we will use 1 row of data, from 1 inch [2.54 cm] to 2 inches [5.08 cm] we will use 2 rows of data, and from 2 inches [5.08 cm] to 2.5 inches [6.35 cm] we will use 3 rows of data. For each region of simultaneously transferred data domains we calculate the total of data domains as equal to 100,000 bits or 12,500 bytes of data which can be transferred simultaneously. Since there are 117,800 regions of simultaneously transferred data domains with 12,500 bytes per region of simultaneously transferred data domains this yields a total number of bytes for the disk of 1.47 gigabytes per side or 2.94 GB per disk. Since 1.47 GB can be transferred in one rotation of the disk, this yields an effective transfer rate of approximately 88 gigabyte/sec. With the use of 4 data transfer head means with a plurality of data transfer transducer means this yields 354 GB/s.

Furthermore, the data transfer device has the additional advantages in that.

It permits storing data at higher densities than previously;

This new technology can be used for several different applications/markets while retaining the same technology used in each product. For instance, it can be used for hard disks of pcs, minicomputers, and mainframes. It can also be adapted to CD ROMs;

It is capable of high speed transfer of data between a disk and a computer at rates of over 354 Gb/sec;

It is capable of parallel transfer of data simultaneously to several different servers, making it compatible with the next generation of video servers necessary for the interactive data highway;

It will replace the existing standard for disk technology;

It can be used as a substitute for RAM for a computer, and thus will be used extensively in the multimedia era that we are now entering for the home and business markets;

The disk is made from the same materials that are being used today, and is merely an adaptation of the present technologies to the new invention. Thus, existing suppliers can be used. For instance, the disks will use the same technology, but a change will be made in their physical structure, and the same applies to the head read/write technology; and A lower cost per MB for data storage.

Although the description above contains many specivities, these should not be construed as limiting the scope of the invention but as merely providing illustrations of some of the presently preferred embodiments of this invention. For example the disk means can have other shapes such as circular, oval, spherical, trapezoidal, triangular, etc.; the recording head can have other shapes and can have different densities than mentioned; the recording medium can be other than magnetic, such as optical polymer, biomagnetic, bioelectric, bioluminescent, etc.

Thus the scope of the invention should be determined by the appended claims and their legal equivalents rather than by the example.

What is claimed is:

1. A thin film magnetic data transfer transducer, comprising:
    a substrate having a surface;
    a first predetermined pattern of thin film material formed from electrically conductive material, said first predetermined pattern of thin film material having a portion thereof disposed on said surface of said substrate;
    a first substantially magnetically permeable piece of material formed on at least a portion of said first predetermined pattern of thin film material disposed on said surface of said substrate;
    a second predetermined pattern of thin film material formed from electrically conductive material, said second predetermined pattern of thin film material being formed on a portion of said first substantially magnetically permeable piece of material and in electrical communication with said first predetermined pattern of thin film material whereby said first and second predetermined patterns of thin film material form a coil about said first substantially magnetically permeable piece of material;
    a substantially magnetically non-permeable piece of material formed on and outwardly extending from at least a portion of said first substantially magnetically permeable piece of material and said second predetermined pattern of thin film material; and
    a second substantially magnetically permeable piece of material formed on at least a portion of said substantially magnetically non-permeable piece of material and in communication with said first substantially magnetically permeable piece of material whereby said second substantially magnetically permeable piece of material and said substantially magnetically non-permeable piece of material are formed as a head gap outwardly extending from and as a part of said thin film magnetic data transfer transducer.

2. A thin film diamond coated magnetic data transfer transducer, comprising:
    a substrate having a surface;
    a first predetermined pattern of thin film material formed from electrically conductive material, said first predetermined pattern of thin film material having a portion thereof disposed on said surface of said substrate;
    a first substantially magnetically permeable piece of material formed on at least a portion of said first predetermined pattern of thin film material disposed on said surface of said substrate;
    a second predetermined pattern of thin film material formed from electrically conductive material, said second predetermined pattern of thin film material being formed on a portion of said first substantially magnetically permeable piece of material and in electrical communication with said first predetermined pattern of thin film material whereby said first and second predetermined patterns of thin film material form a coil about said first substantially magnetically permeable piece of material;
    a substantially magnetically non-permeable piece of material formed on and outwardly extending from an least a portion of said first substantially magnetically permeable piece of material and said second predetermined pattern of thin film material;
    a second substantially magnetically permeable piece of material formed on at least a portion of said substantially magnetically non-permeable piece of material and in communication with said first substantially magnetically permeable piece of material whereby said second substantially magnetically permeable piece of material and said substantially magnetically non-permeable piece of material are formed as a head gap for data transfer outwardly extending from and as a part of said thin film magnetic data transfer transducer; and
    a diamond coating formed on and covering at least said head gap for data transfer to thereby facilitate transfer of data by said magnetic data transfer transducer for data storval.

* * * * *